(12) United States Patent
    Bell et al.

(10) Patent No.: US 10,757,304 B2
(45) Date of Patent: Aug. 25, 2020

(54) SIMULTANEOUS IMAGE GATHERING SYSTEM AND METHOD

(71) Applicant: Check Out My, LLC, Redmond, WA (US)

(72) Inventors: Kevin Bell, Redmond, WA (US); Timothy Getsch, Redmond, WA (US); Grant Wescott, Redmond, WA (US)

(*) Notice: Subject to any disclaimer, the term of this patent is extended or adjusted under 35 U.S.C. 154(b) by 200 days.

(21) Appl. No.: 15/901,747

(22) Filed: Feb. 21, 2018

(65) Prior Publication Data
    US 2018/0241919 A1    Aug. 23, 2018

Related U.S. Application Data

(60) Provisional application No. 62/461,963, filed on Feb. 22, 2017.

(51) Int. Cl.
| | |
|---|---|
| H04N 5/225 | (2006.01) |
| G03B 15/00 | (2006.01) |
| G03B 17/17 | (2006.01) |
| G03B 15/02 | (2006.01) |
| H04N 5/262 | (2006.01) |
| G03B 17/56 | (2006.01) |

(52) U.S. Cl.
CPC ........... *H04N 5/2254* (2013.01); *G03B 15/00* (2013.01); *G03B 17/17* (2013.01); *G03B 17/565* (2013.01); *H04N 5/2251* (2013.01); *H04N 5/2252* (2013.01); *G03B 15/02* (2013.01); *H04N 5/2256* (2013.01); *H04N 5/2628* (2013.01)

(58) Field of Classification Search
CPC .. H04N 5/2254; H04N 5/2251; H04N 5/2252; H04N 5/2628; G03B 17/17; G03B 17/565; G03B 15/00; G03B 15/02
See application file for complete search history.

(56) References Cited

U.S. PATENT DOCUMENTS

| | | | |
|---|---|---|---|
| 2006/0072822 A1* | 4/2006 | Hatzav | G03B 15/00 382/181 |
| 2009/0073503 A1* | 3/2009 | Lebaschi | H04N 1/00326 358/450 |

OTHER PUBLICATIONS

Office Action dated Oct. 26, 2018 for Canadian Patent Application No. 2,995,804, 4 pages.

* cited by examiner

*Primary Examiner* — Nelson D. Hernández Hernández
(74) *Attorney, Agent, or Firm* — Schwabe, Williamson & Wyatt, P.C.

(57) ABSTRACT

Systems and methods for simultaneous image acquisition are provided herein. An apparatus for simultaneous image capture may include a camera, and a chamber with an aperture, the camera oriented to capture light emitted through the aperture. The chamber may include at least first and second mirrors positioned inside the chamber with a defined angle between them, and a holder for an object to be imaged, the holder positioned inside the chamber between the first and second mirrors. In embodiments, the field of view of the camera includes at least portions of the first and second mirrors with respective portions of the object reflected by the first and second mirrors. Other embodiments may be described and/or claimed.

19 Claims, 62 Drawing Sheets

SIMULTANEOUS IMAGE GATHERING SYSTEM AND METHOD

CROSS-REFERENCE TO RELATED APPLICATIONS

This application claims the benefit of U.S. Provisional Patent Application No. 62/461,963, entitled "SIMULTANEOUS IMAGE GATHERING SYSTEM AND METHOD", filed on Feb. 22, 2017, the disclosure of which is incorporated herein by reference.

FIELD

Embodiments of the present disclosure generally relate to the field of image acquisition and processing, and in particular to methods and systems for simultaneously capturing images of multiple sides of various objects, and processing them for storage or presentation.

BACKGROUND

Collectible objects with multiple sides, such as, for example, sports cards, stamps, coins, photographs, photo slides, postcards, stickers, magazines, comic books, comic cards, playing cards, trading cards, gaming cards, "pogs," or the like, lend themselves well to gathering different images of them simultaneously. To identify, catalog, buy, sell, trade, or showcase these items, it is important to see more than one side of them. Traditionally, one obtains digital images of one side of an item and then flips or otherwise manipulates the item over to obtain an image of another side of the item. In some cases people may use multiple image capturing devices, or may move the image capturing device (as opposed to the item) to capture other sides of the item. These techniques run the risk of the item being changed or bumped before the second image is captured causing the different sides of the item to not exactly match up to the item. They also tend to take more time and cause more wear and tear on image capturing devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the Figures of the accompanying drawings.

DETAILED DESCRIPTION

Figure 1:
FIG. 1 is a diagram illustrating an example cross section of a simultaneous image capture apparatus, in accordance with some embodiments.

Embodiments of the present disclosure include techniques and configurations for a system and an apparatus for simultaneous image gathering, in accordance with some embodiments. In embodiments, the apparatus may include a camera, and a chamber. The camera may be oriented to provide a field of view inside the chamber. In embodiments, the chamber may include: at least first and second mirrors positioned inside the chamber under a defined angle relative each other, and a placeholder for an object to be positioned inside the chamber substantially between the first and second mirrors. The field of view of the camera includes at least portions of the first and second mirrors with respective portions of the object reflected by the first and second mirrors.

By using a single image capturing device and a set of mirrors, multiple sides of an item (object) may be substantially simultaneously captured. This may guarantee that nothing has been changed between image acquisitions, and the time to capture the images as well as wear and tear on image capturing device(s) may be reduced.

In some embodiments, two sides of a substantially flat item may be captured. In some embodiments, three or more sides of an item may be captured by changing the disposition of the mirrors inside the chamber. In example embodiments, first surface mirrors may be used to ensure that there is not an extra layer of glass on the mirror that can cause ghosting of the captured image.

In embodiments, an apparatus for simultaneous image capture may include a camera, and a chamber with an aperture, the camera oriented to capture light emitted through the aperture. The chamber may include at least first and second mirrors positioned inside the chamber with a defined angle between them, and a holder for an object to be imaged, the holder positioned inside the chamber between the first and second mirrors. In embodiments, the field of view of the camera includes at least portions of the first and second mirrors with respective portions of the object reflected by the first and second mirrors.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

The following description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment" or "in embodiments," which may each refer to one or more of the same or different embodiments. Furthermore, the terms "comprising," "including," "having," and the like, as used with respect to embodiments of the present disclosure, are synonymous.

FIG. 1 is a diagram illustrating an example cross section of a simultaneous image capture apparatus, in accordance with some embodiments. It has one of the sides of the lighted box removed so that the inside may be visible. There is a camera 102 in the back (right side) that looks through a hole (aperture) 104 in the lighted chamber (box) 106. The left side shows cross sections of two mirrors 108, 110 that make up the opposite sides of the lighted box 106. The inside of the apparatus is shown by removing the right-side panel.

Normally the side panel is in place to control the lighting in the lighted box/chamber 106. It may be possible to remove the left side panel and have pictures taken from the other side. The device happens to be symmetrical.

In some embodiments, the apparatus may include the camera 102 at the bottom and the mirrors 108, 110 at the top. The target item/object may be dropped inside like a piece of bread into a toaster. It may be sandwiched between two pieces of glass and have a mechanism to drop the target item/object out the bottom when the image capture is done. Alternatively, the target item/object may be ejected out of the top when image capture is done. The whole device may be disposed at an angle so that gravity may help slide the item more safely than simply dropping it.

In the example embodiment of FIG. 1, the apparatus includes a drawer 114 with a glass window 112, on which a target object may be placed. It is noted that, in embodiments, glass window 112 may not be required, but rather, in some embodiments it is possible to simply position a target item/object in a holder template so that the edges of the item keep the item suspended. The important thing is that the window is transparent and exposes the desired portion of the target item/object to both mirrors 108, 110 and ultimately to camera 102.

As shown, both sides of a flat object may be captured substantially simultaneously by making both sides of the object visible to a camera 102 at the same time. This is made possible using two mirrors 108, 110 disposed at a determined (e.g., 90-degree) angle to each other and suspending the target object to be substantially equidistant between the two mirrors. In embodiments, this may be done by using a drawer with the glass window 112 and positioning the mirrors 108, 110 at determined (e.g., 45-degree) angles relative to the drawer 114. This is demonstrated on the left side of FIG. 1. On the right side of FIG. 1, camera 102 is shown as positioned so that it is tipped on its side, and is taking a vertically oriented letter box picture. In some embodiments, the target object may be suspended between the two mirrors other than in an equidistant fashion. Importantly, simultaneous capturing of multiple angles in a single photo may be possible. For example, multiple angles of a three dimensional object may be used, but not necessarily at the same scale.

Figure 2:
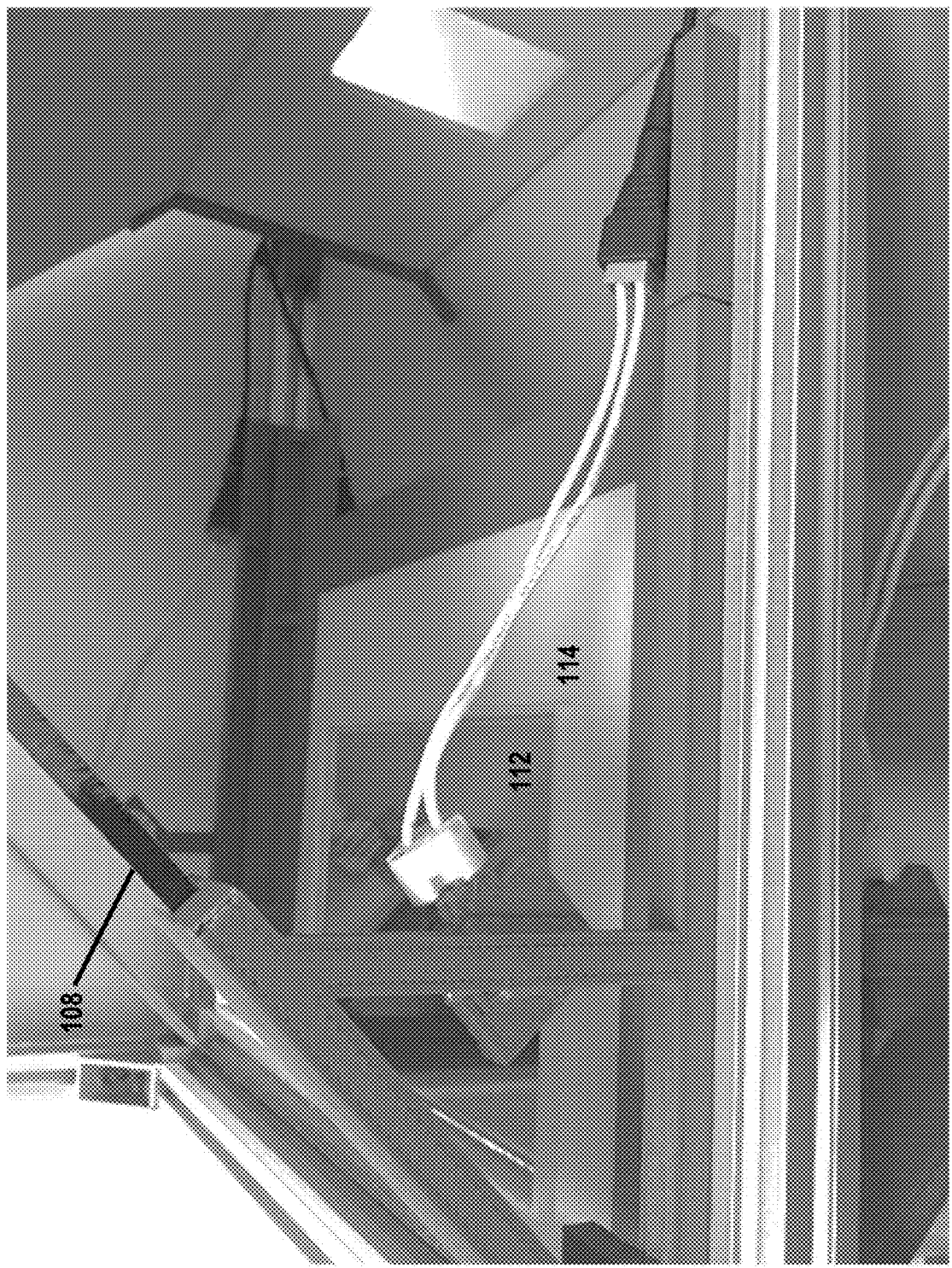
FIG. 2 illustrates a close up view of the inside of the lighted box (chamber) of the apparatus of FIG. 1.

FIG. 2 illustrates a close up view of the inside of the lighted box (chamber) of the apparatus. Drawer 114 is positioned between the two mirrors 108, 110. As shown, drawer 114 includes a glass window 112 that the target item may be disposed on.

Figure 3:
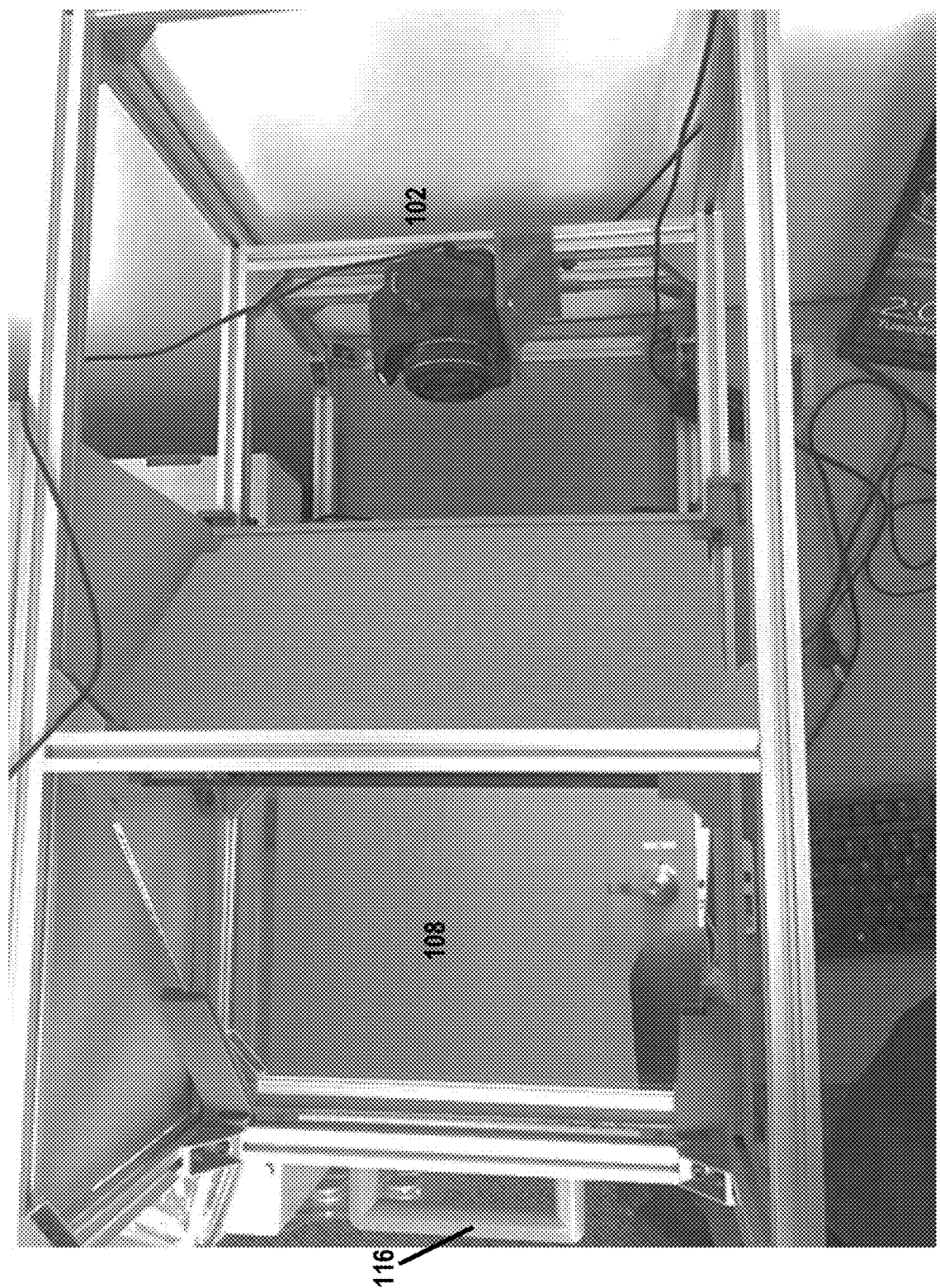
FIG. 3 illustrates a view of the apparatus of FIG. 1 from above

FIG. 3 illustrates a view of the apparatus from above. Camera 102 is on the right side, and mirrors 108, 110 are on the left side. In FIG. 3 only top mirror 108 is visible. Handle 116 for drawer 114 is visible on the left.

Figure 4:
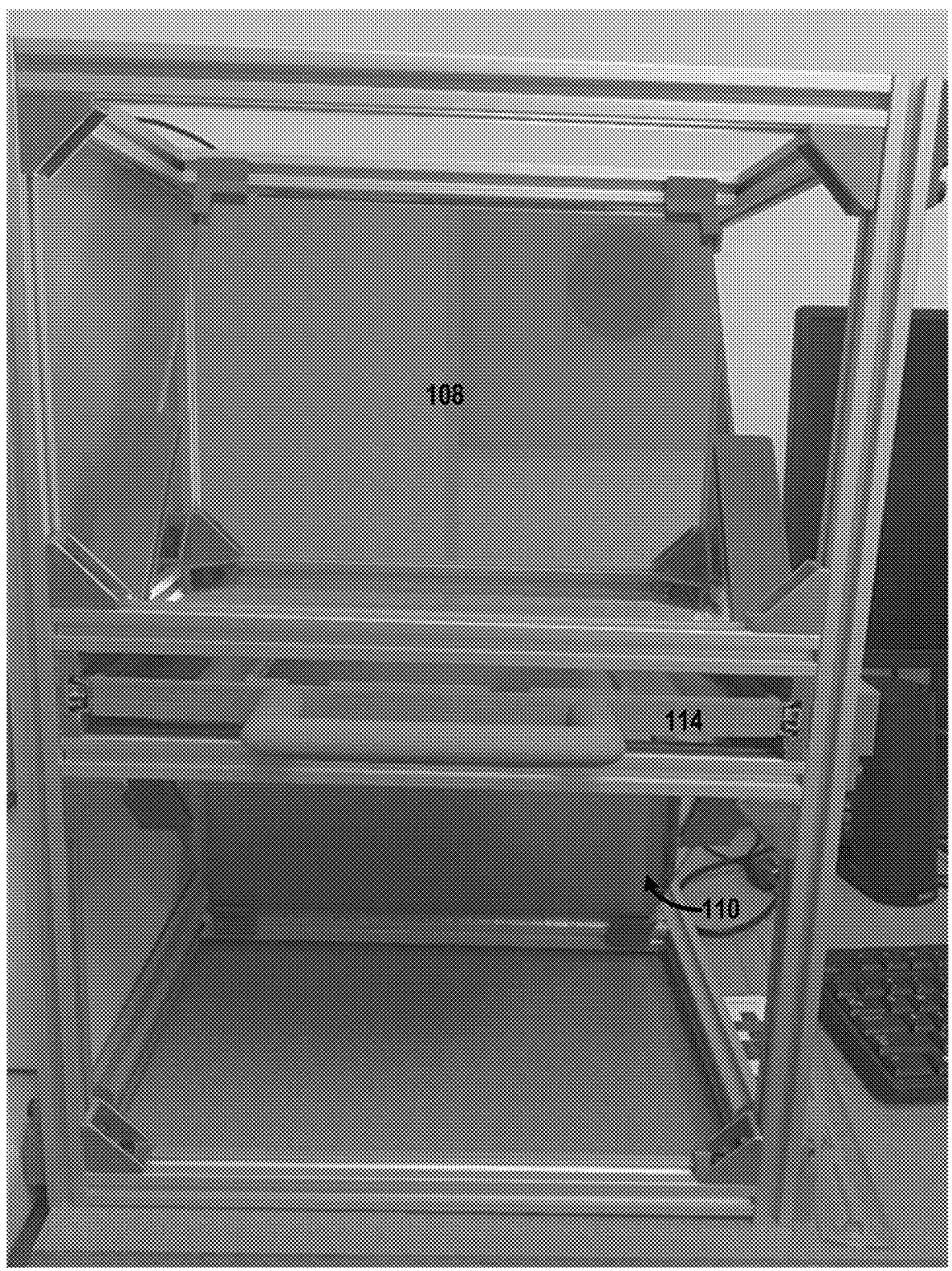
FIG. 4 illustrates a view of the front of the apparatus of FIG. 1 with the drawer closed.
Figure 5:
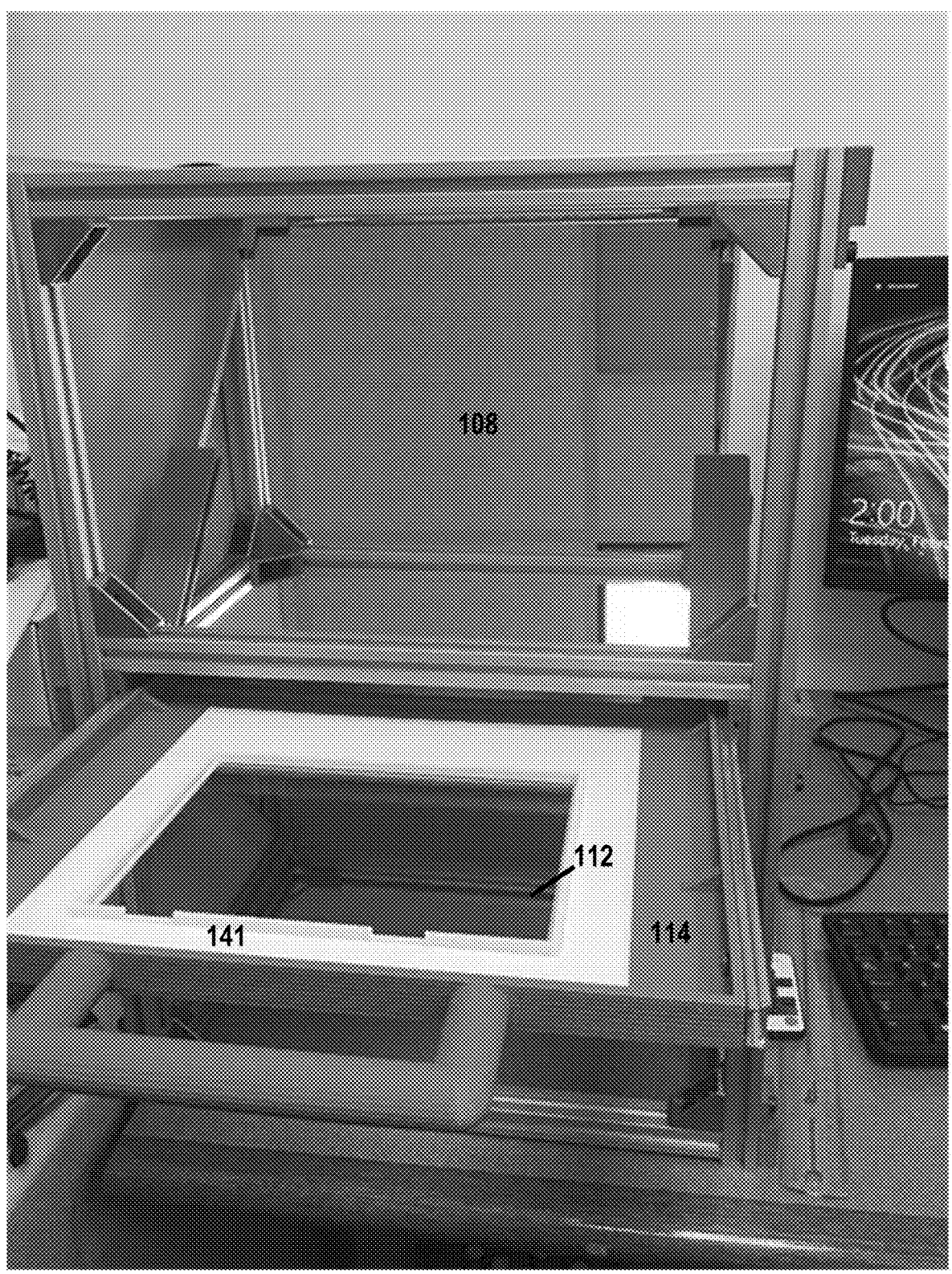
FIG. 5 illustrates a view of the front of the apparatus of FIG. 1 with the drawer open.

FIG. 4 illustrates a view of the front of the example apparatus for simultaneous image capture with the drawer closed. Shown are the two mirrors 108, 110 with drawer 114 positioned between them. Similarly, FIG. 5 illustrates a view of the front of the apparatus for simultaneous image capture with the drawer open. Visible are top mirror 108 and glass window 112 in the middle of drawer 114.

Figure 6:
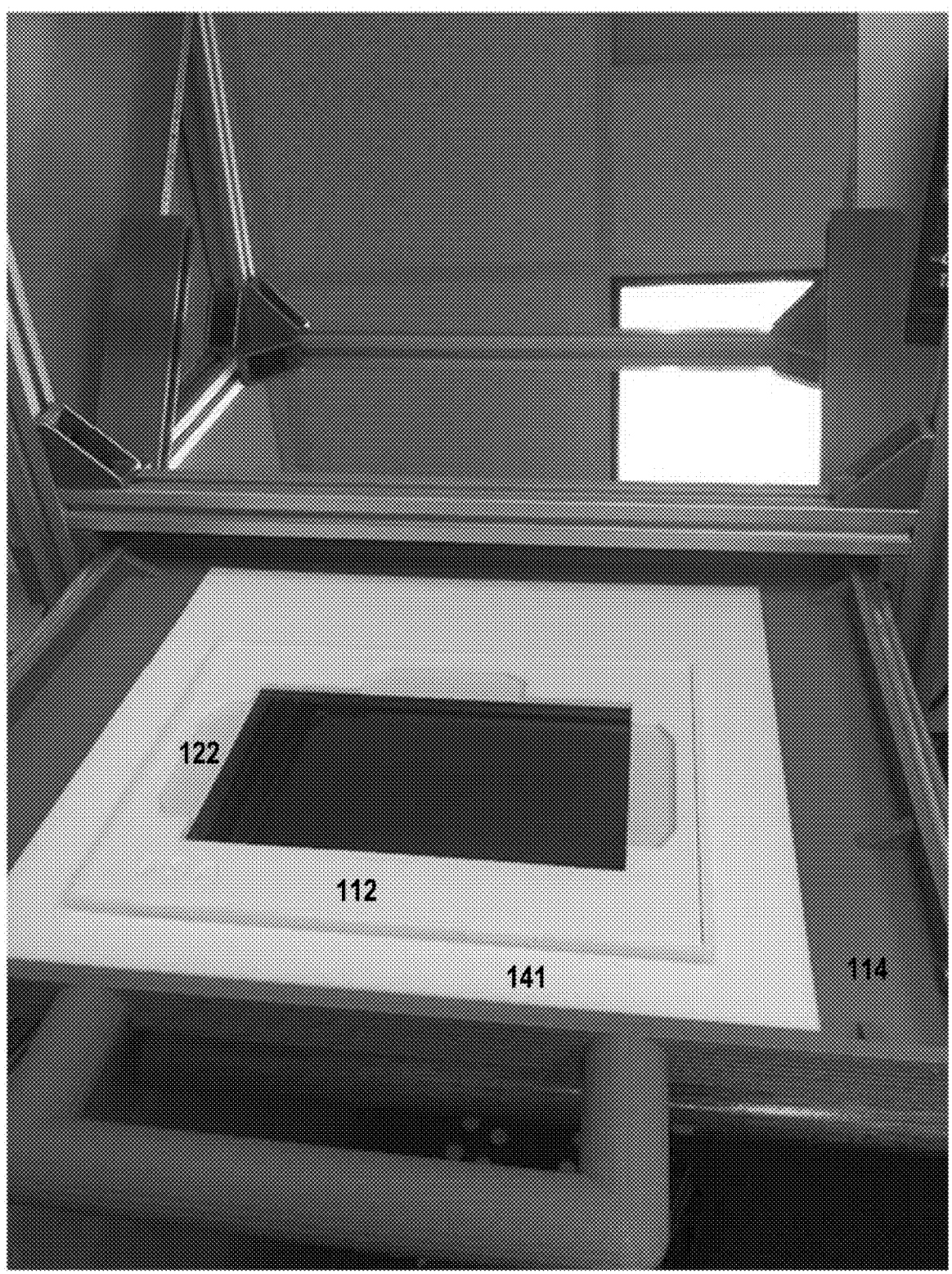
FIG. 6 illustrates a view of the front of the apparatus of FIG. 1 with a template placed on the glass window in the drawer, according to some embodiments.

FIG. 6 illustrates a view of the front of the example apparatus with a template 122 placed on glass window 112 in drawer 114. In embodiments, there may be several templates that may be used with the example apparatus, each template being specific to a particular type, or sub-type, of object. In some embodiments, the template may have markings (e.g., a bar code) or other indicia that allow a connected camera-controlling computer to associate with a certain size target object and its relative location within the upper surface of drawer 114. In such embodiments, when a particular template is known by the computer, such as, for example, by a user entering its type into the computer, or, by scanning the template with a reader or other input device, software running on the computer may use this information to register the image properly prior to acquiring the simultaneous images, as well as for cropping purposes once the images have been acquired.

Figure 7:
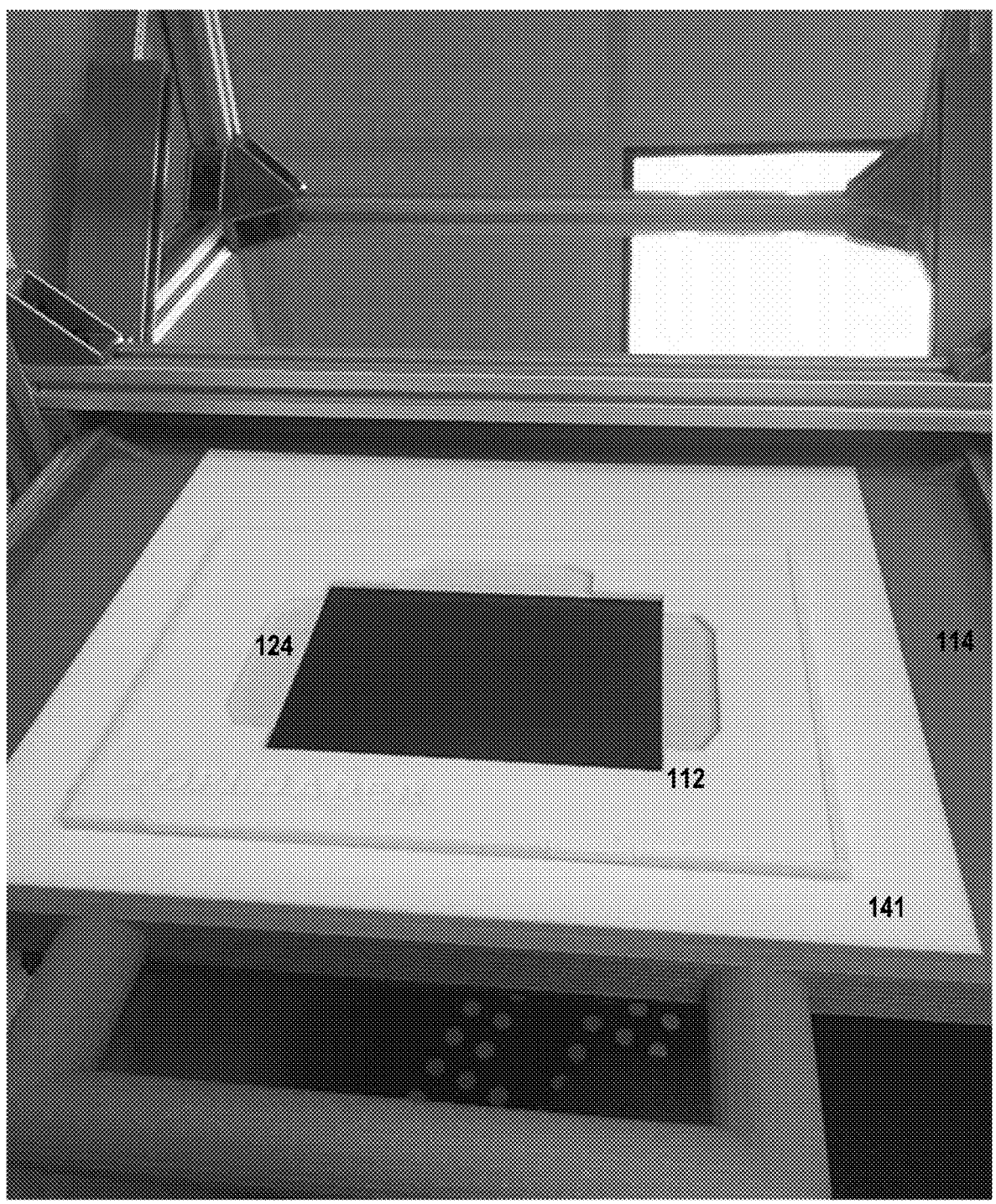
FIG. 7 illustrates the apparatus shown in FIG. 6 with a different size template.

FIG. 7 illustrates a view of the front of the example apparatus for simultaneous image capture with a different size template 124 ("toploader") placed on glass window 112 in drawer 114. In embodiments, to operate the simultaneous image capturing device, an operator may first slide open drawer 114, as shown in FIG. 5. The operator may then place a template on glass window 112 in the middle of drawer 114, as is illustrated in FIG. 6. It is here noted that template 122, or 124, may have a locking mechanism to drawer insert 141. Thus, in FIG. 5 are seen notches where the teeth of the template may lock into drawer insert 141 to ensure that the template is positioned correctly. In this manner, in embodiments, software in a connected computer, for example, may know where the target object should be within any image.

Figure 8:
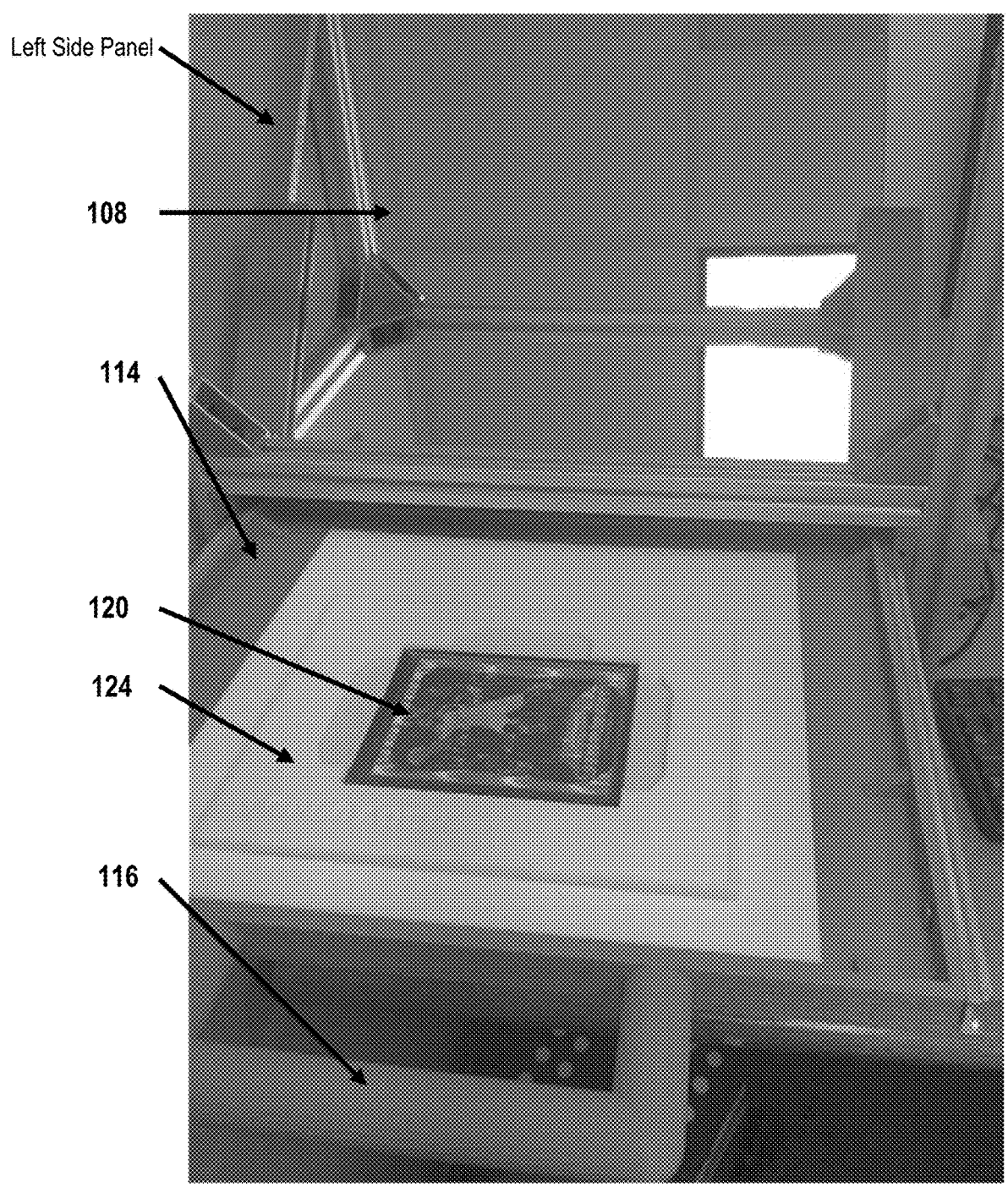
FIG. 8 illustrates a view of the front of the apparatus of FIG. 1 with a target item placed on the glass window.
Figure 9:
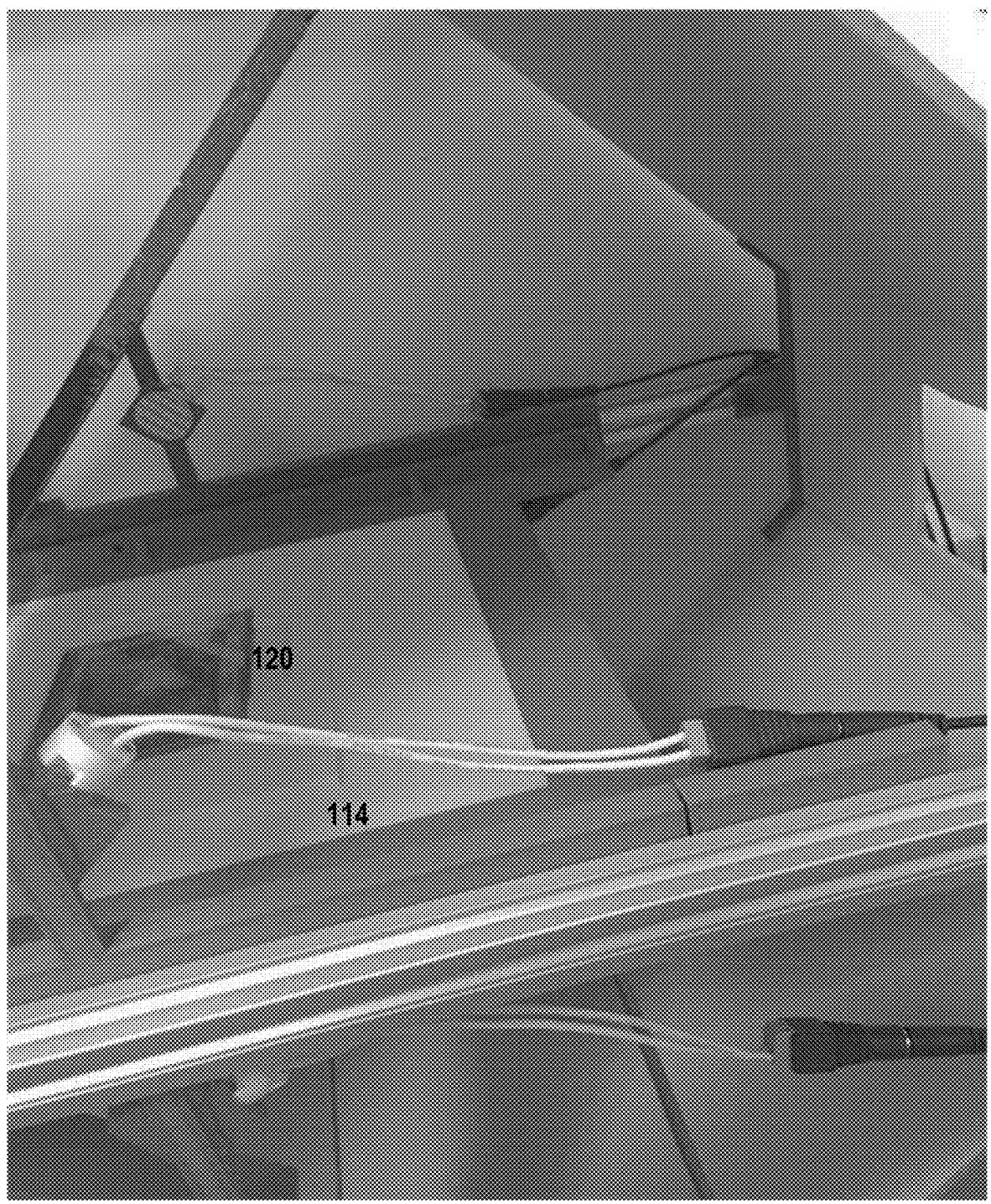
FIG. 9 illustrates a view of the inside of the lighted box (chamber) of the apparatus of FIG. 1 with the drawer closed and a target item placed on the drawer.

FIG. 8 illustrates a view of the front of the example apparatus for simultaneous image capture with target item 120 placed on glass window 112 of drawer 114. As further shown, drawer 114 may be provided with a handle 116, by means of which an operator may open and close drawer 114. In alternate embodiments, drawer 114 may also be opened by a computer, in the manner of a disc drive or CD drive, which would also require additional hardware for a motor and control circuitry. FIG. 9 illustrates a view of the inside of the lighted box (chamber) of the apparatus with the drawer closed following the state shown in FIG. 8.

Figure 10:
FIG. 10 illustrates a cross section of the apparatus with a side of the lighted box removed.

FIG. 10 illustrates a side view of the example apparatus with one side of the lighted box removed. Here target item 120 is positioned for image capture. In embodiments, once a desired template is positioned in the drawer, an operator may place the desired target item on the glass, as illustrated in FIG. 8, described above. The operator may then close the drawer, which is the situation as shown in FIGS. 9 and 10.

Figure 11:
FIG. 11 illustrates a view of the inside of the lighted box (chamber) of the apparatus with the lights turned on to improve the quality of an image to be acquired.

FIG. 11 illustrates a view of the inside of the lighted box (chamber) 106 of the apparatus with lights turned on to improve the quality of the images to be obtained. In embodiments, an operator may turn on the lights in the lighted box to prepare for capturing the image, as illustrated in FIG. 11.

Figure 12:
FIG. 12 illustrates a field of view of the camera.

FIG. 12 illustrates the field of view of camera 102 of the apparatus for simultaneous image capture, as possibly rotated by 90 degrees counter-clockwise. FIG. 12 shows what the camera sees via reflections in the mirrors angled at 45 degrees above and below the horizontal plane of drawer 114. In embodiments, an operator may then capture an image, as shown in FIG. 12, using the camera. It is noted that in the middle of the image of FIG. 12 a cross section of drawer 114 is seen. As noted, the images of the target item, visible on the top and bottom of FIG. 12, are actually reflections in the upper and lower mirrors of the target item, as seen by the camera whose viewpoint is 180 degrees different than that of an operator inserting the target object in the drawer. Thus, the camera sees the reflection of the target object in the mirrors from behind the mirrors (relative to the viewpoint of an operator). The target object itself, in actuality, is lying flat on the drawer facing up with its top to the right of an operator and its left side (where any letters printed on it begin) closest to the operator at the front of the drawer. Thus, in FIG. 12 it can be seen that all of the text in the target item is inverted, due to the fact that the images seen here are reflections in a mirror seen from the opposite direction to the operator.

Thus, the image seen in FIG. 12 is from the perspective of what can be seen if one were standing behind the chamber looking through the aperture. Because the camera is turned on its side (as shown in FIG. 3) so that the long dimension of the camera is now vertical, the raw image that is captured would have the letter box horizontally oriented, and thus the image of FIG. 12 is rotated 90 degrees counter-clockwise. However, it is noted, some cameras detect that they are tipped on their side and automatically do this 90-degree rotation on their own. If camera 102 is such a camera, then the image seen in FIG. 12 is the one provided by camera 102, and no further rotation is necessary to obtain the image as shown in FIG. 12. In the middle of the field of view of the camera are seen the images of the drawer, but these are out of focus and somewhat difficult to see. This is because the camera is focused on what it can see in the mirrors, which happens to be the two sides of the target object. Since one set of mirrors between the camera and the target object may be used, the reflection causes everything to be inverted. An inversion (of what is already a reflection, which results in a normal view) and optional rotation and crop may further be applied to extract the images of both sides of the item.

In embodiments, to then capture the images of another target item, drawer may be slid out, the item may be swapped out, and optionally the holder template that sits on the glass window (illustrated in FIG. 8) may also be swapped out. Then the drawer may be slid back in, and another picture captured and processed based on the specifications of the holder template.

Figure 13:
FIG. 13 illustrates the view as seen in FIG. 12, after a vertical flip.

FIG. 13 illustrates a view of FIG. 12 after inversion to correct for the reflection of the mirrors. It is noted that inversion is sometimes known as a "vertical flip", or a flip of the image along a horizontal axis across the center.

Figure 14:
FIG. 14 illustrates the view of FIG. 13 after 90-degree rotation to the left
Figure 16:
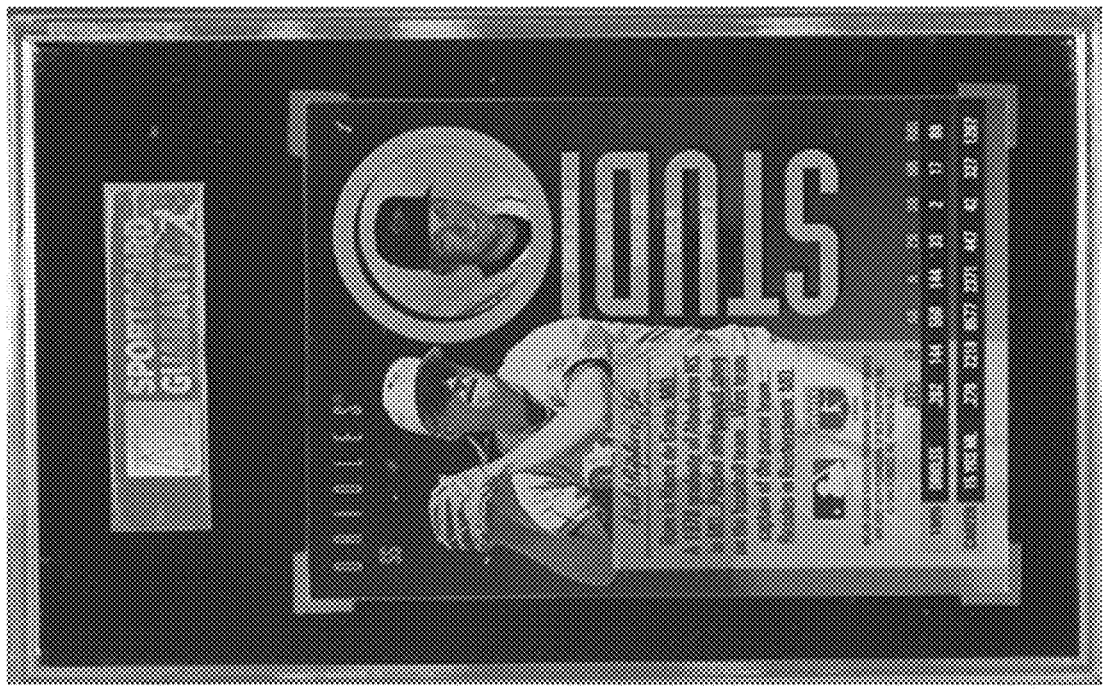
FIG. 16 illustrates a cropped version of the rear (left) image shown in FIG. 14, in accordance with some embodiments.
Figure 15:
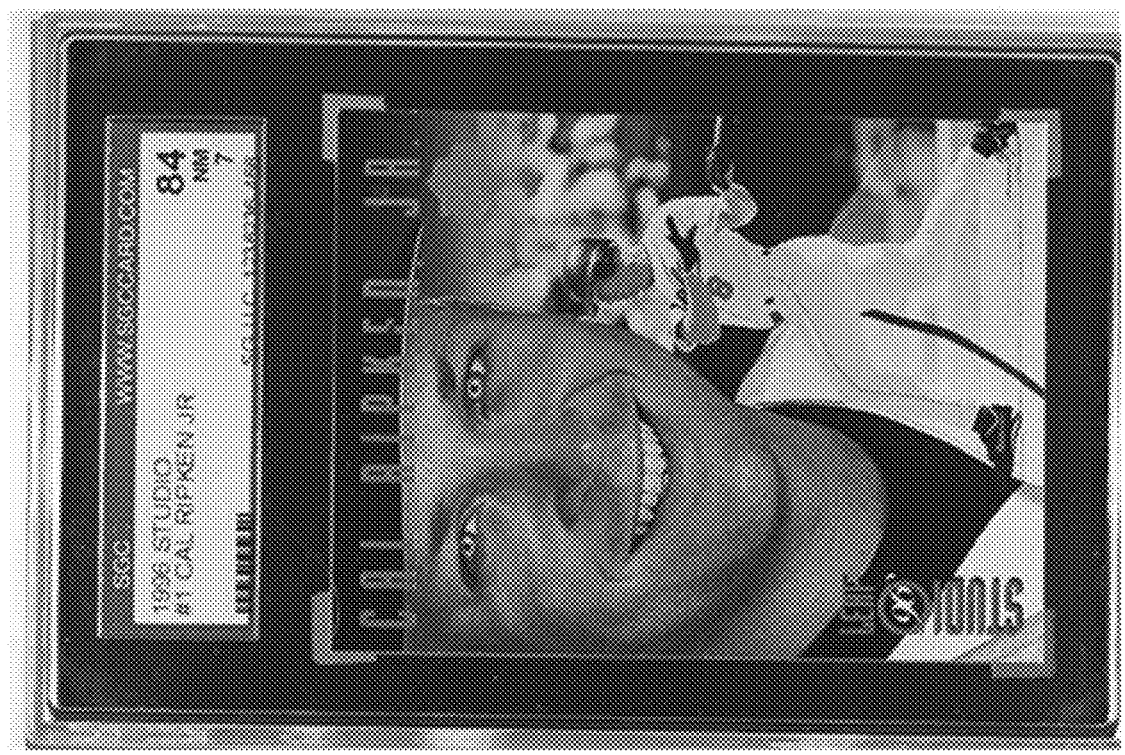
FIG. 15 illustrates a cropped version of the front (right) image shown in FIG. 14, in accordance with some embodiments.

FIG. 14 illustrates a view of FIG. 13 after a 90-degree counter-clockwise rotation, to make the images present side by side, following the vertical flip which resulted in FIG. 13, and FIGS. 15-16 illustrate cropped images from FIG. 14.

In embodiments, as noted, a computer may be used to process an acquired image by applying the following operations: first, a vertical inversion may be performed, so as to de-invert the text in the image of the reflection, the result of which is illustrated in FIG. 13. Second, a 90-degree counter-clockwise rotation may be performed, so as to make the front and back images vertical, the result of which is illustrated in FIG. 14. Third, the front image may be cropped out from the right side of the image. In embodiments, the dimensions and location to crop may be defined by the specified template, or, for example, they may be automatically detected based on analyzing the image, using, for example, edge detection or other image processing techniques and algorithms, as may be known. An example cropped front image is illustrated in FIG. 15. Fourth, and lastly, the back image may be cropped out from the left side of the image. It is noted that this is the same as the third operation, now operating on the back image. The results of this fourth operation are illustrated in FIG. 16.

Following all of this processing, matching front and back images of a target object are obtained that were simultaneously captured using a single image capture apparatus.

It is here noted that while the described embodiments use a single target item, in embodiments, techniques according to various embodiments are not limited to single target items. Such techniques may also be used to simultaneously capture images of multiple sides of multiple items simply by applying the techniques defined in U.S. Pat. No. 7,924,314 B2 "Bulk image gathering system and method," whose content is also incorporated herein in its entirety.

Figure 17:
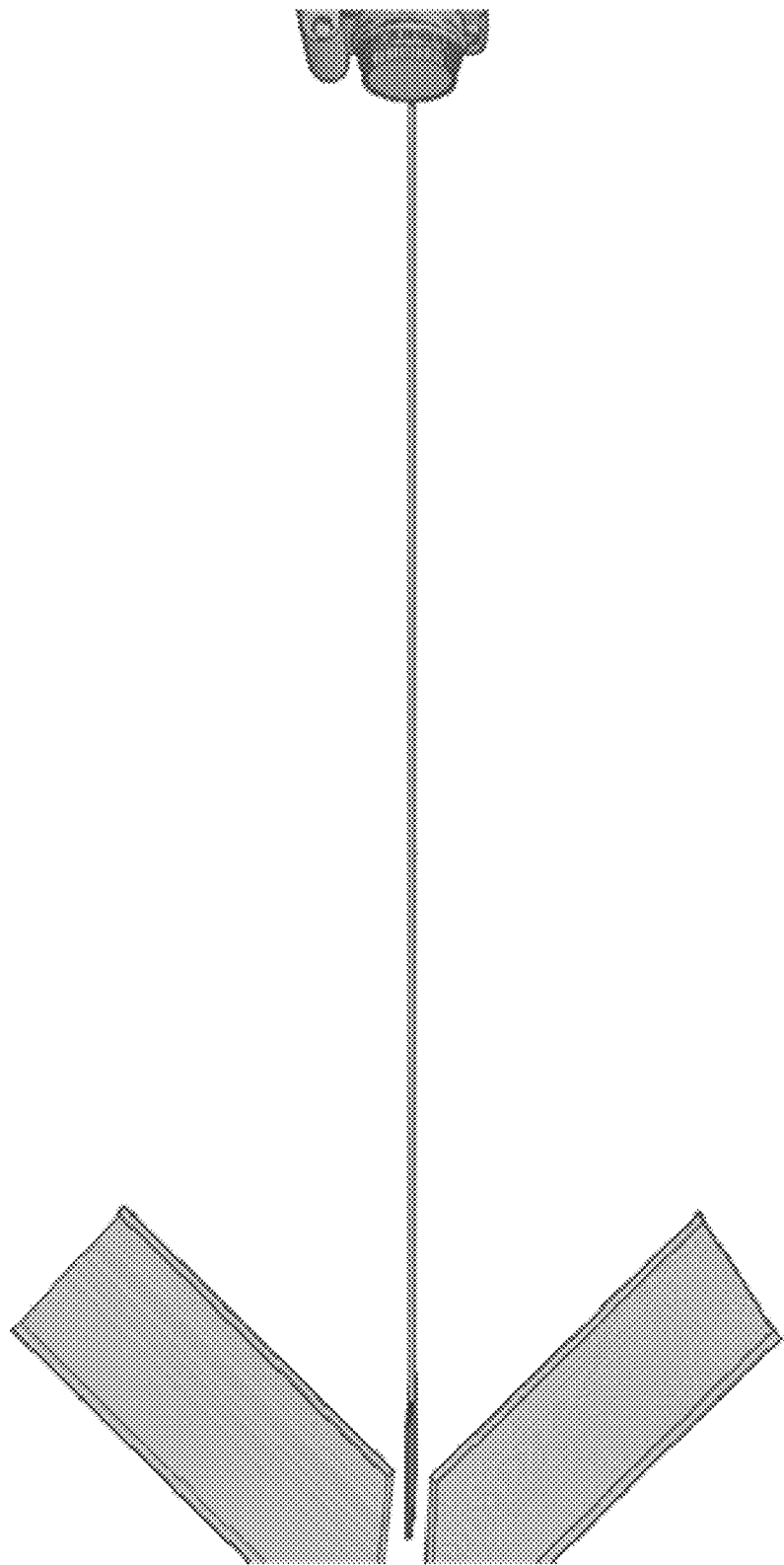
FIG. 17 illustrates an example schematic implementation of an apparatus for simultaneous image capture using two mirrors, in accordance with some embodiments.
Figure 18:
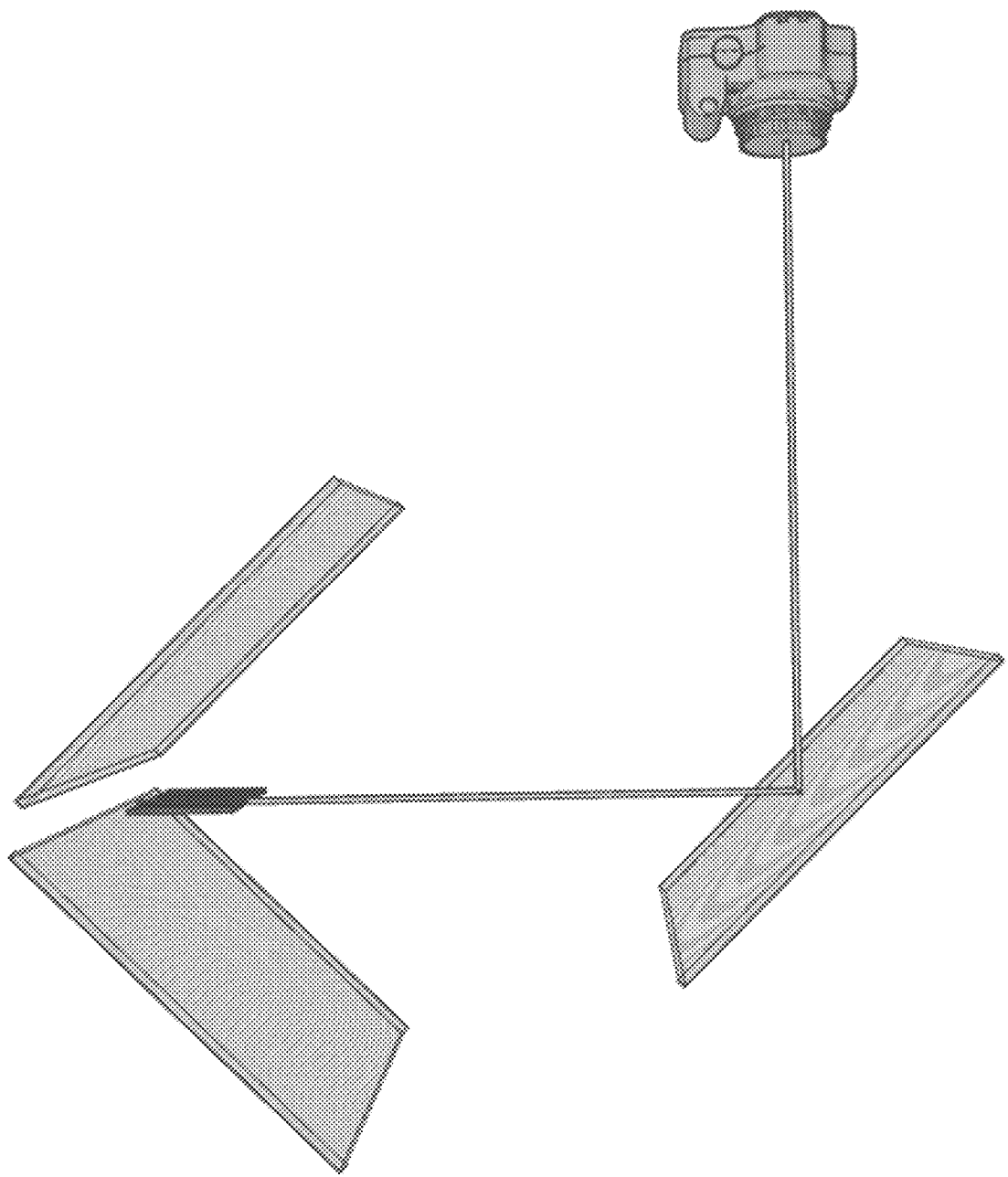
FIG. 18 illustrates an example schematic implementation of an apparatus for simultaneous image capture using three mirrors, in accordance with some embodiments.

FIG. 17 illustrates an example schematic implementation of an apparatus for simultaneous image capture using two mirrors, in accordance with some embodiments. As noted above, and as shown in FIG. 17, the two sides of a two-sided object, such as, for example, sports collectible card, are reflected in the two mirrors, and those reflections are captured using the camera. If, for reasons of space, or size and dimensionality of the apparatus, it is desired to provide the camera in a different relative location and orientation to the reflections of the target object in the mirrors, then, in embodiments, additional mirrors may be used to direct the simultaneous image. In that regard, FIG. 18 illustrates an example schematic implementation of an apparatus for simultaneous image capture using three mirrors, in accordance with some embodiments. In the embodiment of FIG. 18 the double image seen in the upper and lower mirrors is now once again reflected such that the camera placed at a significant vertical offset above the plane of the drawer (but at a smaller horizontal distance from the drawer) may capture it. In this example embodiment, because there is a third mirror, the simultaneously acquired images of front and back of the target object as captured by the camera need not be inverted further, as the third mirror already reinverts them to their original orientation. Thus, the camera in FIG. 18 would see and capture an image essentially as depicted in FIG. 13.

Figure 19:
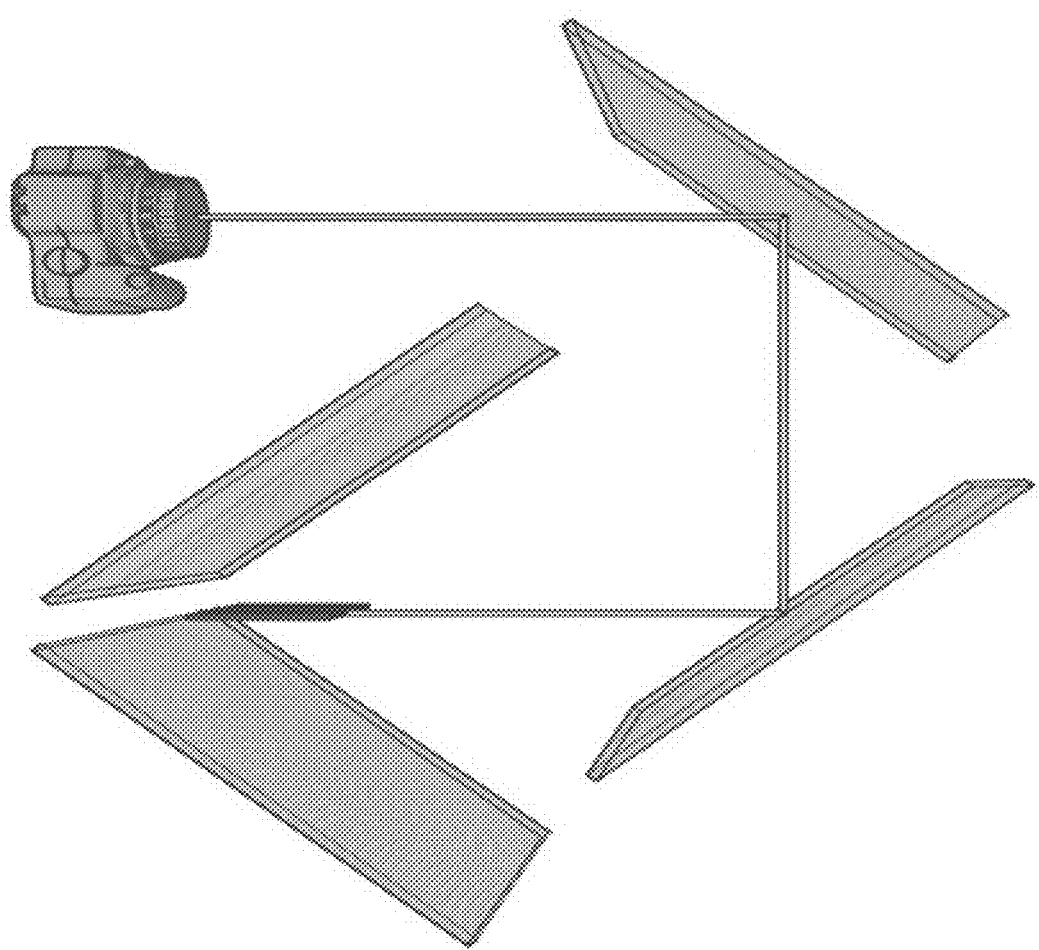
FIG. 19 illustrates an example schematic implementation of an apparatus for simultaneous image capture using four mirrors, in accordance with some embodiments.

FIG. 19 illustrates an example schematic implementation of an apparatus for simultaneous image capture using four mirrors, in accordance with some embodiments. This example embodiment allows the camera to be on the same side of the apparatus as the drawer. Because the simultaneously captured image in the upper and lower mirrors between which the target object is positioned is now reflected twice, the image captured by the camera in FIG. 19 is, as in the case of FIGS. 1-17, is inverted, being a reflection. In the case of FIG. 19, it is a reflection of a reflection of a reflection. The example embodiment of FIG. 19 allows for a tall but not deep overall apparatus footprint, with both the camera and its mounting assembly, and the drawer into which the template and target object are placed, to be on the front of the apparatus.

FIGS. 20-50, next described, illustrate an alternate embodiment of a simultaneous image capture apparatus to that of the embodiment illustrated in FIGS. 1-19, in accordance with some embodiments.

Figure 20:
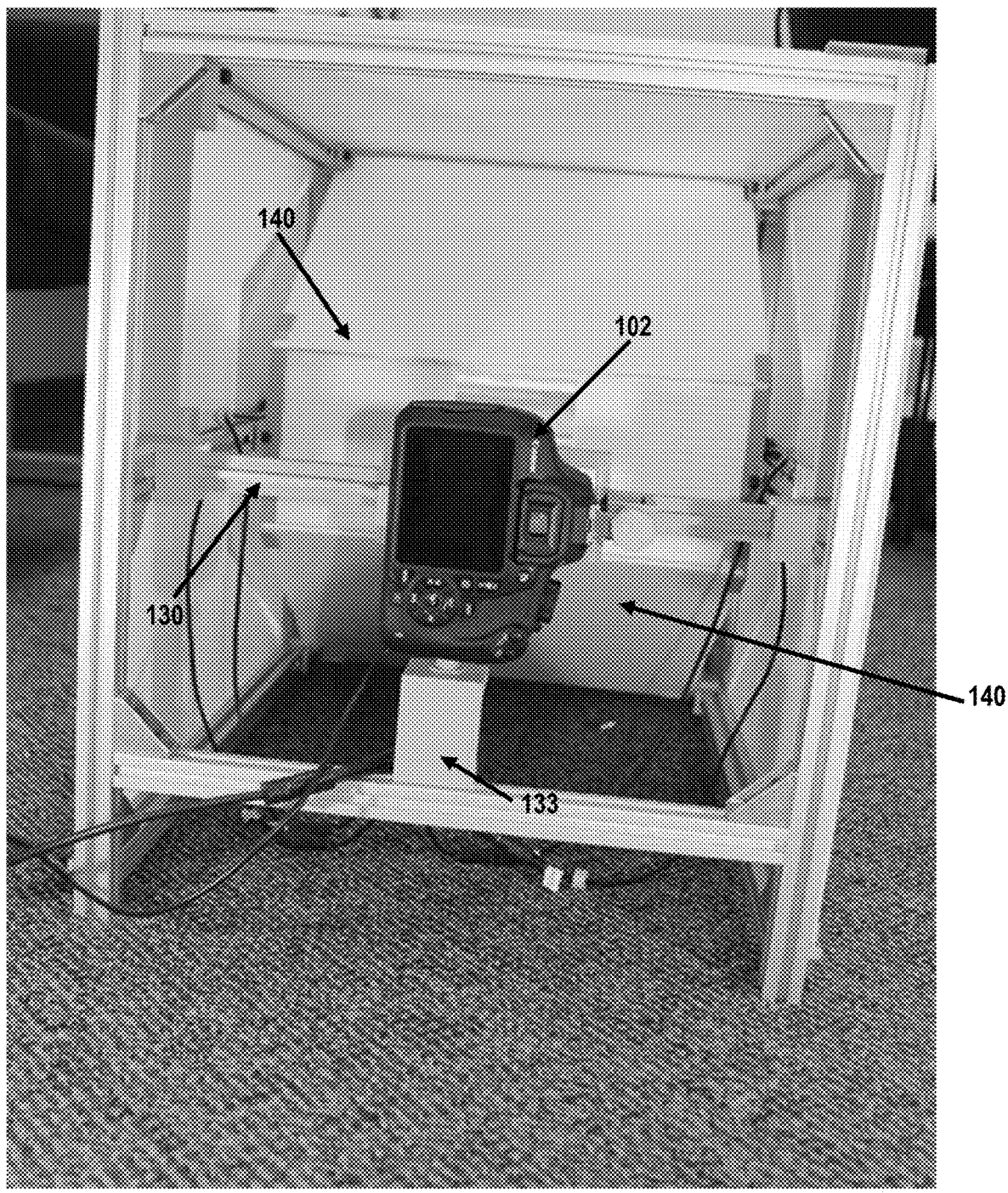
FIG. 20 illustrates a rear view of an alternate simultaneous image capture apparatus, showing a camera mounted on a horizontal printed lens mount arm.

FIG. 20 illustrates a rear view of an alternate simultaneous image capture apparatus, showing a camera 102 mounted on a horizontal printed lens mount arm 130. The camera may be, for example, a Canon EOS Rebel T5 DSLR camera, as shown, or the like. In embodiments, any camera 102 that can take photos at 18 megapixels (MP) and that can use a lens such as a Canon EF 40 mm f/2.8 STM lens, may be appropriate. It is here noted that the benefit of lenses such as the Canon EF 40 mm f/2.8 STM lens is their significant flatness.

FIG. 20 illustrates camera 102 mounted on printed lens mount arm 130. It is noted that, as used herein, "printed" refers to manufacturing of a component or element using a 3D printing process. Bottom camera shim 133 may be used to control the vertical motion of camera 102. Also shown are internal baffles 140, appearing behind the camera. Internal baffles 140 may be used to control the color of light that may illuminate a target object. and what the mirrors see as reflections. In embodiments, camera 102 may be powered by a power cable, such as, for example, a Kapaxen ACK-E10 Power adapter for Canon T5, or the like.

Figure 21:
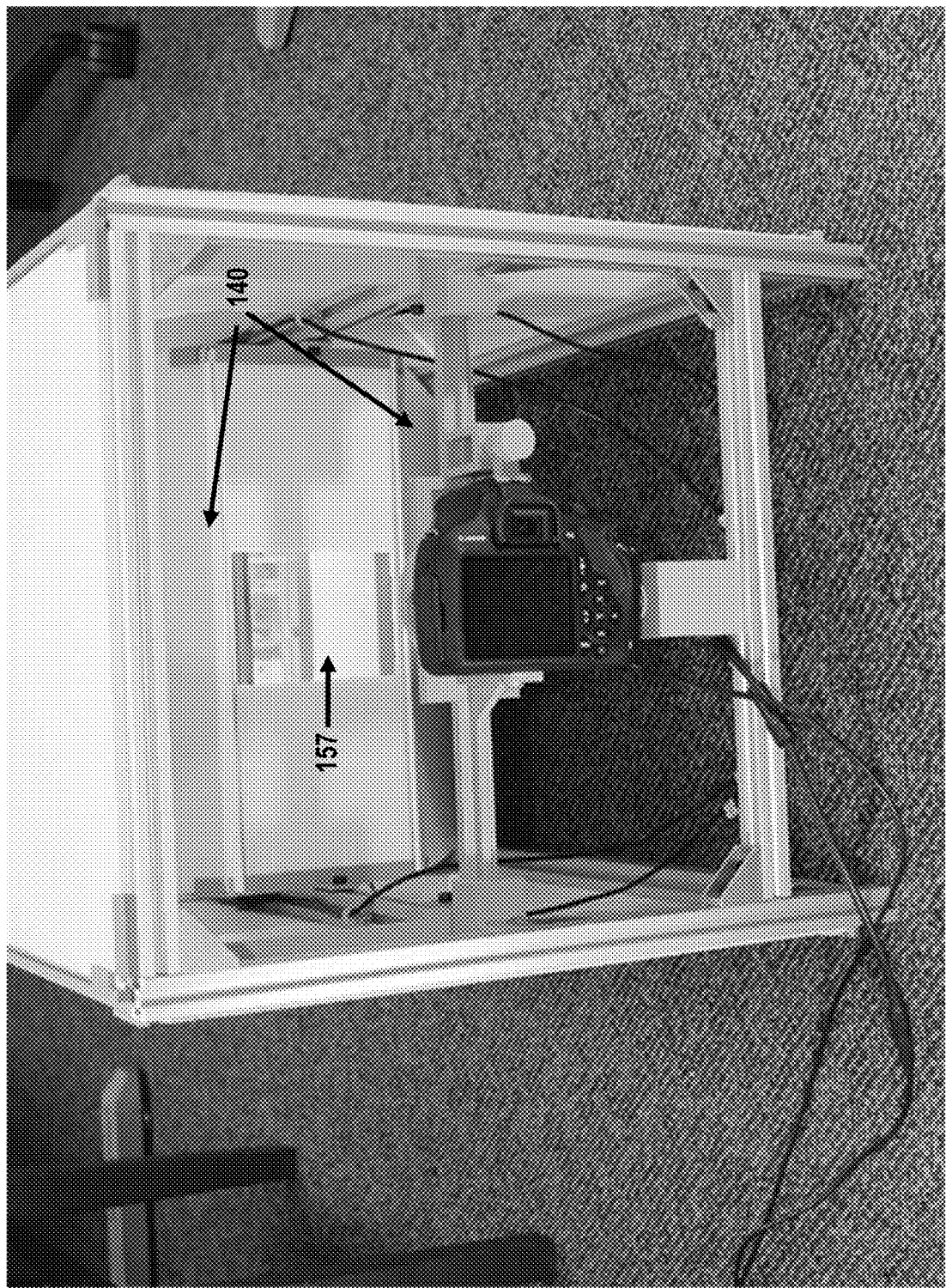
FIG. 21 illustrates an alternate view of FIG. 20.

FIG. 21 illustrates an alternate rear view of the alternate image capture apparatus of FIG. 20. The view is taken from a viewpoint that is higher than, and at a farther distance behind the image capture device, than the viewpoint of FIG. 20. With reference to FIG. 21, visible in the figure are baffles 140 and aperture 157, through which the lens of camera 102 acquires light reflected from two mirrors provided at the front of the apparatus that contain top and bottom images of an object to be imaged, as described above. Detail of the mounting of the mirrors at a front end of the image capture device is described in detail below.

FIGS. 22 through 25 illustrate additional details of the camera mounting system provided at the rear of the alternate apparatus. These figures are next described.

Figure 22:
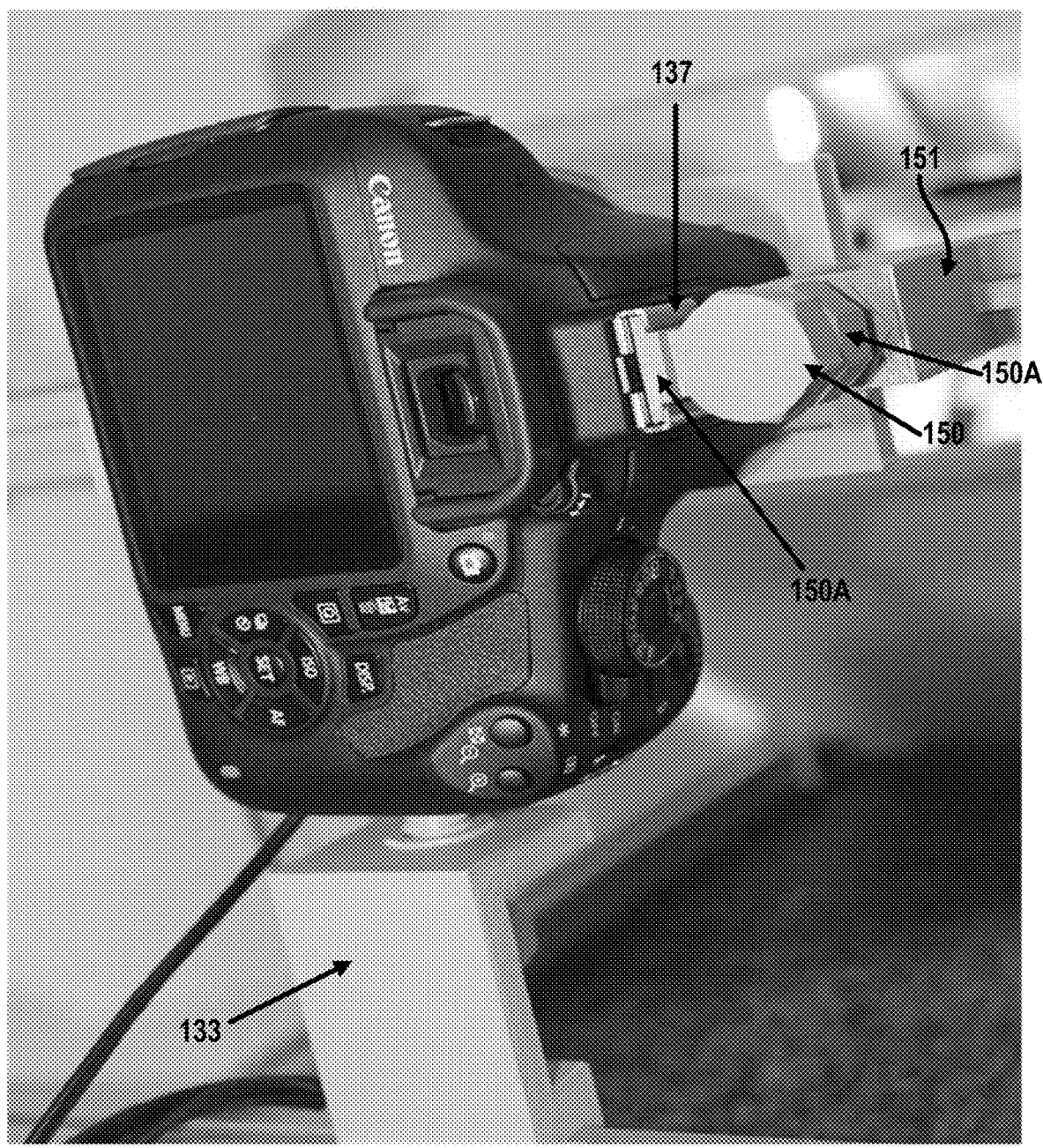
FIG. 22 illustrates a close up rear view of the camera of FIG. 20 as mounted on a horizontal lens arm.

FIG. 22 illustrates a close up rear view of camera 102 as mounted on horizontal lens arm 130. In embodiments, this mounting is implemented as follows. Screw 150 provided at the top of the mounting assembly may protrude through a custom printed mount 150A provided on hot shoe 137 of camera 102. Custom printed mount 150A was created to use the camera's hot shoe for alignment of the camera in the example apparatus. Screw 150 allows for fine adjustment of left and right positioning of camera 102. Screw 150 may be attached, via, for example, a nut and/or bolt, to mounting housing 151, which is integrated into lens mount arm 130, as seen in FIG. 24.

Figure 23:
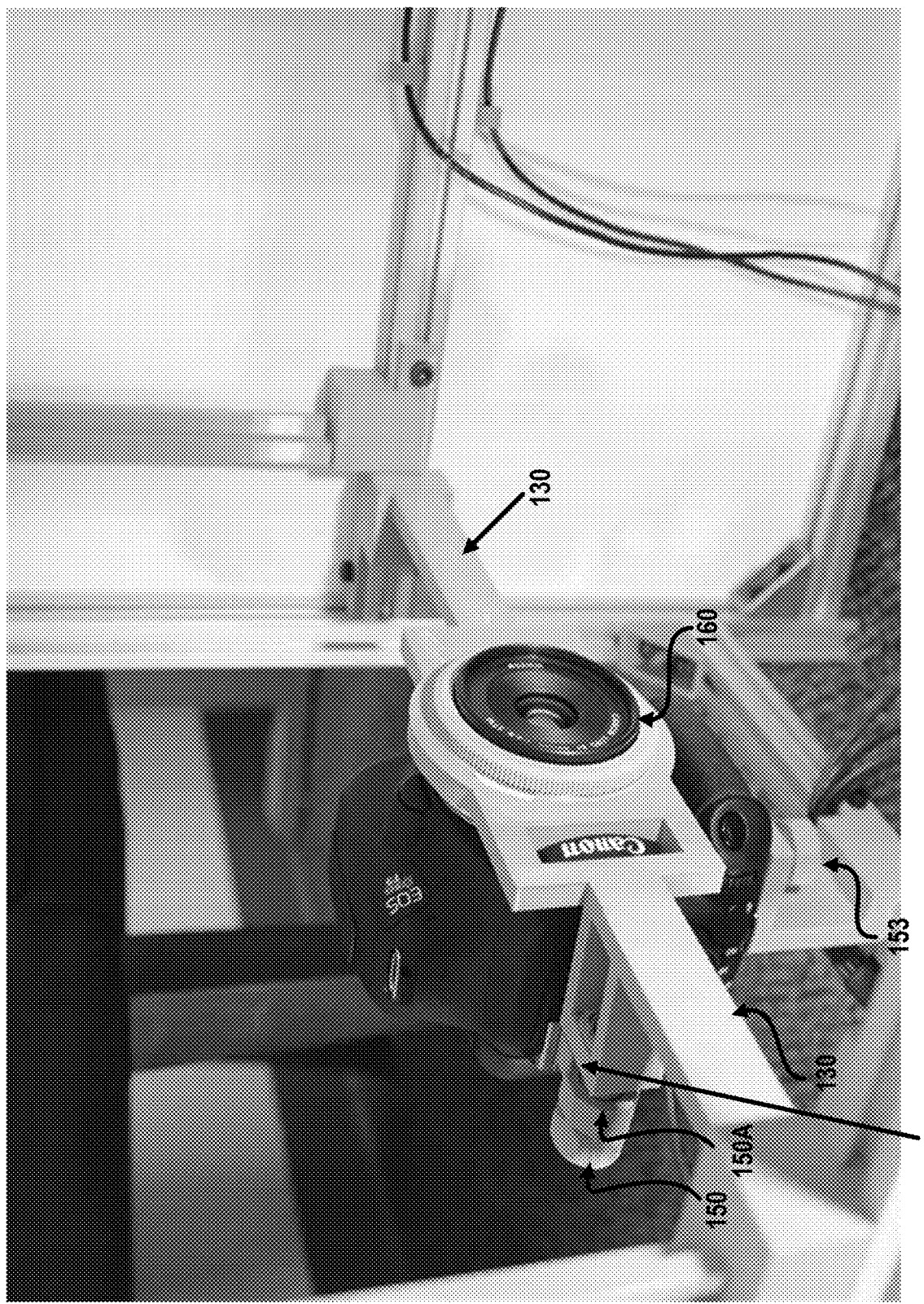
FIG. 23 illustrates a close up front view of the camera of FIG. 20 as mounted in a lens mount arm.

FIG. 23 illustrates a close up front view of the camera of FIG. 20 as mounted in lens mount arm 130. As shown, lens 160 is positioned in the center of lens mount arm 130. Fine tuning may be done with screw 150 at the hot shoe, as well as screw 153 at the bottom of camera 102.

Figure 24:
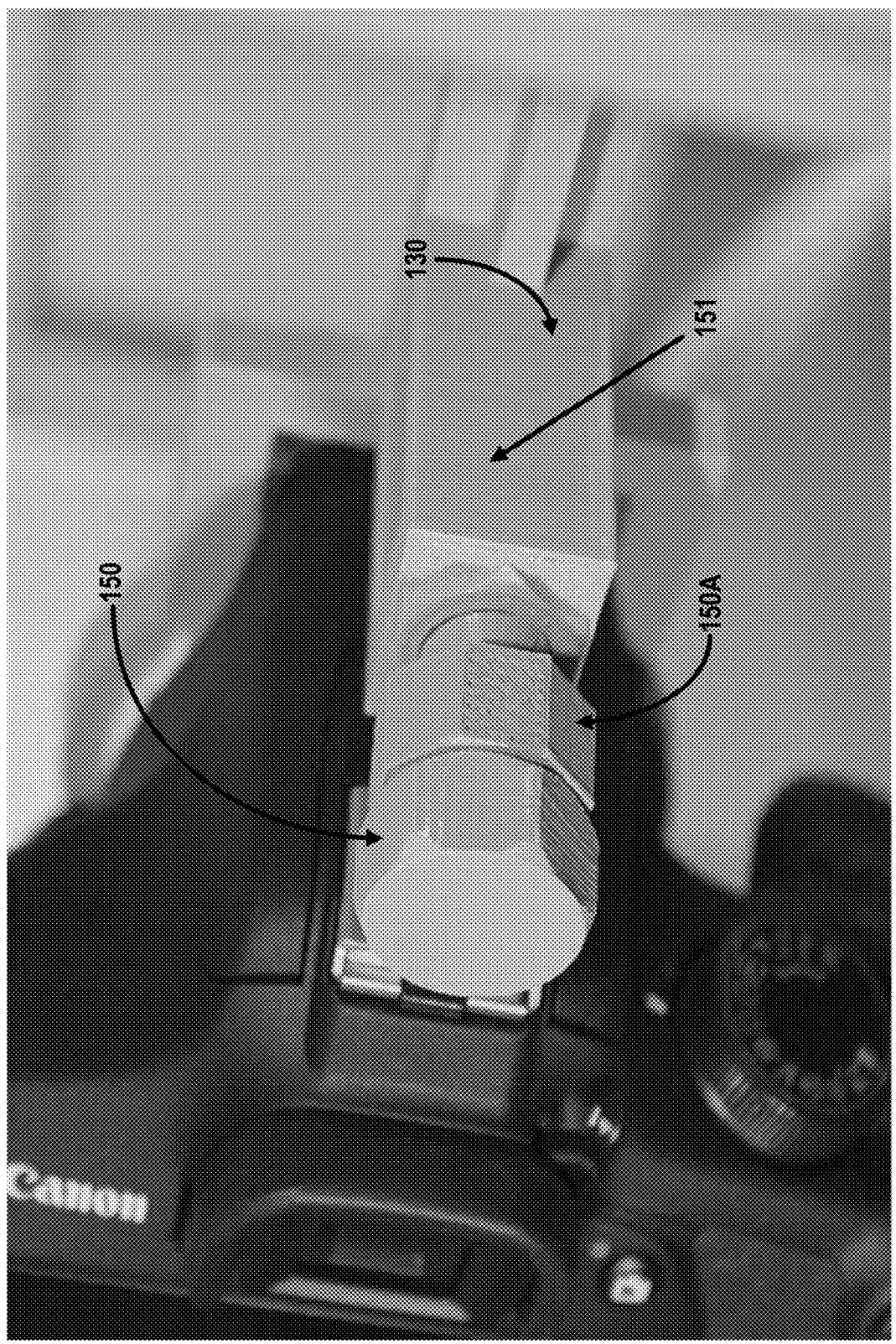
FIG. 24 is a rear view close up of the camera mount of FIG. 23.

FIG. 24 is a rear view close up of the hot shoe camera mount of FIG. 23. Printed screw 150 passes through custom printed hot shoe mount 150A, then threads into mounting housing 151, which may be integrated into the lens mount arm 130. Turning screw 150 allows for fine left and right adjustments of the position of the camera. By adjusting the camera, both left and right, as well as vertically, the view of the camera may be centered on the images seen in the two mirrors. In this connection it is noted that if there are slight imperfections in the planarity of the mirrors, or they are not fully symmetric, the images in the mirrors, as seen by the camera, will not be symmetric either. In embodiments, this may be cured in software, but may also be remedied by changing the position of the camera, if needed.

Figure 25:
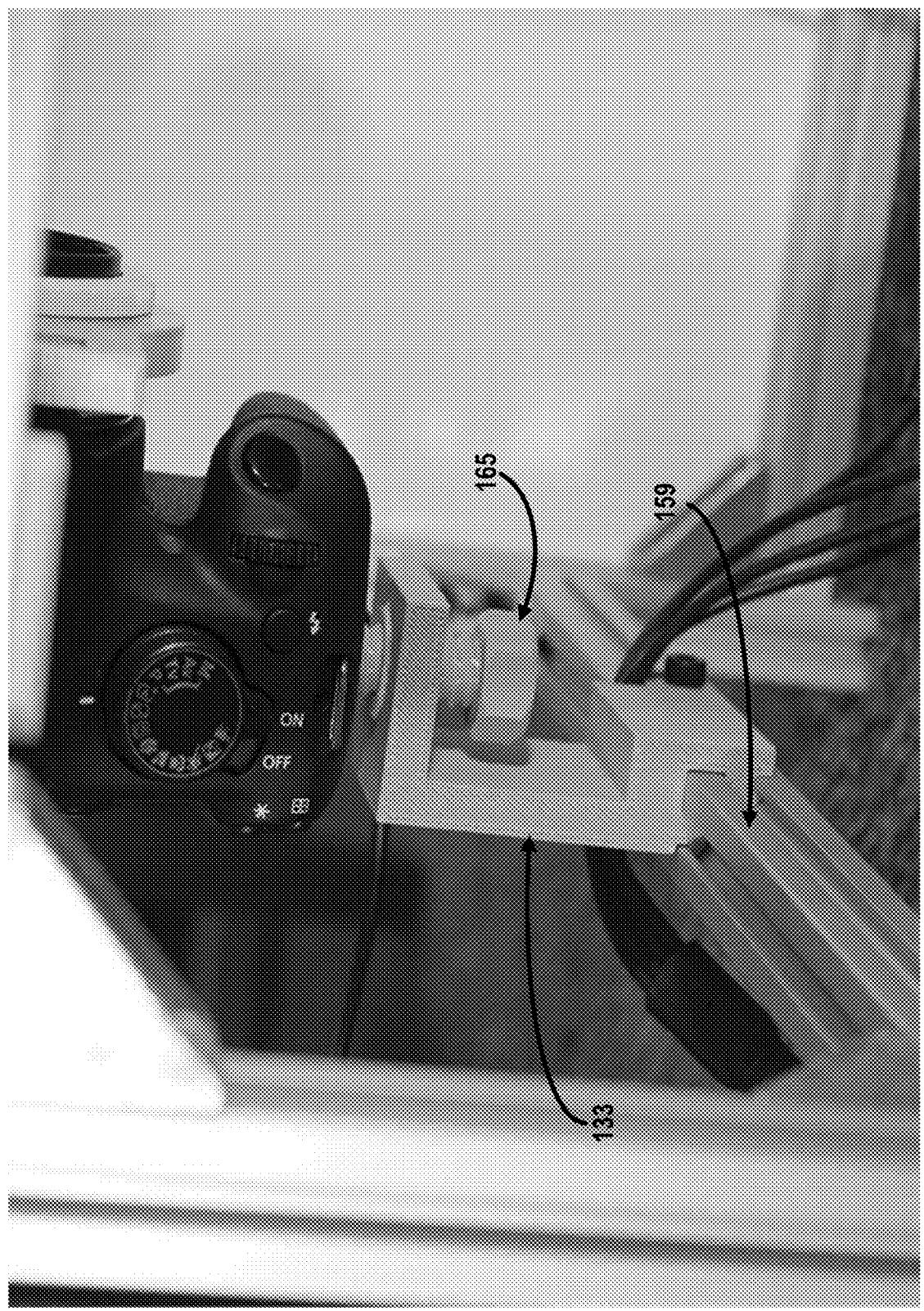
FIG. 25 is a front view close up of the camera shim mount as shown in FIG. 24 on a v-slot extrusion.

FIG. 25 presents a front view close up of the lower left portion of the view of FIG. 24. Shown in FIG. 25 are camera shim mount 133 provided on a v-slot extrusion 159. In embodiments, camera shim mount 133 may be centered under the camera body. Screw 165 allows for adjustment of the up/down tilt of the camera, as well as to keep the camera's lens in a vertical plane perpendicular to the horizontal plane in which the target object is provided. It is also noted that the weight of camera 102 tends to make the camera body sag down, and the camera shim mounting system can, in embodiments, eliminate that sag.

FIGS. 26 through 42, next described, illustrate elements and functionality of the front portion of the alternate apparatus of FIG. 20.

Figure 26:
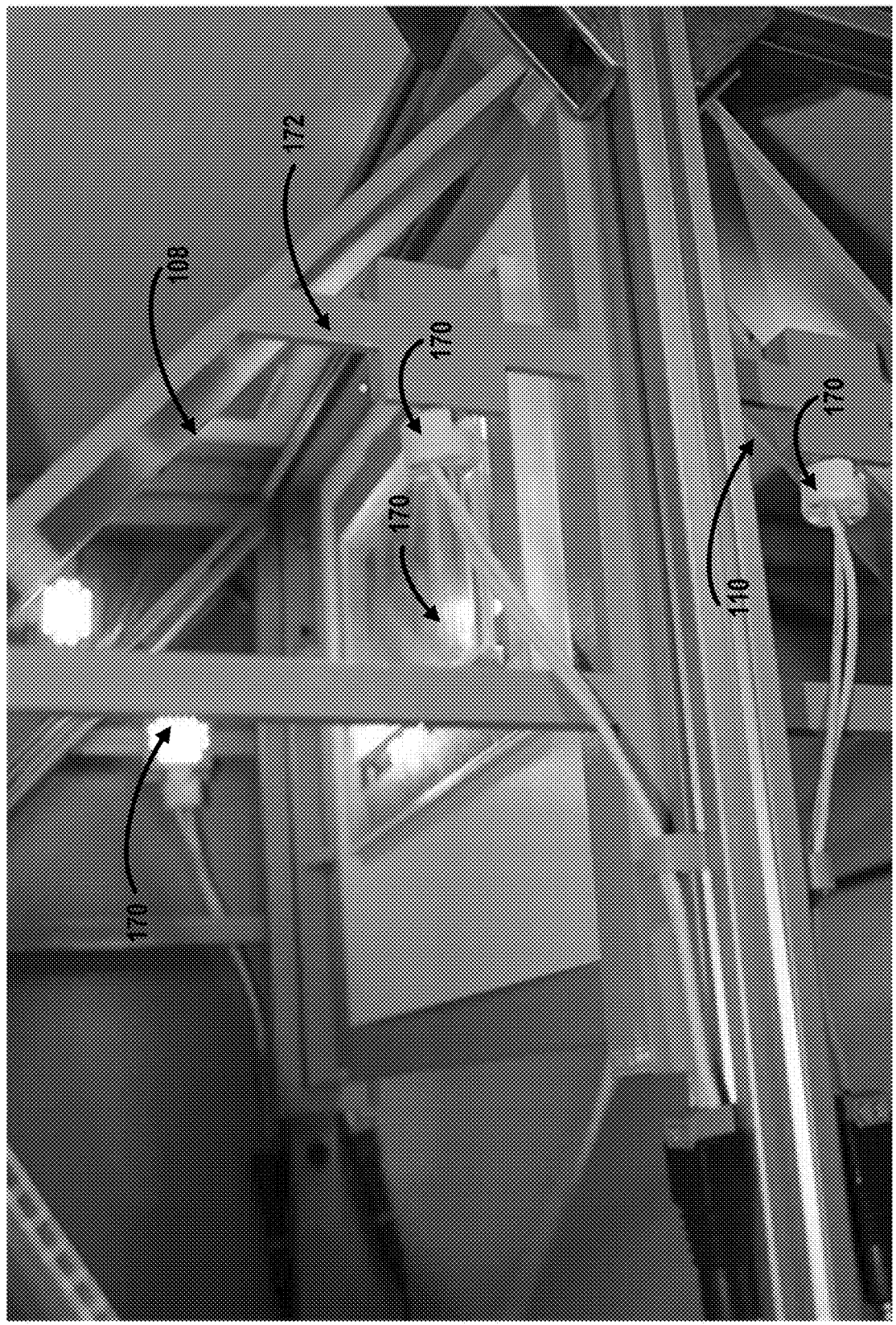
FIG. 26 illustrates an open side view of the alternate simultaneous image capture apparatus of FIG. 20, showing a closed drawer with a slabbed card in position, upper and lower mirrors and several LEDs.
Figure 27:
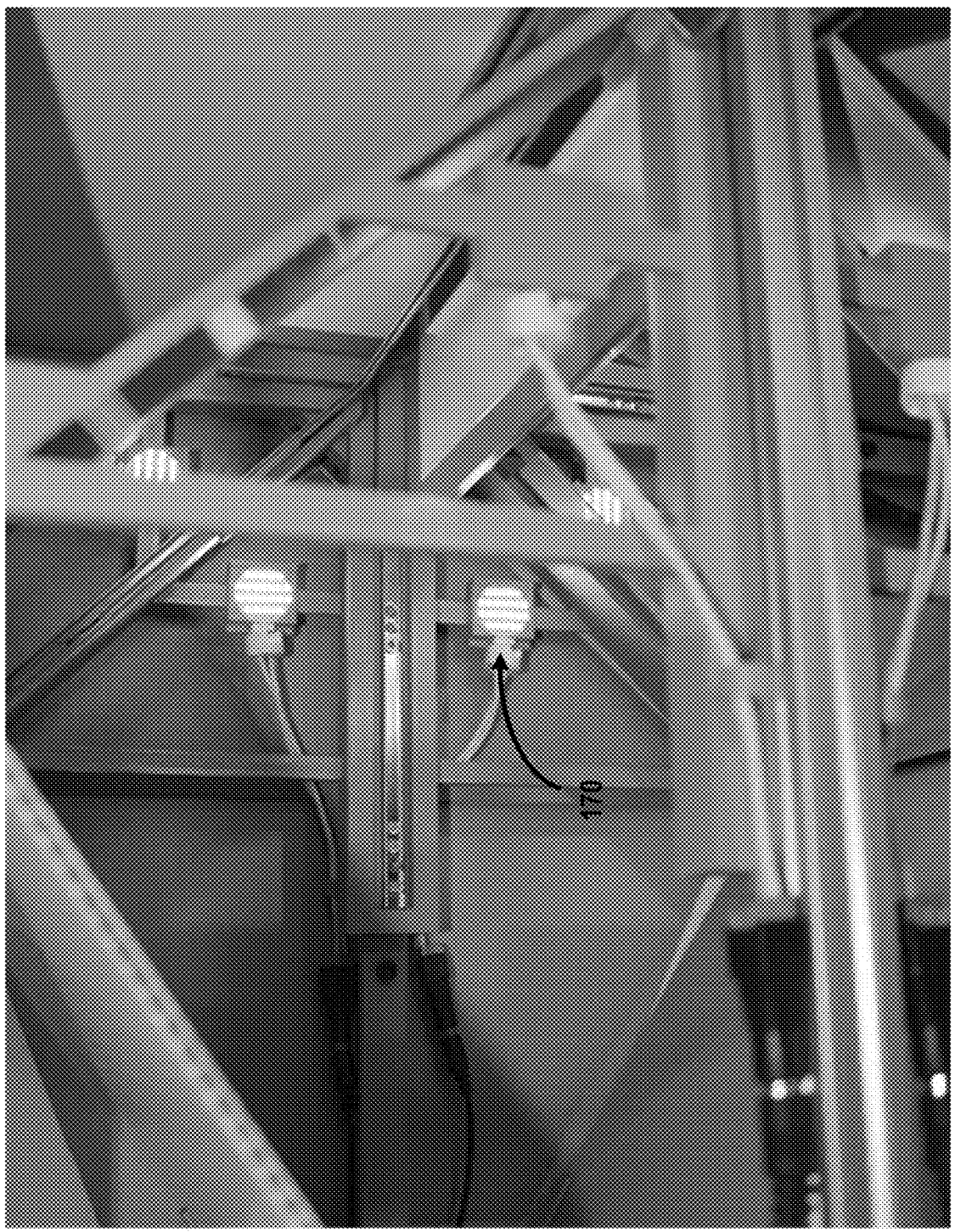
FIG. 27 is an alternate view of FIG. 26, with the drawer in the open position.

FIG. 26 illustrates an open side view of the alternate simultaneous image capture apparatus of FIG. 20, showing a closed drawer with a slabbed card in position, upper and lower mirrors 108 and 110, and four LEDs 170, respectively mounted on the side frames. In embodiments LEDs 170 may be provided. In embodiments, LEDs 170 may be provided one on top, and one on the bottom, of each side frame 171. In embodiments, they may be placed where they best illuminate the target object. In the example of FIG. 26 they are placed about half way up the side frames 172. It is noted that the rear bottom LED is seen only through the clear surfaces of the template and card slab, and there is a reflection in the upper mirror 108 of upper rear LED 170. In embodiments, LEDs 170 may comprise G4 24 SMD Spot LED Pure White 6000-6500K LEDs, for example. In the example of FIG. 27, the following associated components were used: G4 ceramic socket and wires, 12V Male 2.1×5.5 MM DC Power Cable Jack adapter, ½ Meter 5.5 mm×2.1 mm Power Male to Female Barrel Plug Connector Extension Cable, DC Power Splitter 1 Female to 4 Male, and a 12V DC Power Supply. It is understood that any equivalent lighting array or system may be used, in various embodiments.

Continuing with reference to FIG. 26, mirrors 108 and 110 respectively connect to each of side frames 172 in a manner such that there is exactly a 90 degree angle between the mirrors. In embodiments, each mirror may be offset 45 degrees from the drawer, which may be provided in a horizontal plane. However, it is here noted that in other embodiments, it is not necessary to have substantial symmetry, and the upper mirror may be at a different angle relative to the drawer, or other object holder, than is the lower mirror to the drawer or other object holder. In such alternate embodiments, the images may be of different relative sizes, and may be left that way, or modified in software of a connected computer. In some embodiments the level of detail, and relative importance, of one side or facet of an object may be significantly more important, and in such cases it may be useful to obtain clearer and larger images of that more important side.

In embodiments, mirrors 108 and 110 may be 8"×9" first surface mirrors (for example, 1λ, from www.firstsurfacemirrors.com). Moreover, in embodiments, λ/4 and λ/8 mirrors may also be used, but those tend to be more expensive, and, in many cases, may not offer additional benefits to justify the cost.

FIG. 27 illustrates an alternate view of that of FIG. 26, showing the drawer in an open position (i.e., pulled out at the front of the example apparatus) and thus allowing lower rear LED 170 to be seen. It is noted that there is a reflection of this lower rear LED that is seen in lower mirror 110.

Figure 28:
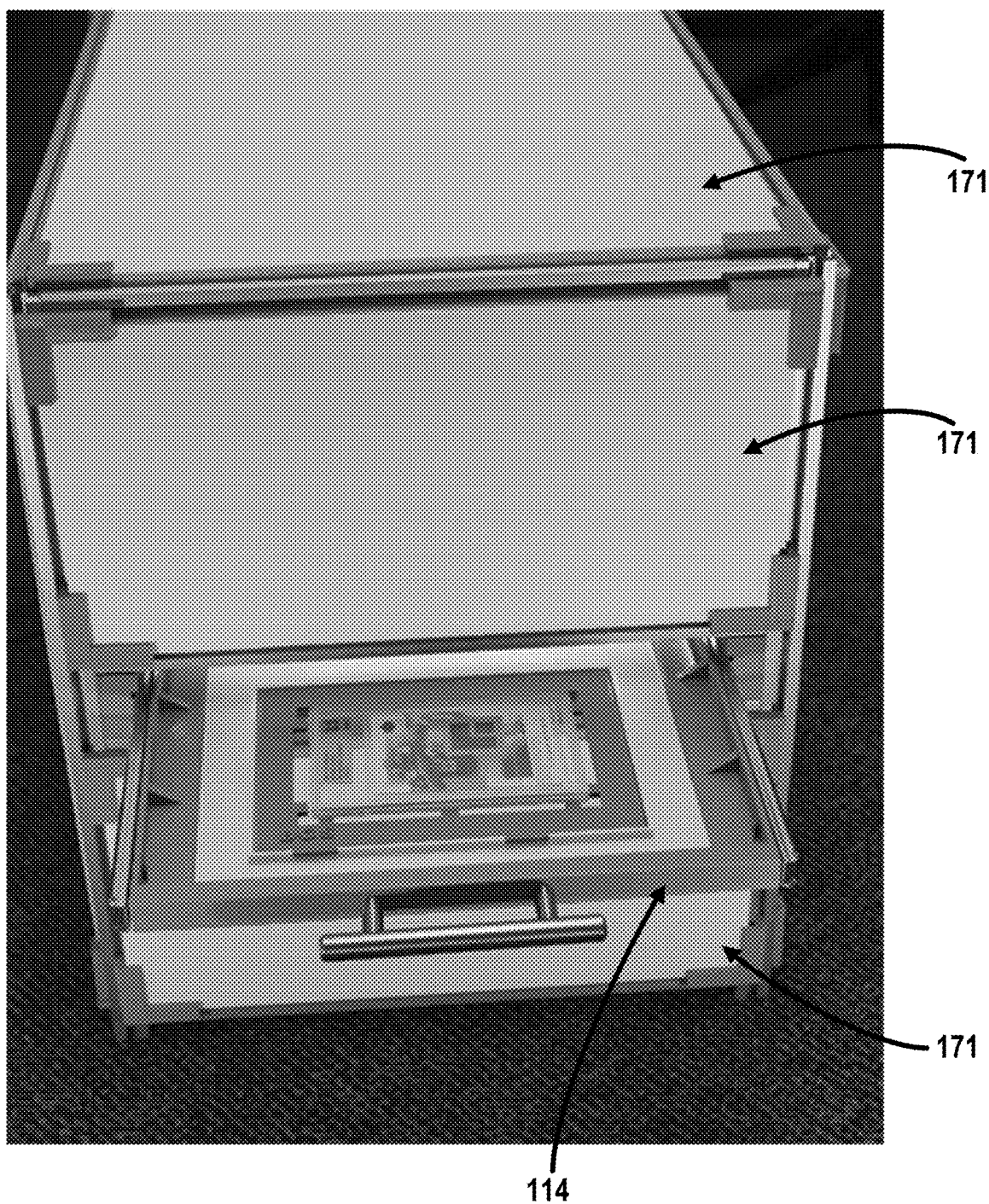
FIG. 28 illustrates a front view of the alternate simultaneous image capture apparatus, with the drawer in the open position.
Figure 29:
FIG. 29 illustrates an alternate front view of the example apparatus of FIG. 28, here with the drawer in the closed position.

FIG. 28 illustrates a front view of the alternate simultaneous image capture apparatus of FIG. 20, with the drawer 114 in an open position. In embodiments, drawer 114 may be opened and closed via a standard drawer pull, as shown, or other known mechanisms. As shown, the top of the apparatus, as well as the front portion, may each be covered with corrugated plastic panels 171 to help minimize the dust on the glass and mirrors inside the apparatus. Similarly, FIG. 29 illustrates the front view of FIG. 28, with the drawer in the closed position. To facilitate drawer 114 to easily open and close repeatedly, two mini ball bearing slides were used. In this particular example, Hafele 420.58.257 ball bearing slides were used.

Figure 30:
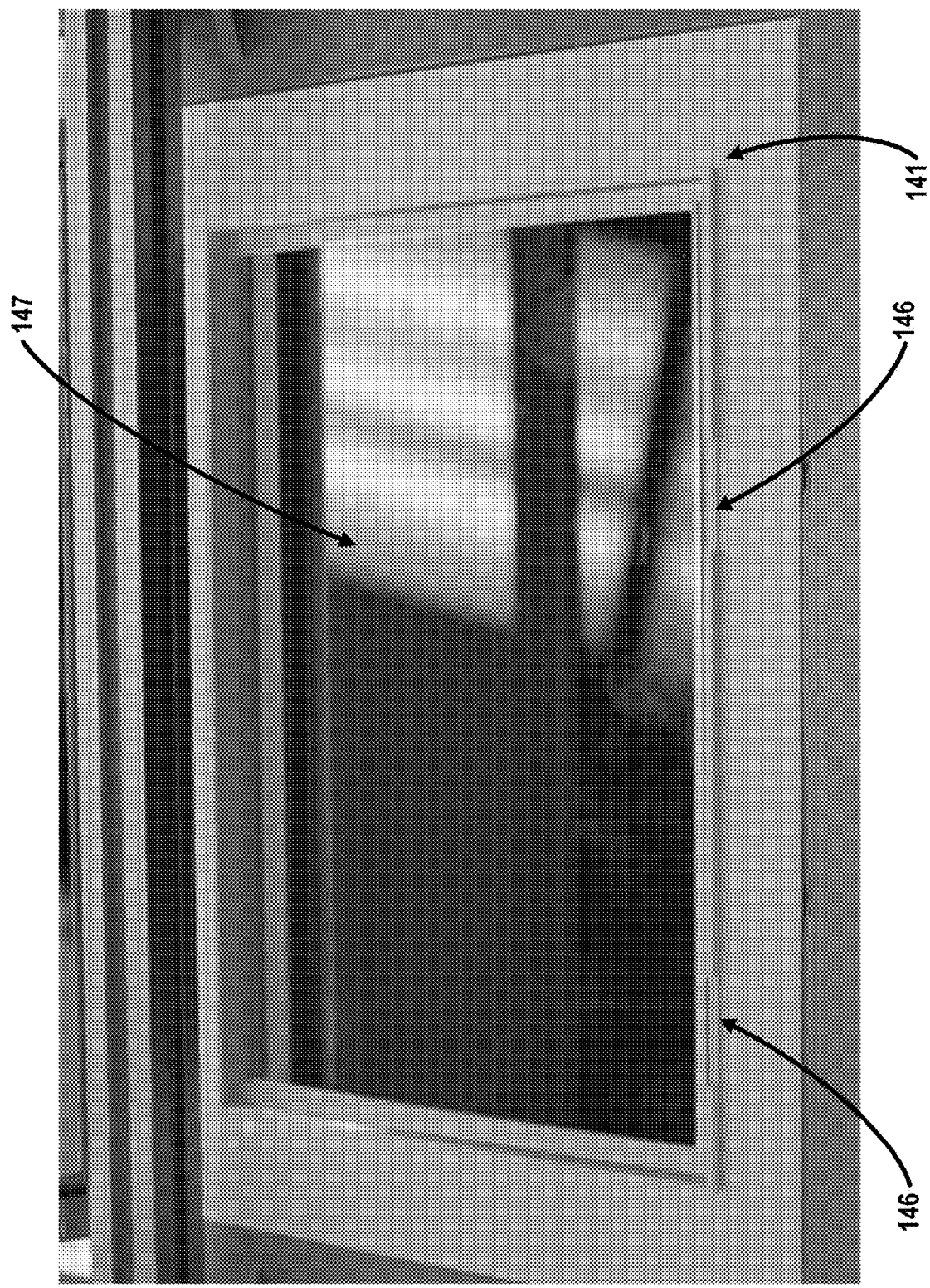
FIG. 30 is a close up view of the open drawer of FIG. 28, without a template.

FIG. 30 is a close up view of the open drawer of FIG. 29, without any inserted template. Therefore, clear glass plate 147 is visible at the bottom of the drawer, on which may sit the template containing an object to be imaged, such as, for example, a slabbed or unprotected collectable sports card, such as a baseball or football card. Clear glass plate both holds the object in the template, and allows the lower mirror to capture an image of the back of the imaged object. In embodiments, for example, clear glass plate 147 may be 5 by 7 inches, or any other appropriate dimension for the objects being imaged. Because the back of the target object, here a sports card, is actually imaged through glass plate 147, unlike the front, which is directly imaged, in embodiments, to obtain true symmetry, the depth at which the template sits in the drawer may be placed at a slight offset downwards, such that the distance between the lower mirror and the back of the card and the upper mirror and the front of the card, is uniform. Alternatively, the placement of the drawer may be slightly offset vertically relative to the upper and lower mirrors, or other adjustments to maintain the overall symmetry and parity of size of the simultaneously acquired images, in embodiments where such symmetry is desired.

Figure 31:
FIG. 31 illustrates a close up view of a 3D printed drawer insert (white outside) and a specific printed template (grey) for BGS cards, according to some embodiments.

Because there is no template inserted in drawer 114 in the view of FIG. 31, slots 146, which are cut into drawer insert 141, into which each template's protrusions are inserted so as to anchor the template into the insert, as described above, are easily seen.

FIG. 31 illustrates a close up view of a an example object to be imaged, in accordance with some embodiments. Shown is an example 3D printed drawer insert (white outside) 141 and a specific printed template (grey) 143 for BGS cards, according to some embodiments. In embodiments, having different colors for the template and the drawer insert allow for easy cropping of images, as described below.

It is noted that, in embodiments, there may be several templates 143, each for a different type, size, brand, category, or subcategory of object to be imaged. In the example of FIG. 31, template 143 is designed to hold a BGS football card, BGS referring to a provider of such cards. Moreover, there is a piece of glass 147 provided on the bottom of drawer insert 141, upon which template 143 may sit. As may be seen in FIG. 31, template 143 may have indexing notches 145 that match corresponding slots in drawer insert 141 to insure that template 143 may only be inserted in one way or orientation. It is here noted that in the example of FIG. 31, as well as in all of the examples presented herein, the templates are arranged to be inserted in the drawer insert so that a card (or other object) to be imaged that has been inserted into a template right side up always has its top, when sitting in the apparatus, on the left side of the drawer insert 141, as shown (from the viewpoint of FIG. 31, which is in front of the example apparatus). This should be noted in order to understand the images obtained from the card, as described below. It should be further noted that when the object is inserted into the chamber, the viewpoint switches 180 degrees to be that of the camera, positioned, for example, at the rear of the housing of the example apparatus.

FIGS. 32 through 37, next described, provide details of the mirror mountings at the front of the exemplary apparatus.

Figure 32:
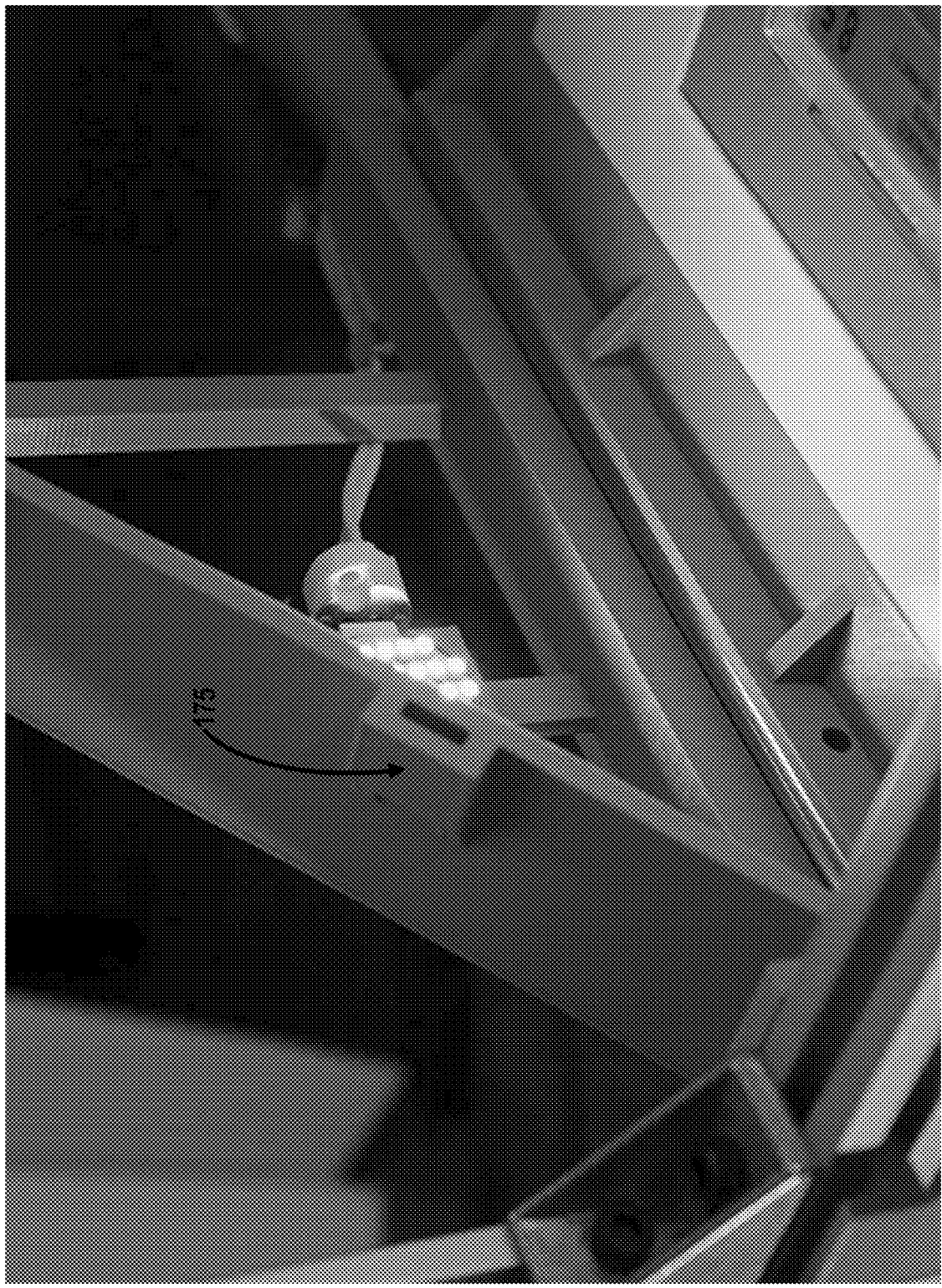
FIG. 32 illustrates an open front view of the alternate apparatus, from a viewpoint in front of the apparatus looking at its front face, showing a close up view of an empty upper mirror frame holder on the left side of the apparatus, according to some embodiments.
Figure 34:
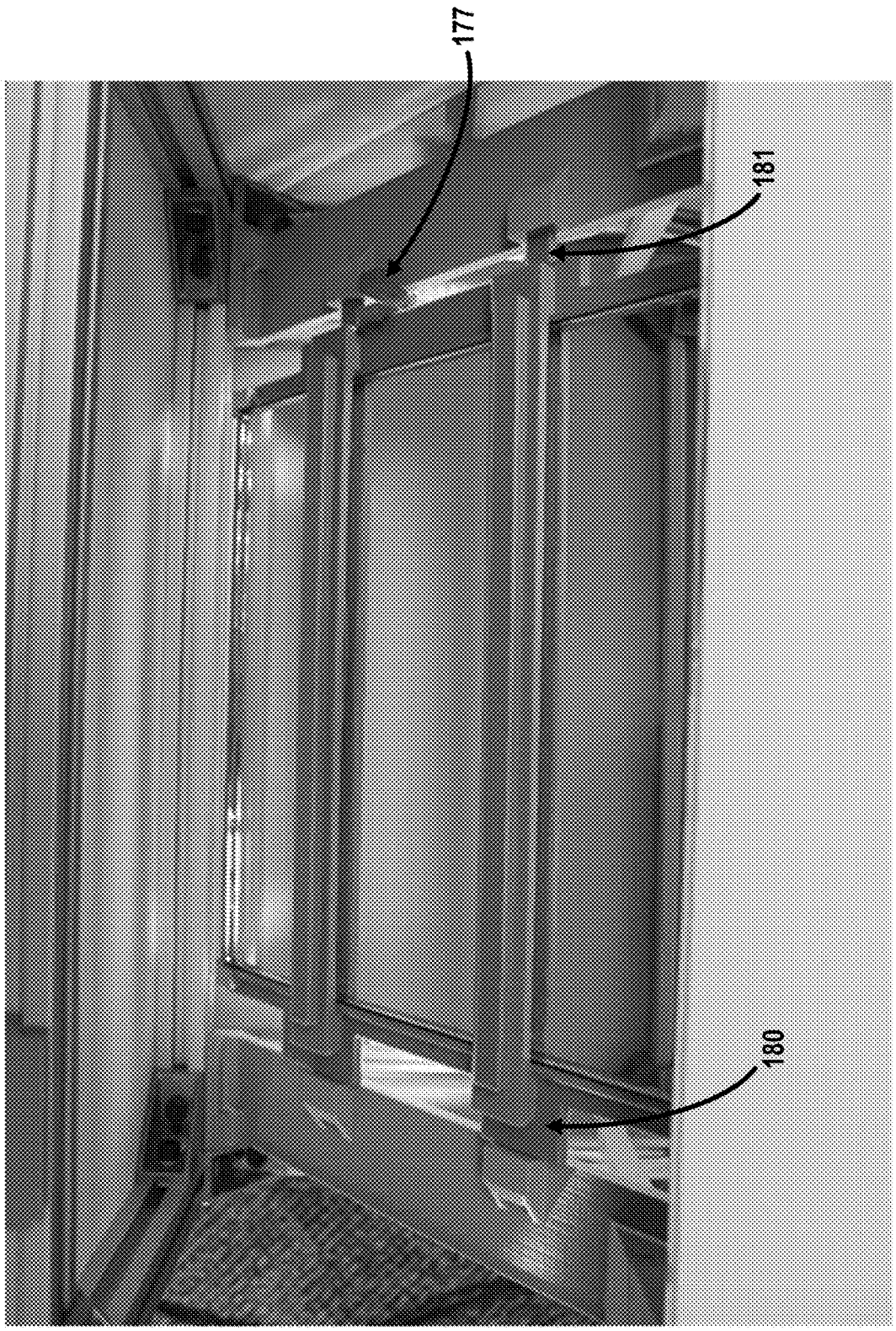
FIG. 34 illustrates a perspective top view of the alternate apparatus from a viewpoint above it, looking down into an upper portion of the front face of the apparatus, showing the upper mirror frame in place, according to some embodiments.
Figure 35:
FIG. 35 illustrates an open front view of the alternate apparatus, similar to that shown in FIG. 34, but from a greater distance in front of the apparatus, showing the closed drawer and the mirror frame in place.

With reference to FIG. 32, there is illustrated an open front view of the alternate apparatus, from a point of view in front of the apparatus looking at the front face of the apparatus, showing a close up view of an empty upper mirror frame holder on the left side of the apparatus, according to some embodiments. Thus, in the view of FIG. 32, the upper mirror, as well as the front and side panels, have been removed. In the center of the figure is seen one of the slots 175, or holders, for the upper mirror frame. Overall, as shown in FIGS. 34 and 35, there are two such slots on the top of the side frame and two on the bottom of the side frame, making four slots on each side. In embodiments, the side frame may be 3D printed, as are most of the structural elements in the alternate example apparatus of FIGS. 20-50. The feedstock for an example 3D printer may be, for example, HatchBox PLA Cool Gray 6 C Filament, which was used to 3D print the structural elements shown in FIGS. 20-50.

Figure 33:
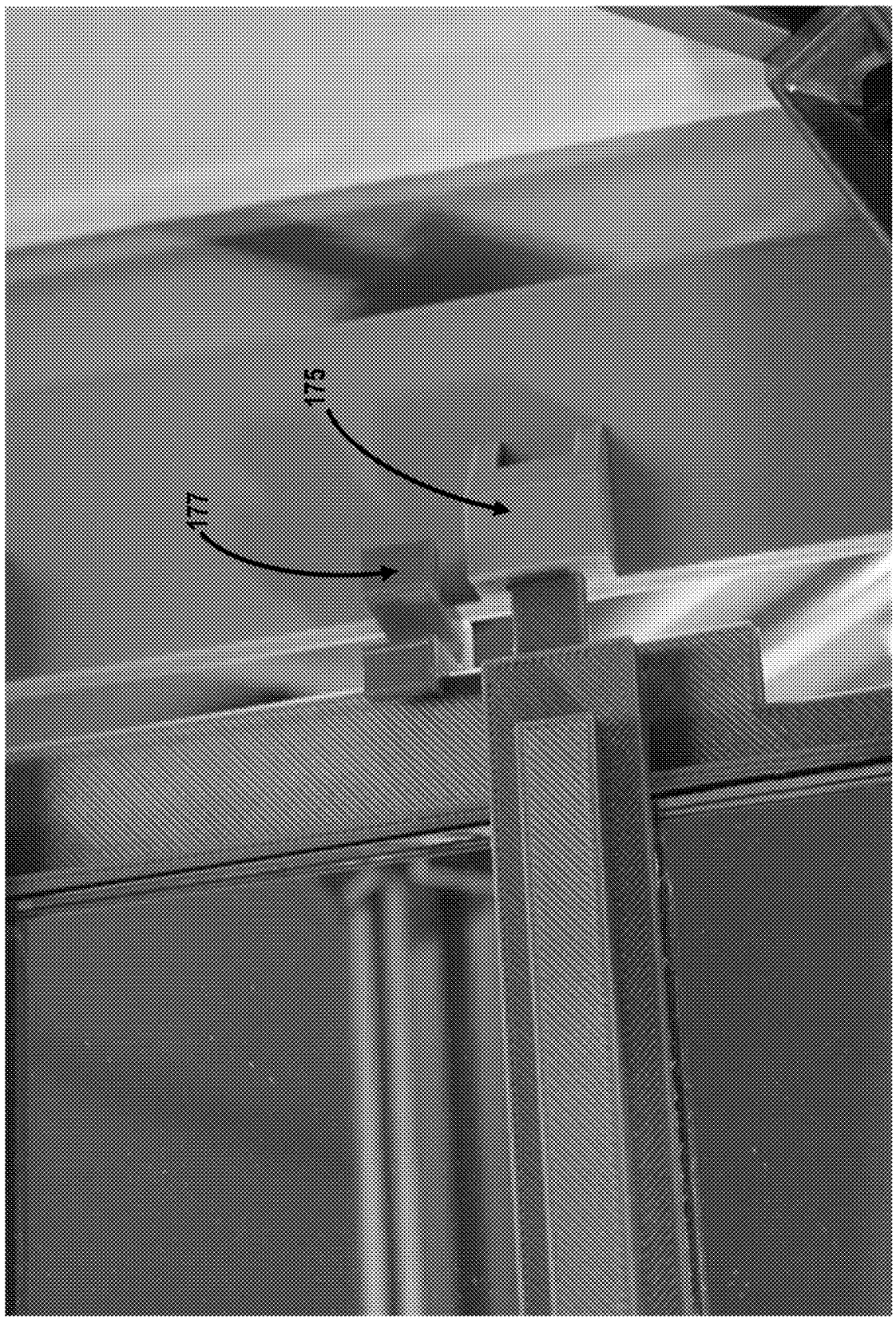
FIG. 33 illustrates the other side of the view shown in FIG. 32 (i.e., the front right side of the apparatus, from a viewpoint in front of the apparatus looking at the front face of the apparatus), with the upper mirror frame now in place.

FIG. 33 illustrates the other side of the view shown in FIG. 32 (i.e., the front right side of the apparatus, from a viewpoint in front of the apparatus looking at the front face of the apparatus, similar to that used in FIG. 30), with the mirror frame now in place. Also shown, above the slot on the right side of the image, is retaining spring clip 177. In the example apparatus, each mirror has a set of long tab and a set of short tabs, which slide into corresponding slots 175 on the side frames, as shown in FIG. 32. In embodiments, the long tabs may be slid in first, and the mirror frame slid back on the short tabs. In embodiments, retaining spring clip 177 may be used to prevent the short mirror tabs from coming out unexpectedly, by applying pressure back against the short tabs on the other side (left side) of the mirror frame.

FIG. 34 illustrates a top view of the alternate apparatus from a viewpoint above and looking down into, the apparatus, showing the upper mirror frame in place, according to some embodiments. Mirror short tabs 180 are provided on the left side of the mirror frame, and long tabs 181 are provided on the right side of the mirror frame, along with retaining spring clip 177.

FIG. 35 illustrates an open front view of the alternate apparatus, similar to that shown in FIG. 32, but from a greater distance in front of the apparatus, and with the front and top panels removed, showing the closed drawer and the upper mirror frame in place. Also shown are frame structural elements 183, and corner brackets 185 that hold them together. In this particular example, frame structural elements are 20 mm×20 mm aluminum extrusion (for example, MiSumi HFS5 Series 20 mm×20 mm), and corner brackets 185 are MiSumi HBLFSN5-5 Series, Reversal Bracket with Tab. Also used in this particular example are square nuts for HFS5 (MiSumi HNKK5-5), and M5-0.8×10 MM Metric Socket Head screws. Other materials and fasteners may be used, in various other implementations, as may be desired.

Figure 36:
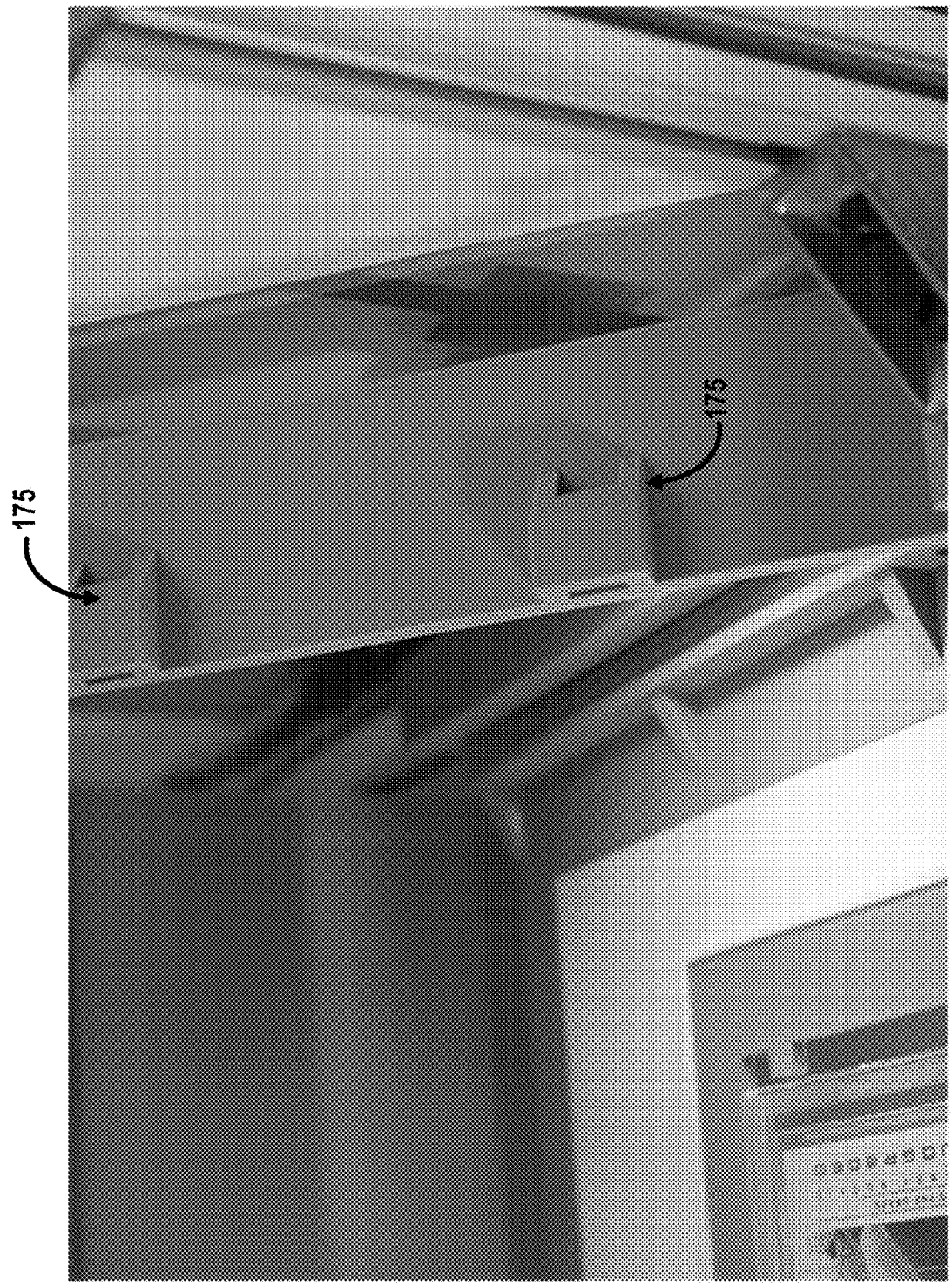
FIG. 36 illustrates an open front view, similar to those of FIGS. 33 and 35, with the upper mirror removed and thus showing both mirror frame slots on the right side as empty.

FIG. 36 illustrates an open front view, similar to those of FIGS. 34 and 35, of the right upper frame with the upper mirror removed and thus both mirror frame slots 175 on the right side of the frame being empty.

Figure 37:
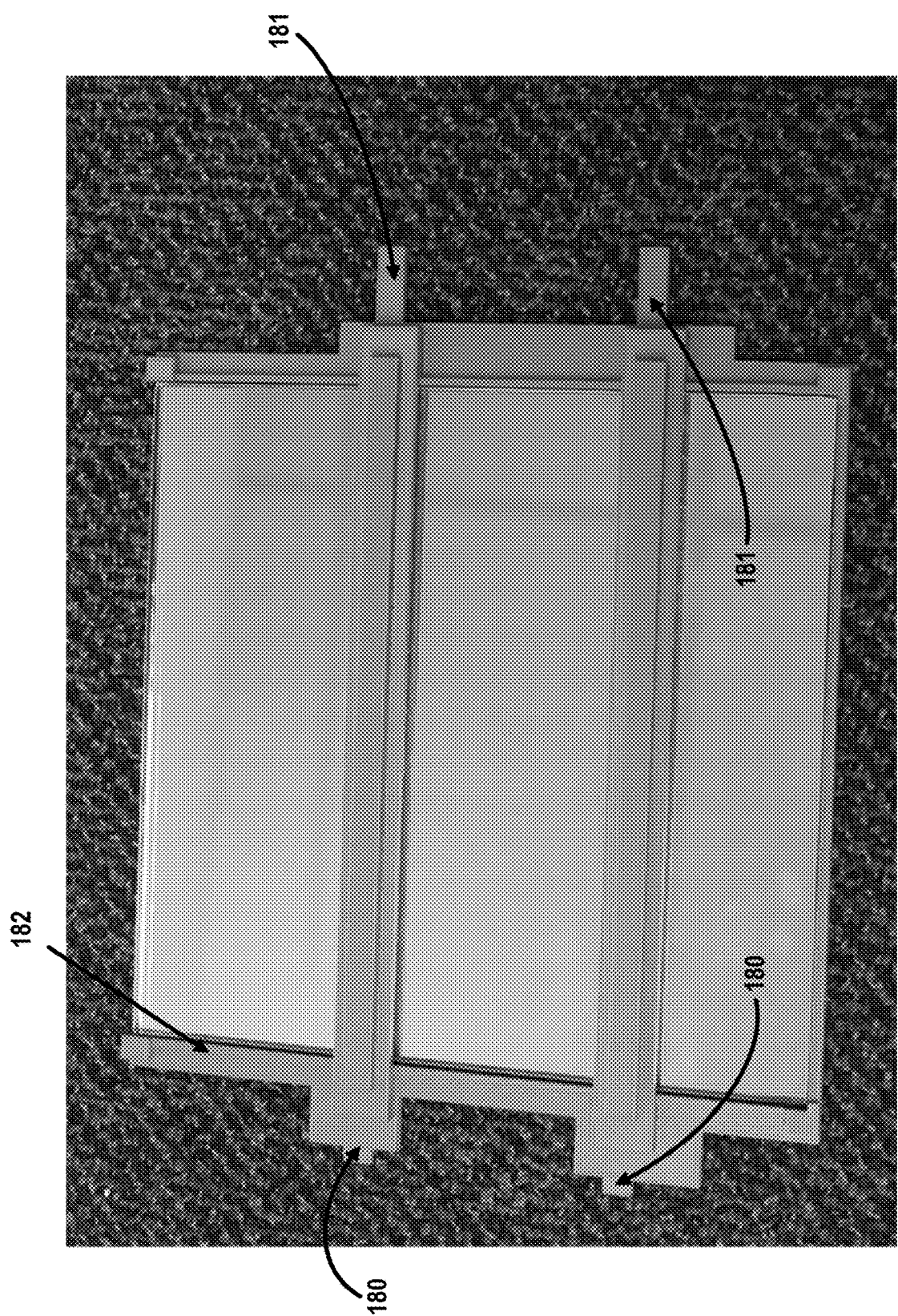
FIG. 37 illustrates a back view of a mirror frame with mirror, such as that shown in FIG. 35, as removed from the apparatus.
Figure 38:
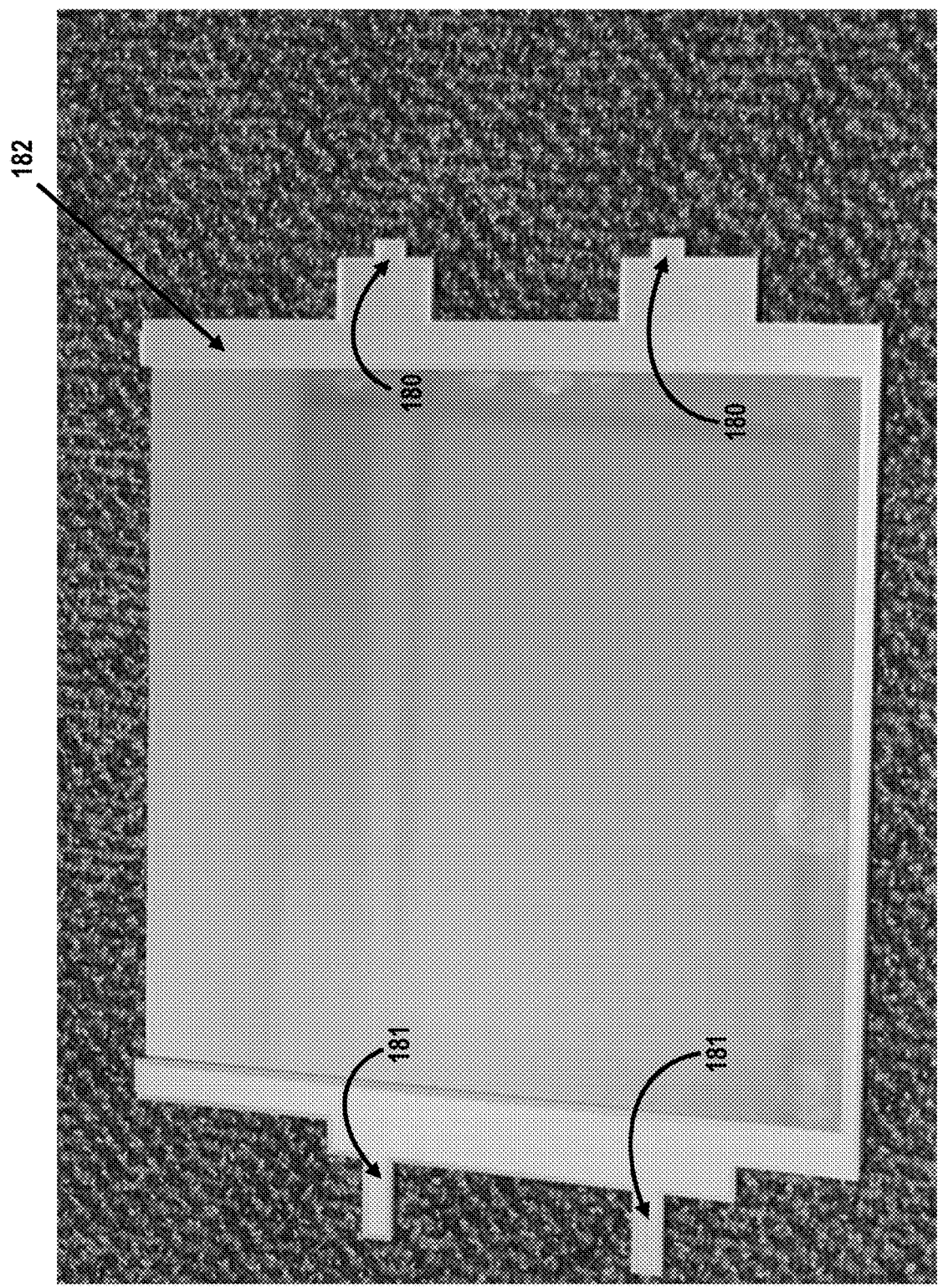
FIG. 38 illustrates a front side of the mirror frame shown in FIG. 37.

FIG. 37 illustrates a back view of mirror frame 182, such as that shown in FIG. 36, as removed from the example apparatus. As may be seen in the figure, short tabs 180 are on the left, and long tabs 181 are provided on the right of frame 182. Similarly, FIG. 38 illustrates a front side of mirror frame 182, with long tabs 181 now on the left, and short tabs 180 now on the right side of the mirror frame.

Figure 39:
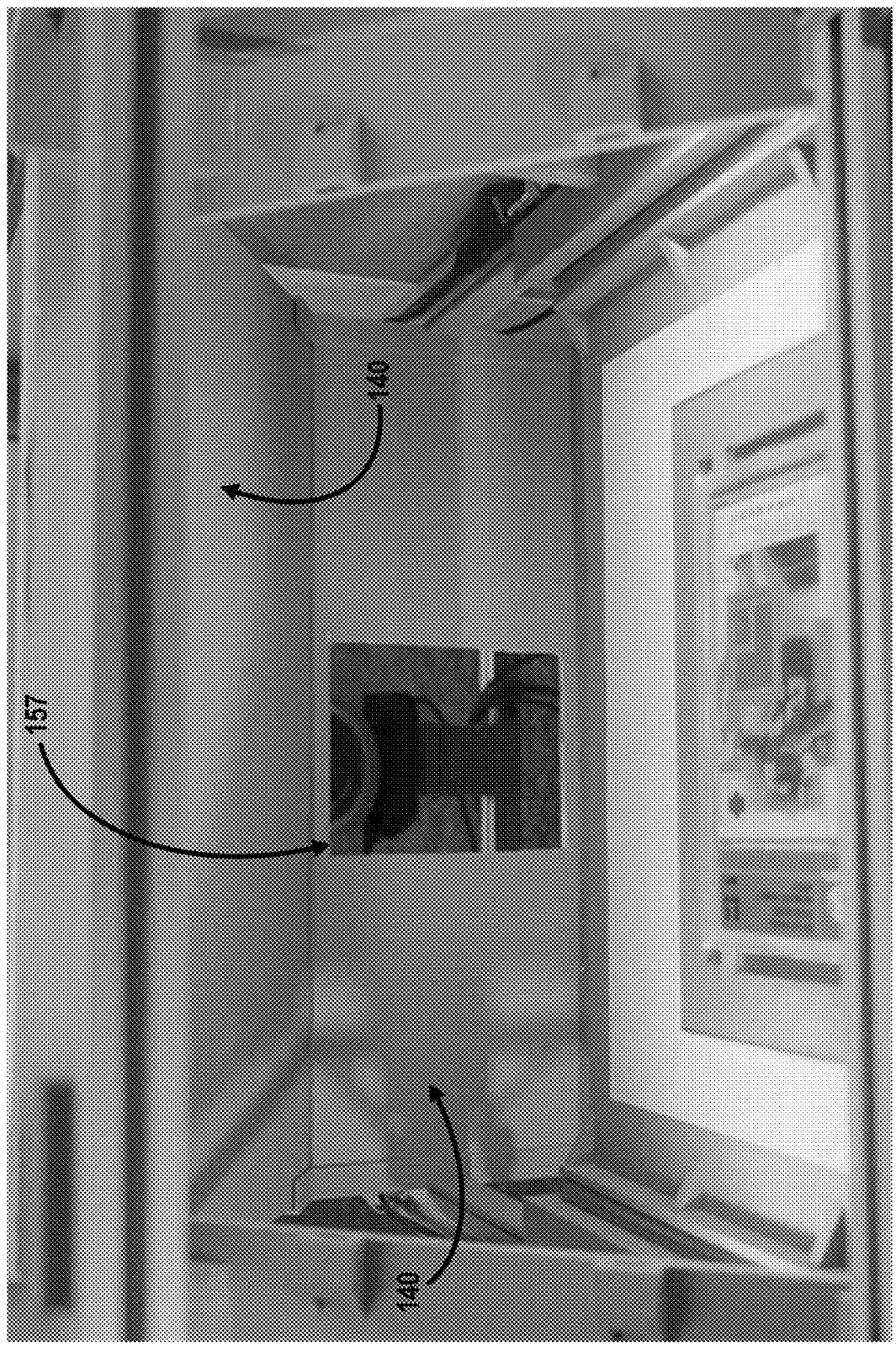
FIG. 39 illustrates a view into the apparatus from a viewpoint in front of the alternate apparatus, with the mirror frame removed, thus showing internal baffles and the aperture to provide a view for the camera.

FIG. 39 illustrates a view from a viewpoint in front of the alternate apparatus, with the mirror frame removed so as to show internal baffles 140, and aperture 157, the rear views of which were described above with reference to FIGS. 20 and 21. Also visible, through aperture 157, are camera shim 133, camera 102, lens 160 and lens mount arm 130. It is noted that, in embodiments, a preferable color for the baffles is grey. Thus, baffles 140, in this example, comprise coroplast white corrugated plastic sheets (0.157" thickness for the internal baffles and external cover), which were painted grey using a flat enamel paint color matched to Pantone Cool Grey 6 C. This color was chosen due to the fact that some sports cards have some reflective surfaces provided on them. These reflective surfaces often have a chrome type shiny look. It is thus noted that if a color or design is used in the baffles, the reflective surfaces on the sports cards will simply act as mirrors of their surroundings, and the image of one or both sides of the sports cards (depending upon whether one or both sides have a reflective surface) will show the colored surroundings of the inside of the chamber where the reflective surfaces on the card were. By using a grey baffle, which simulates the chrome type color of the reflective surfaces, the images of those reflective surfaces reflect the grey baffle, and thus look as they do, or very close to how they look, on the actual physical card.

Figure 40:
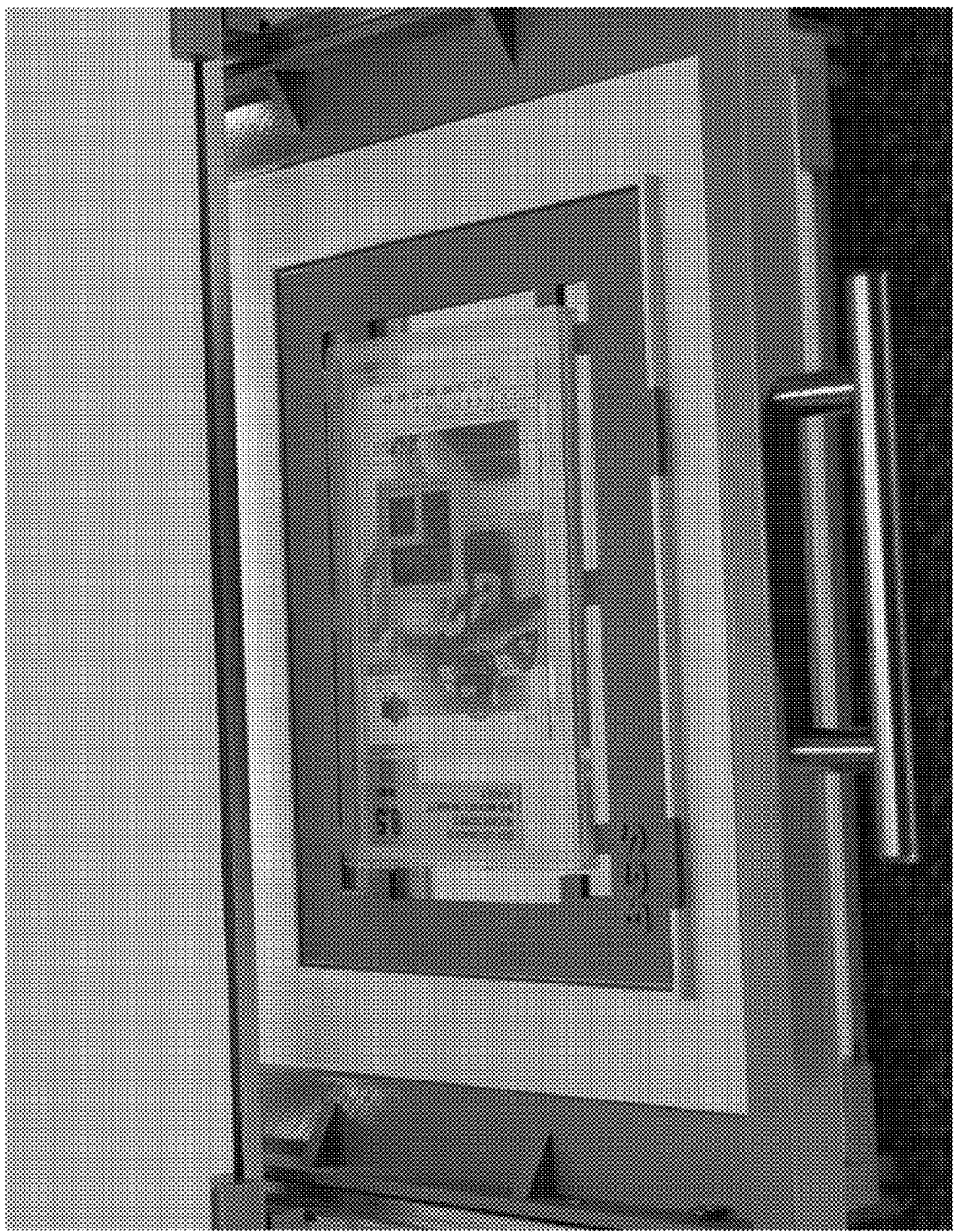
FIG. 40 illustrates a close up view of the open drawer of the alternate apparatus, as shown in FIG. 29, with the BGS template and an example BGS football card in image acquisition position.

FIG. 40 illustrates a close up view of the open drawer of the alternate apparatus, as shown in FIG. 29. As may be seen, the object to be imaged is a BGS football card, mounted in a BGS template, with the top of the card at the left of the drawer.

Figure 41:
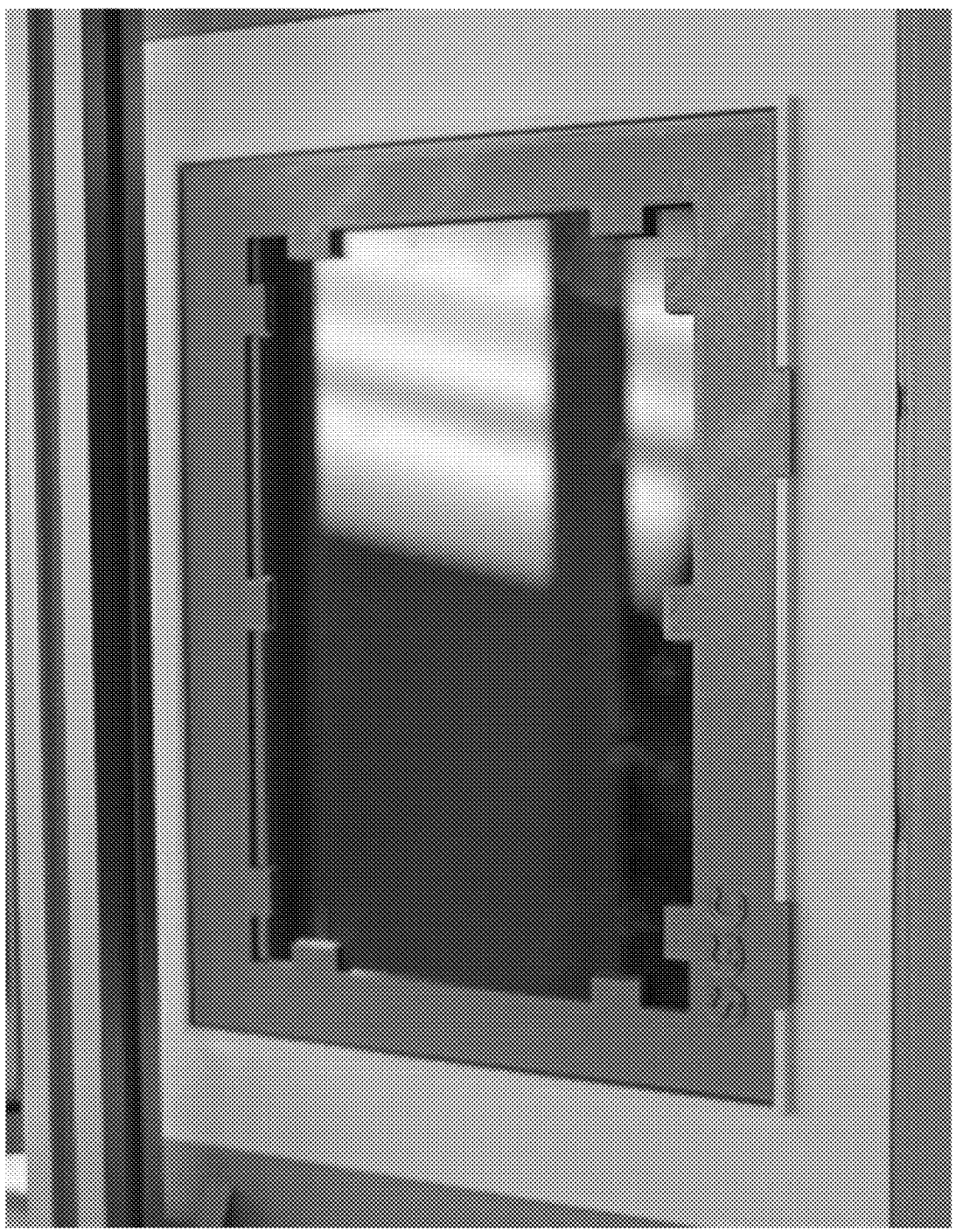
FIG. 41 illustrates a view of an open drawer with a template, but no card.
Figure 42:
FIG. 42 illustrates a close up view of an open drawer with a card in an SGC template. The card is a "Cal Ripken, Jr." specimen.

FIG. 41 illustrates a view of an open drawer with a SGC template, but no card, and FIG. 42 illustrates the open drawer view of FIG. 40, now with a card in the SGC template, the card is a "Cal Ripken, Jr." baseball card. As noted above, the card is inserted such that its top is on the left side, and the template's identifying letters appear on its bottom left.

Figure 43:
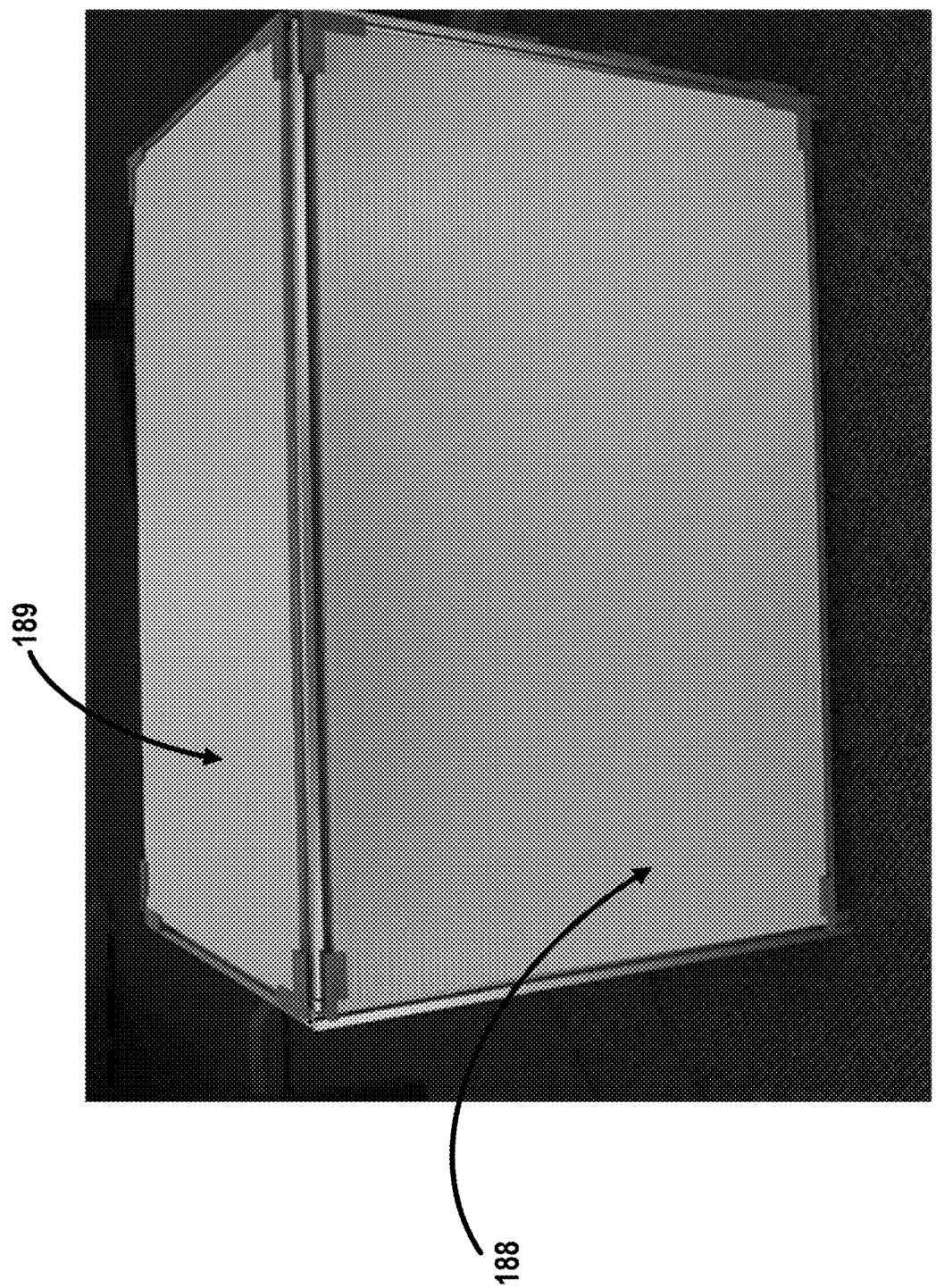
FIG. 43 illustrates a side view of the alternate apparatus, showing its top and side panels.

FIG. 43 illustrates a outer view of the alternate apparatus with all of its panels inserted, thus showing its top and side panels.

Figure 44:
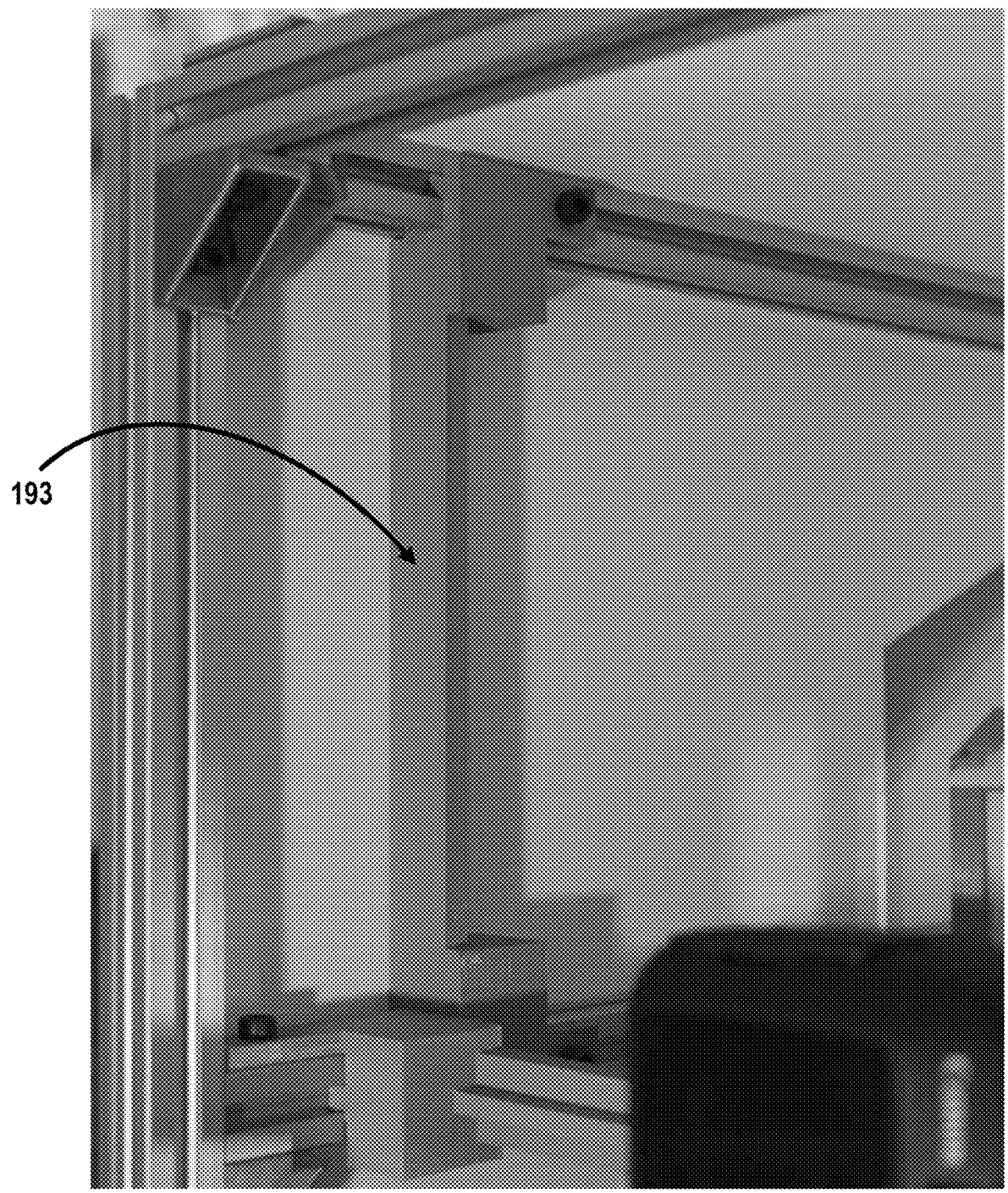
FIG. 44 illustrates a close up view of the top left portion of the image of FIG. 20, showing detail of a left side camera spacer arm. The point of view is from behind the alternate apparatus, looking into the back of the alternate apparatus.

FIG. 44 illustrates a close up view of the top left portion of the image of FIG. 20, showing detail of a left side camera spacer arm 193. The point of view is from behind the alternate apparatus, looking into the back of the alternate apparatus. In the example apparatus, there is a printed camera spacer arm 193 on each side of the top portion of the apparatus. Spacer arms 193 insure that the middle v-slot extrusions of both sides of the example apparatus are the same distance apart. This is important to make sure that each side of the mirror frames, which are attached to vertical supports that span the vertical distance between the v-slot extrusions on either side of the example apparatus, are substantially coplanar, so that each mirror is in a plane, and also so that the angle subtended between the two mirrors is the same along the entire width of the mirrors. Moreover, that angle subtended between the mirrors may preferably be bisected by the horizontal plane in which the target object is provided, within the drawer, along the entire width of the drawer, where symmetrical and equal in size images of front and back of an object are desired. Thus, to acquire simultaneous images such that the two images are of the same size, have parallel vertical and horizontal perimeter lines, and are at equal distances from a center line running across the width of the image of the drawer, vertical distances between the middle extrusion and the top extrusion, as well as between the middle extrusion and the bottom extrusion, are preferably uniform along the entire depth of the apparatus, and those distances on the left side are equal to those on the right side.

Figure 45:
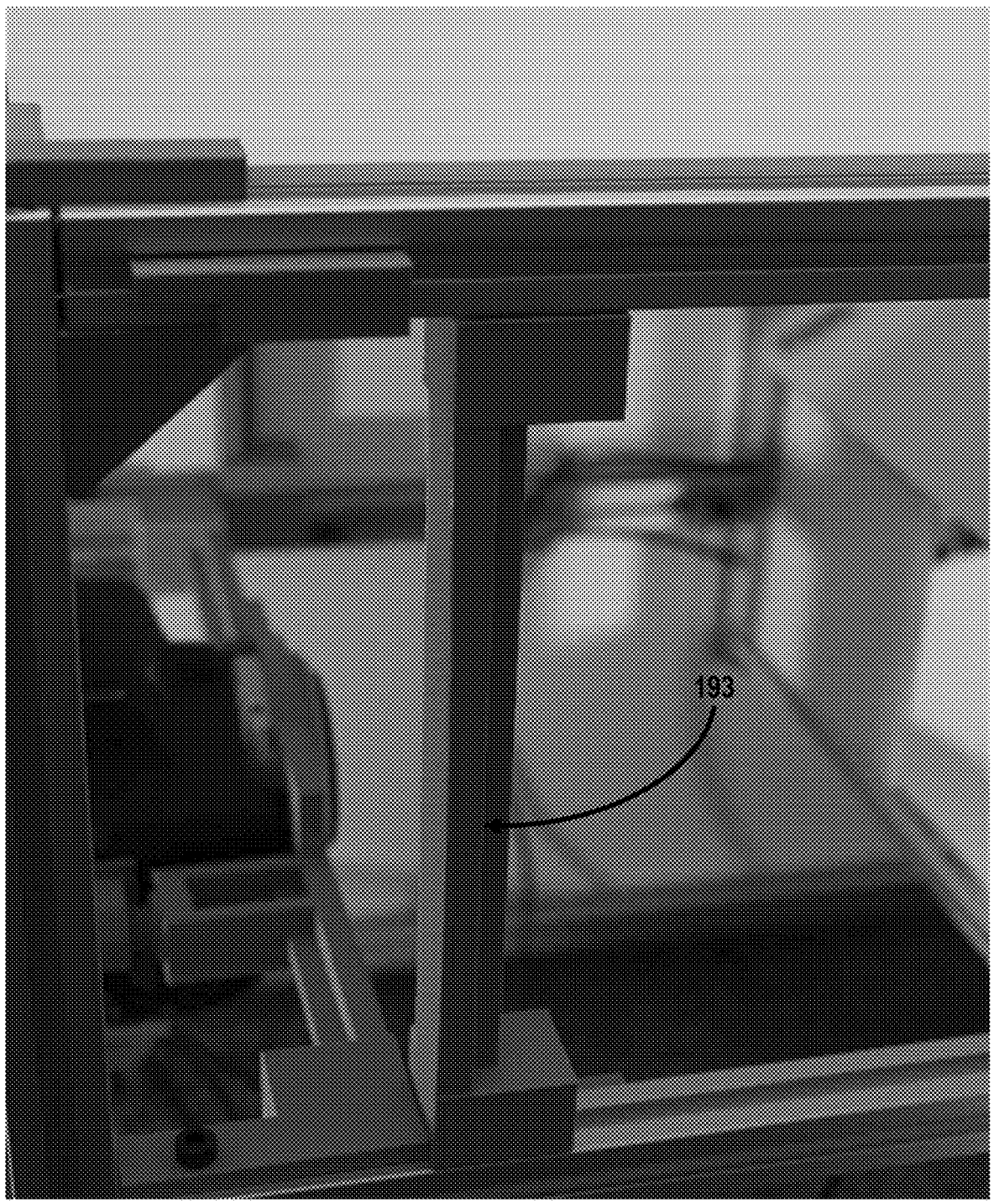
FIG. 45 an open side view of the rear portion of the alternate apparatus, illustrating detail of the outside of a right side camera spacer arm.
Figure 46:
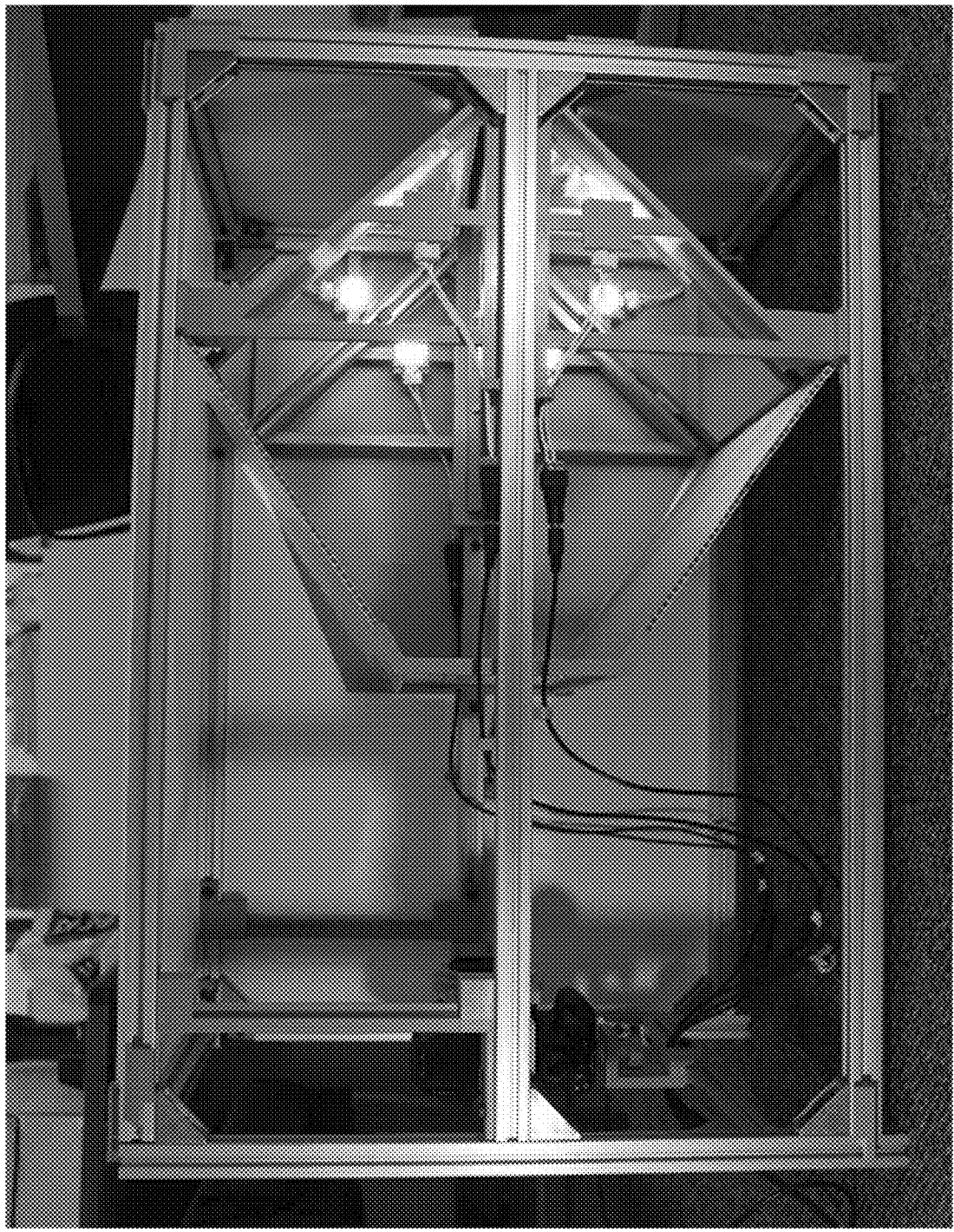
FIG. 46 illustrates an open side view from a viewpoint looking at the right side of the alternate apparatus. The view of FIG. 46 is a much wider angle view of what is shown in FIG. 45.
Figure 47:
FIG. 47 illustrates the same open side view as is shown in FIG. 46, but from a different angle.

FIG. 45 shows an open side view of the rear portion of the alternate apparatus, illustrating detail of the outside of a right side camera spacer arm 193. FIG. 45 illustrates an open side view from a viewpoint looking at the right side (from a perspective looking at the front of the apparatus) of the alternate apparatus of FIG. 20. It is noted that the view of FIG. 46 is a much wider angle view of what is shown in FIG. 45, taken form the same side of the example apparatus. FIG. 47 illustrates the same open side view as is shown in FIG. 46, but from a different angle, thus presenting a full view of both front and rear portions of the example apparatus, with all components installed.

Figure 48:
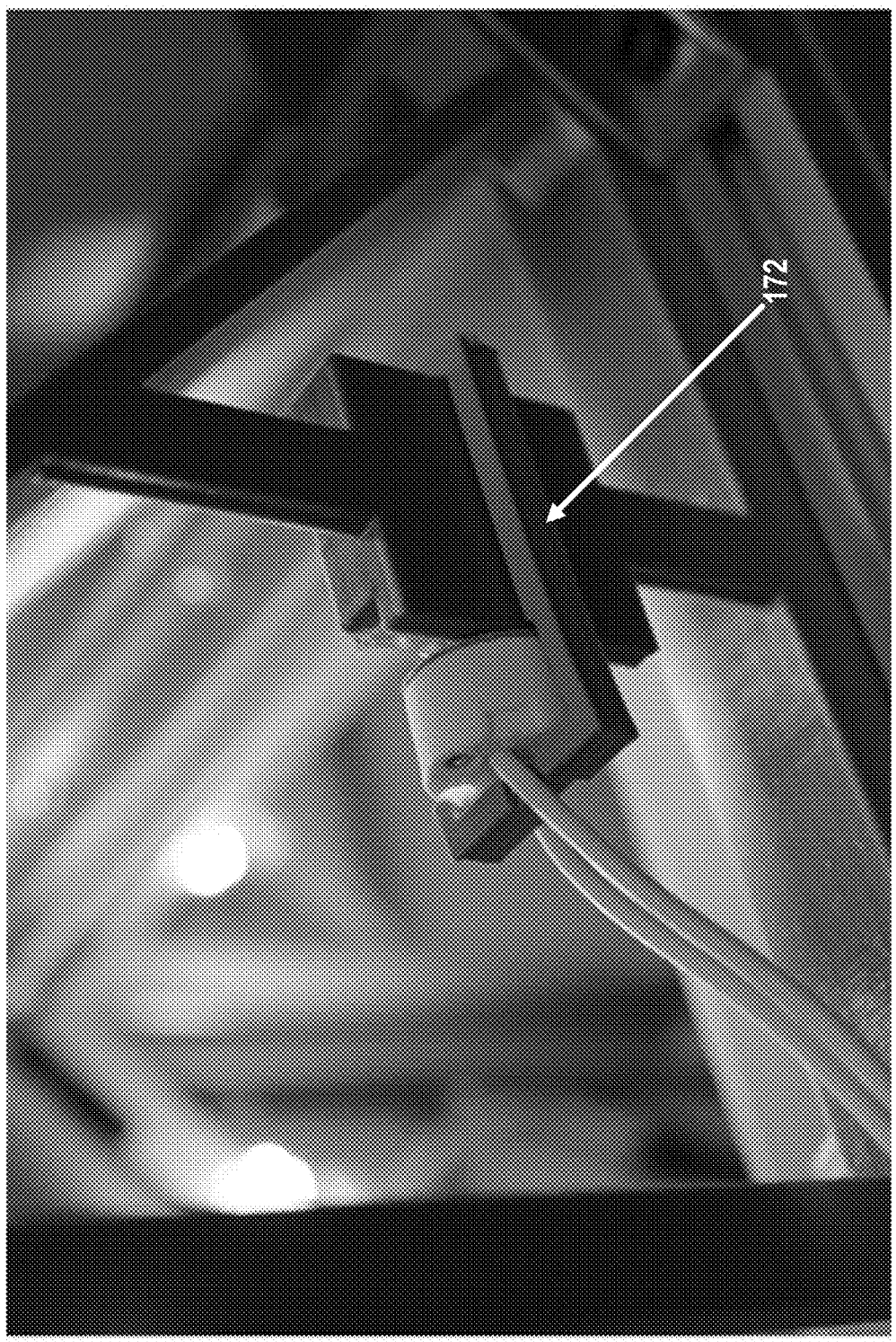
FIG. 48 illustrates a front view of an exemplary LED clip, according to various embodiments.
Figure 49:
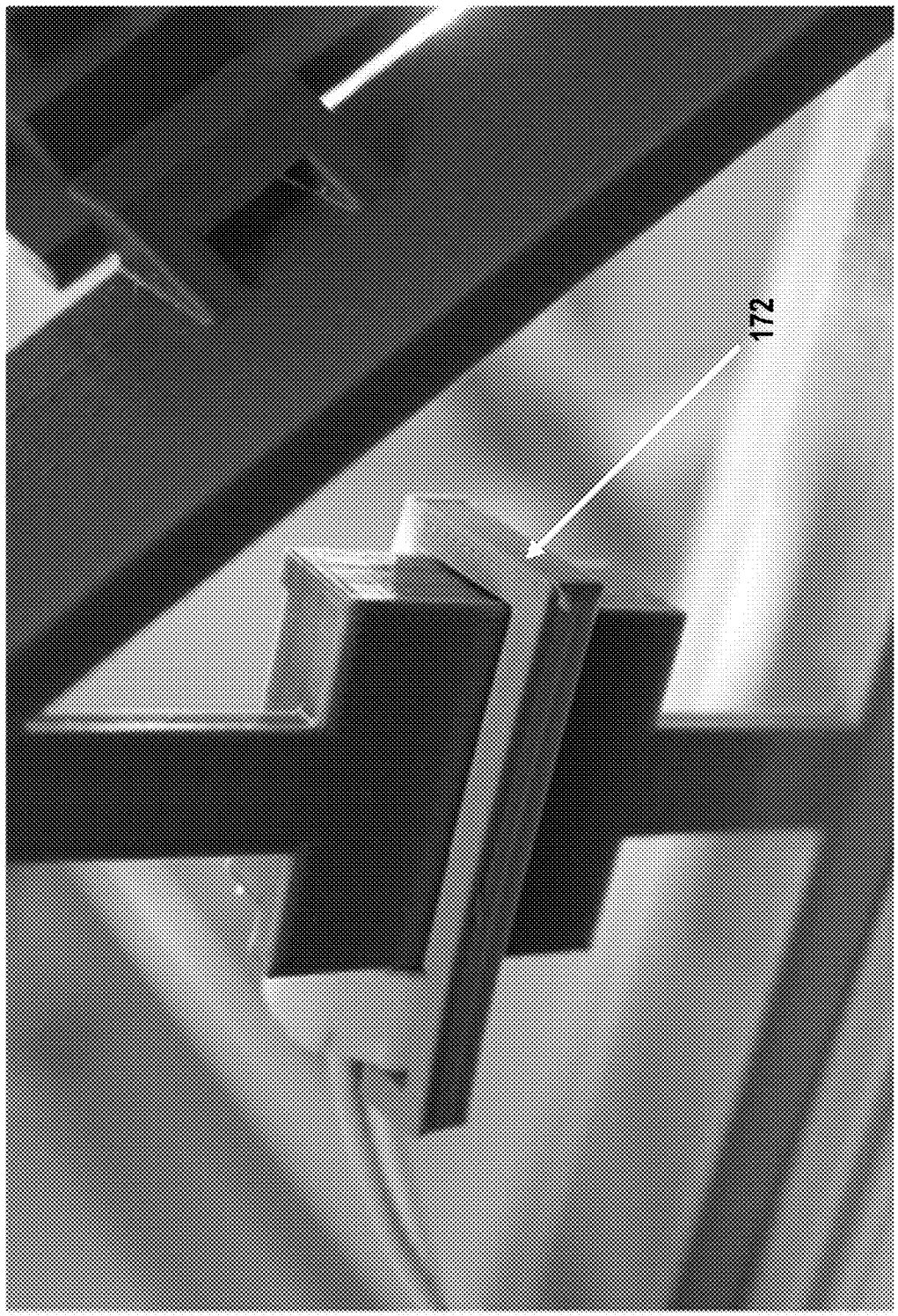
FIG. 49 shows a rear view of the exemplary LED clip of FIG. 48.
Figure 50:
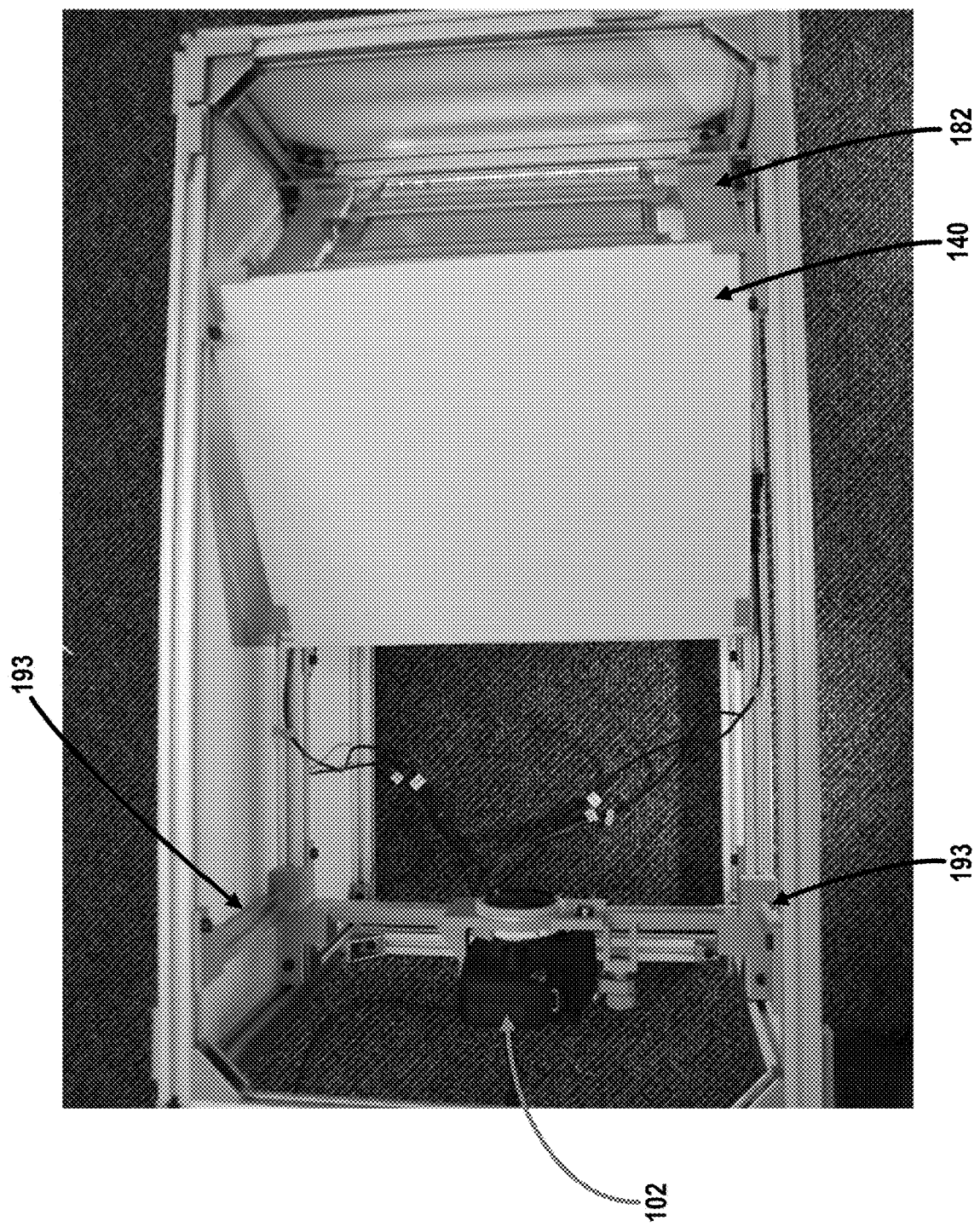
FIG. 50 illustrates an open top view of the alternate apparatus, taken with the apparatus in the same position as is shown in FIGS. 46 and 47, the view showing, from left to right, the camera on a lens arm mount, the two camera spacer arms (one on each side), the upper baffle, and the upper mirror frame.

Finally, FIG. 48 illustrates an open top view of the alternate apparatus, the apparatus in the same position as is shown in FIGS. 46 and 47, the view showing, from left to right, camera 102 on a lens arm mount, the two camera spacer arms (one on each side) 193, the upper baffle 140, and the upper mirror frame 182.

Next described is an exemplary process flow for a process to scan simultaneous images of an example object, here a baseball card, and store various intermediate and final image outputs in one or more databases. The process may be implemented in a computer that controls, and is communicably connected to, camera 102 as provided in an apparatus according to various embodiments. The computer may further have a bar code reader, by which markings on example objects to be imaged, or on templates, may be obtained and input to the computer. Finally, the computer may generate a User Interface (UI) by which a user or operator may perform a setup process, acquire images of example objects, and save one or more of raw, intermediate and final images to one or more databases. FIG. 54, described below, illustrates an overview of the operational flow of an example process for acquiring simultaneous images of an object in accordance with various embodiments. In order to better understand the example process of FIG. 54, first FIGS. 51 through 53, which provide example images at various stages of the exemplary image acquisition process, are next described.

Figure 51A:
FIG. 51A illustrates a raw image (as seen by the camera) acquired using the example apparatus of FIGS. 20-50, in accordance with various embodiments. The images are inverted, being images of the respective reflections of the front and back of the Cal Ripken card in the mirrors.
Figure 51B:
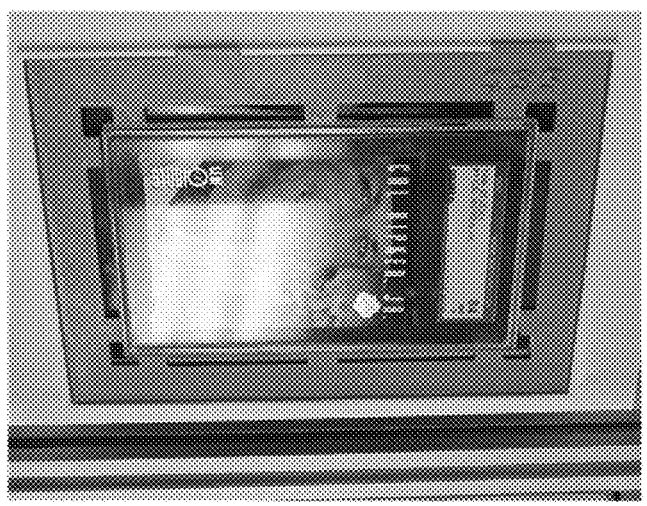
FIG. 51B illustrates the view of a top of the object being imaged in FIG. 51A, as seen from a viewpoint at the top rear of the chamber.

FIG. 51A illustrates an example raw image, as seen by camera 102 of the example apparatus of FIGS. 20-50, of the front and back of the Cal Ripken SGC baseball card that is shown in FIG. 42. The images, relative to the original images printed on the card, are reflected about a horizontal axis, being images of the respective reflections of the front and back of the Cal Ripken card in the upper and lower mirrors of the apparatus, as seen from the back of the apparatus, looking through the aperture. FIG. 51B illustrates the view of the object being imaged in FIG. 51A, as seen from a viewpoint at the top rear of the chamber (and thus above and in front of the aperture). It is this viewpoint, of FIG. 51B, of the Cal Ripken baseball card, that is reflected in the upper and lower mirrors. Thus, by comparison with the actual card in the SGC template as placed in the drawer, as shown in FIG. 51B, Cal Ripken's eyes, in the image of FIG. 51A, are now on the bottom of the image, and the "SGC" is on the bottom right, not the top right, of the image.

It is here noted that in order to best understand how the images of FIG. 51 relate to the original actual object, it is important to remember that the reflections in the two mirrors of the example apparatus are of the card in the drawer as shown in FIG. 42, but the viewpoint that the mirrors see is not what is shown in FIG. 42, but rather a 180 degree rotation of the view of FIG. 42, precisely as shown in FIG. 51B. FIG. 42 (and, for example, FIG. 40 as well) are taken from a viewpoint at the front of the example apparatus, looking at the drawer. To transform from the view of FIG. 42 to the raw images of FIG. 51A, which are acquired from the camera's viewpoint, both a 180 degree rotation (to switch to the camera's viewpoint) and a reflection (due to the mirrors) are required.

Figure 52:
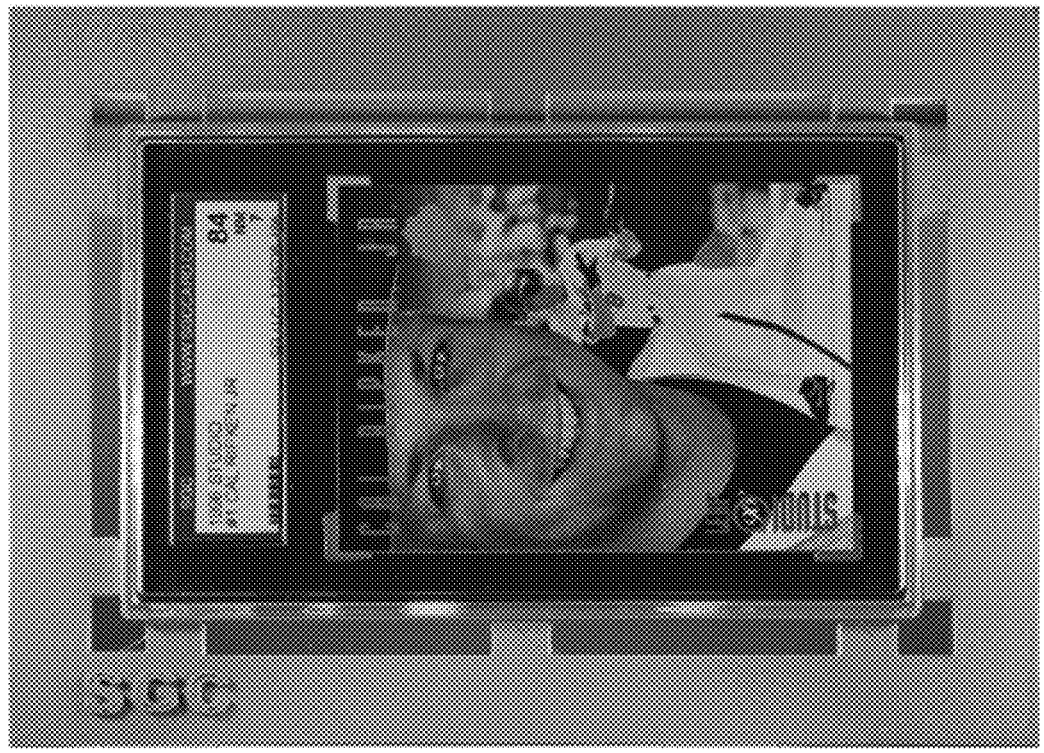
FIG. 52 illustrates the raw images of FIG. 51A, after being inverted, rotated 90 degrees counter-clockwise, and respectively cropped down to the outer perimeter of the template (e.g., the grey cardholder shown in FIG. 31).
Figure 52:

FIG. 52 illustrates the raw images of FIG. 51A, after being inverted or "vertically flipped" to undo the effect of the reflection in the mirrors (the discussion above of FIGS. 12 and 13 is here noted), then rotated 90 degrees counter-clockwise, and then respectively cropped down to the outer perimeter of the template (e.g., the grey cardholder shown in FIG. 31). It is noted that a "vertical flip" or inversion may be understood by taking a page on which FIG. 51A has been printed, turning it over about a horizontal axis between the two images, and looking through the underside of the page (with lighting shining on the front side of the page) to see the image. The same effect may be achieved by a horizontal flip about a vertical axis, but then the front image will still be on the top of the page.

Figure 53:
FIG. 53 illustrates the front and back images of FIG. 52, after respectively cropping them to remove the template.
Figure 53:
Figure 54:
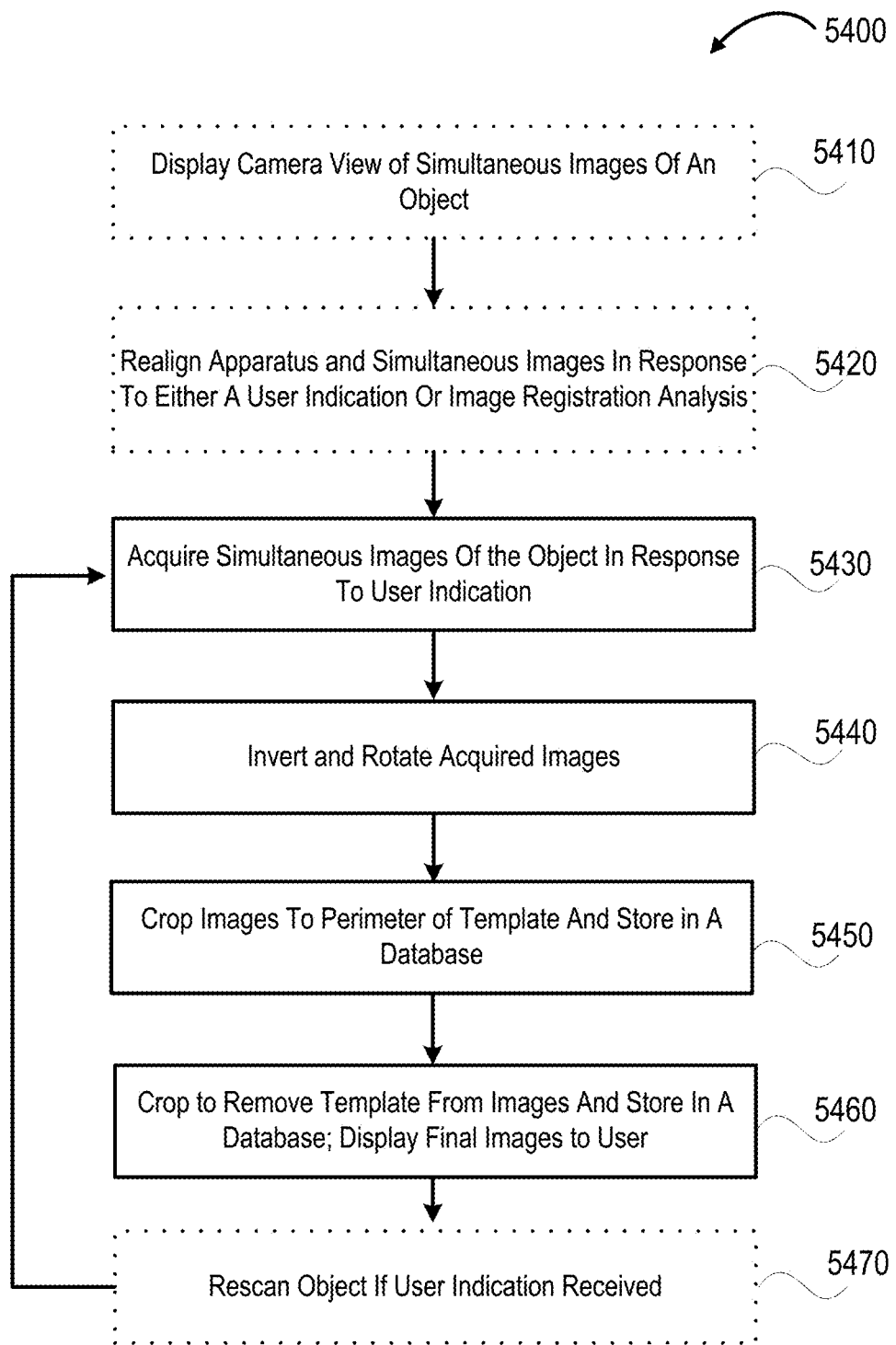
FIG. 54 illustrates an overview of the operational flow of a process for acquiring simultaneous images of an object in accordance with various embodiments.

FIG. 53 illustrates the front and back images of FIG. 52, after respectively cropping them to remove the template, leaving images of the actual cards in the plastic slab.

As noted above, in embodiments, camera 102 may be controlled by a computer, and the simultaneous images that are acquired may be processed and stored in one or more databases by the computer. For example, in a pre-scan, or startup operation, an operator may open a session, input or select the camera being used in the apparatus, and input to the computer an f-stop, shutter speed and ISO for the camera. In some embodiments, these values may be, for example, 2.8, 1/50 second, and 100. In alternate embodiments, of course, other values may be used. At this point the User Interface (UI) may be loaded, connected to the camera and ready to scan. The operator may then select or input (if not yet in the computer) the appropriate template, and, if desired, scan a transaction barcode associated with the card (e.g., attached to the slab, as shown in FIG. 53, top of the front image).

In embodiments, at this stage, the operator may check if an autofocus option is available, and if it is, he or she may call it. It is noted that for applications where the same type of target object is imaged, the focus should not change that much between shots. To do so may add time and possible stress on the lens to focus each time. Thus, in general, an operator may only need to focus if there is a significant change in object, e.g., card, thickness. Additionally, in some embodiments, an operator may start a live view, which allows them to manual focus the lens.

Once an operator has completed setup and, if needed, focusing the camera, in embodiments, the computer may acquire images and process them for storage. One example process for doing that is illustrated in FIG. 54. With reference thereto, FIG. 54 illustrates an overview of the operational flow of a process 5400 for acquiring simultaneous images of an object in accordance with various embodiments. Process 5400 may be performed by a computer connected to a system or apparatus according to various embodiments. For example, process 5400 may be performed by a host computer connected to an example apparatus, as described above. Process 5400 may include blocks 5410 through 5470, and alternatively may only include blocks 5430 through 5460, as explained below. In alternate embodiments, process 5400 may have more or less operations, and some of the operations may be performed in different order.

Process 5400 may begin with two optional blocks, blocks 5410 and 5420. Thus, these blocks are shown in dotted lines. It is noted that blocks 5410 and 5420 are "one time" setup processes, and thus do not need to be performed very often. For this reason they are optional. At block 5410, an example system or apparatus may optionally display a camera's view of simultaneous images to be acquired, such as, for example, the camera's view shown in FIG. 51A.

From block 5410, process 5400 may optionally proceed to block 5420, where, in some embodiments, if a user or operator, or image registration analysis performed by the example system on its own, indicates that the images in the camera view of block 5410 are misaligned, the apparatus may realign and represent the camera view of images by making one or more adjustments or corrections in software.

If optional blocks 5410 and 5420 are included in an example of process 5400, then from optional block 5420 process 5400 may proceed to block 5430 It is noted that if optional blocks 5410 and 5420 are not to be included in process 5400, then process 5400 may begin at block 5430, where, in response to a user indication, simultaneous images of the object may be acquired by the camera. In embodiments, the user indication may be by clicking on a portion of, or otherwise interacting with a user interface, actuating an input device, or the like.

From block 5430, process 5400 may proceed to block 5440, where the acquired raw images may be inverted and rotated, as described above. From block 5440, process 5400 may proceed to block 5450, where the inverted and rotated images may be cropped to exclude anything beyond the perimeter of the template, to result in images such as those shown in FIG. 52. These "cropped to template" images may then be stored in a database. In embodiments, the images with the entire template are saved, so that if a card's position needs to be adjusted (bumped) that may be done on the source image (e.g., one such as those shown in FIG. 52) without having to rescan the item.

Finally, from block 5450, process 5400 may proceed to block 5460, where the "cropped to template" images generated at block 5450 (such as are shown in FIG. 52) may be further cropped to remove the template, the end result being front and back images of the object, such as are shown, for example, in FIG. 53. These front and back images of the object may be saved to the same, or another, database. It is here noted that, as described above regarding a setup phase, the computer knows what template the object to be imaged is held in, having received that information from an operator. In embodiments, this knowledge may be used, along with other image processing techniques, as part of the "crop to object" processing of block 5460.

Once the final images have been obtained at block 5460, they may be displayed to a user in the UI. Process 5400 may then terminate.

Alternatively, an additional optional block may be performed following block 5460, at block 5470, where process 5400 may rescan the object and this regenerate images of the object in response to a user indication. In embodiments, the user or operator may decide, following seeing the final images, if they did not get the drawer closed completely, were moving the drawer when the images were acquired, or if the object is out of focus, for example. As shown in FIG. 54, in the event at optional block 5470 a user indication is received for a rescan, then process 5400 may return to block 5430, and repeat the processing at each of blocks 5430 through 5460, as described above.

In embodiments, a slight modification to process 5400 may also be implemented to implement a "test mode" prior to committing to a final scan. Thus, in such embodiments, an end user may be allowed to "bump" the front and back images of a scanned object. In this modified process a test mode may be entered, where images are acquired as in block 5430 of process 5400, and cropped with a slight offset in any direction. Then blocks 5440, 5450 and 5460 of process 5400 may be performed, as shown in FIG. 54 and described above, except that none of the "cropped to template" or "cropped to object" images are stored in a database. The thinking is that the end user may bump several times, in several directions, to better center the object. Once the end user is happy with the new position, a rescan may be initiated, as shown in block 5470, and blocks 5430 through 5460 performed as described above.

Figure 54A:
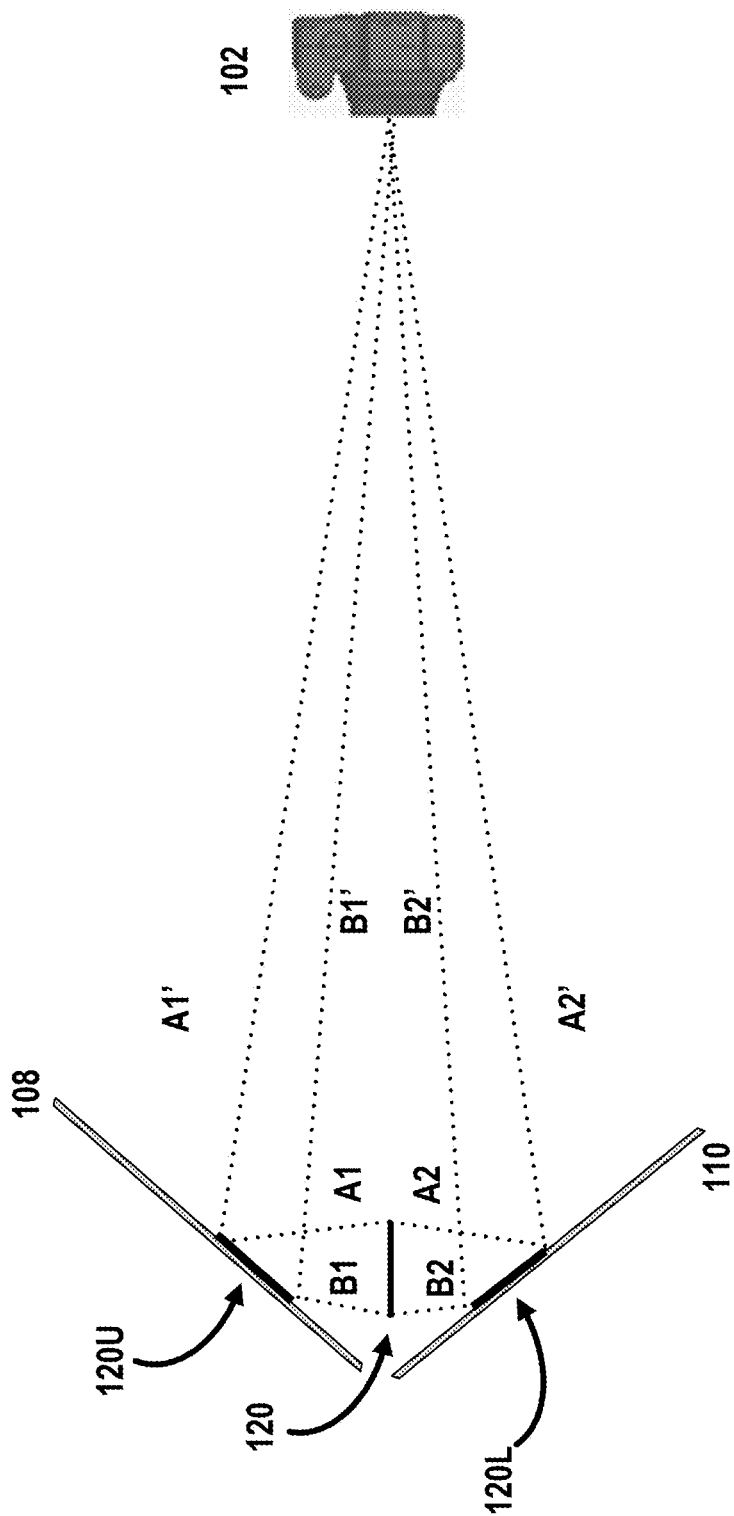
FIG. 54A illustrates a schematic diagram of how light rays reflected on an exemplary target object are reflected in the mirrors and then captured by a camera, according to various embodiments.

To further illustrate the light paths in an exemplary apparatus, a schematic diagram of how light rays reflected on an exemplary target object are reflected in the mirrors and then captured by a camera, according to various embodiments, is illustrated in FIG. 54A. With reference thereto, there is shown an example object 120, say a baseball card. Light in the imaging chamber (light sources not shown), such as, for example, may be provided by a set of LEDs as described above, illuminates the object 120. Some of this light may be reflected off of object 120, as shown. For example, light at the front edge of the front of the card, represented by ray A1, may reflect off of card 120 and hit upper mirror 108. The reflection of ray A1 from upper mirror 108, or ray A1' then may travel to the lens of camera 102, and be captured in an image taken by camera 102, as described above. Similarly, light at the rear edge of the front face of the card, represented by ray B1, may reflect off of card 120 and also hit upper mirror 108. The reflection of ray B1 from upper mirror 108, or ray B1' may then travel to the lens of camera 102, as shown, and be captured in the same image taken by camera 102. In similar fashion, various (not shown) additional rays reflect off of card 120 and upper mirror 108, and thus create an upper image 120U of card 120 in the upper mirror, which may be captured by camera 102.

A parallel process may occur with the rear of card 120, it being here recalled that both the front and rear of card 120 are being simultaneously imaged, and thus card 120 is held in a holder that is transparent on both its top and bottom. Thus, light at the front edge of the back of the card, represented by ray A2, may reflect off of the back face of card 120 and hit lower mirror 110. The reflection of ray A2 from lower mirror 110, or ray A2' then may travel to the lens of camera 102, and be captured in the image taken by camera 102, as described above. Similarly, light at the rear edge of the back of the card, represented by ray B2, may reflect off of card 120 and also hit lower mirror 110. The reflection of ray B2 from upper mirror 108, or ray B2' may then travel to the lens of camera 102, as shown, and be captured in the same image taken by camera 102. In similar fashion, various (not shown) additional rays reflect off of card 120 and lower mirror 110, and thus create a lower image 120L of card 120 in the upper mirror, which may be captured by camera 102.

It is noted that in order to obtain symmetric simultaneous images of the front and back of an object, in embodiments, the geometries, in particular the angles subtended between the upper mirror and the object to be imaged, the lower mirror and the object to be imaged, and the planar aspect of each of these three elements are critical. Moreover, the more symmetry between the front of the object image acquisition system and the back of the object image acquisition system, the greater symmetry and parity between the front and back images.

These symmetries, and the consequences of their being even a small amount off, are next described with reference to FIGS. 55 through 58, with further reference, as well as comparison, to FIGS. 51A through 53, previously described.

Figure 55:
FIG. 55 illustrates alternate front and back images similar to those shown in FIG. 52, taken after a slight depression was applied to the lower mirror; as may be seen, due to the depression applied at a lower corner of the lower mirror, the image of the back of the card is rotated relative to the image of the front of the card, and the top perimeter of the back image is not straight.
Figure 55:
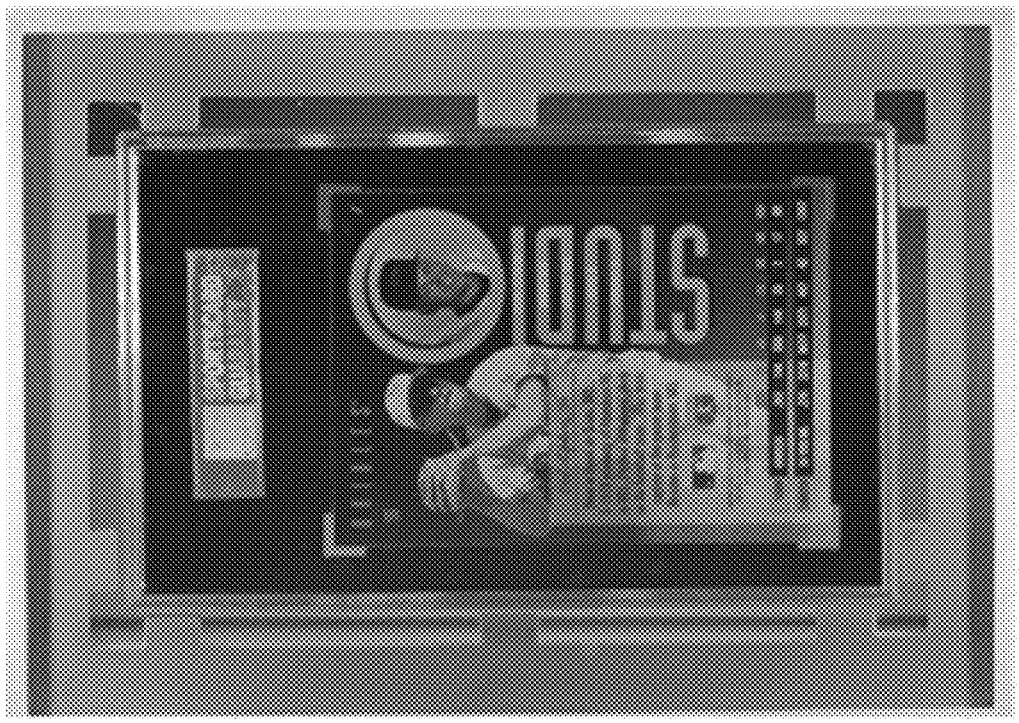

FIG. 55 illustrates alternate front and back images cropped to the template perimeter, similar to those shown in FIG. 52, taken after a slight depression was applied to the lower mirror. As may be seen, due to the depression applied at a lower corner of the lower mirror (the right lower corner of the lower mirror, from a viewpoint at the back of the apparatus looking forward into the chamber), the image of the back of the card is rotated relative to the image of the front of the card, and the four lines defining the perimeter of the back image are not fully parallel to the edges of the images overall.

Figure 55A:
FIG. 55A illustrates the front and back images of FIG. 55, after respectively cropping them to only show the source images (e.g., the card within the plastic cover).
Figure 55A:
Figure 56:
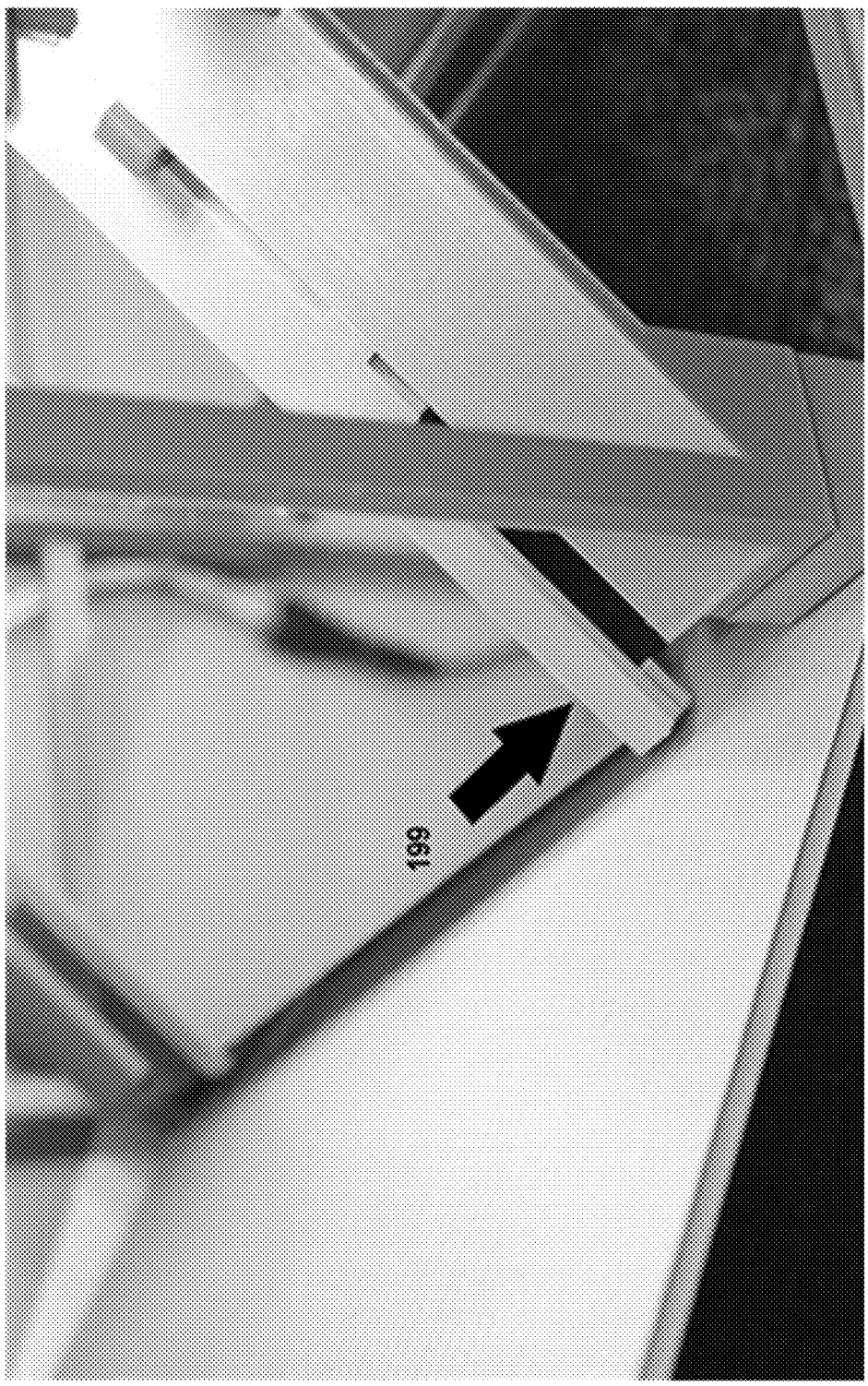
FIG. 56 illustrates the point at which a normal force to the surface of the lower mirror was applied, which created the skew in the back images shown in FIGS. 55 and 55A.

FIG. 55A illustrates the front and back images of FIG. 56, after respectively cropping them to only show the source images (e.g., the card within the plastic cover). In this view the rotation of the rear image is even more visible, and thus there is a gap 196 between the edge of the card slab and the straight horizontal line defining the top of the image.

FIG. 56 illustrates an example lower mirror, and the point at which a substantially normal force 199 to the surface of the lower mirror was applied, which created the skew in the images of the back of the example baseball card shown in FIGS. 56 and 56A.

Figure 57:
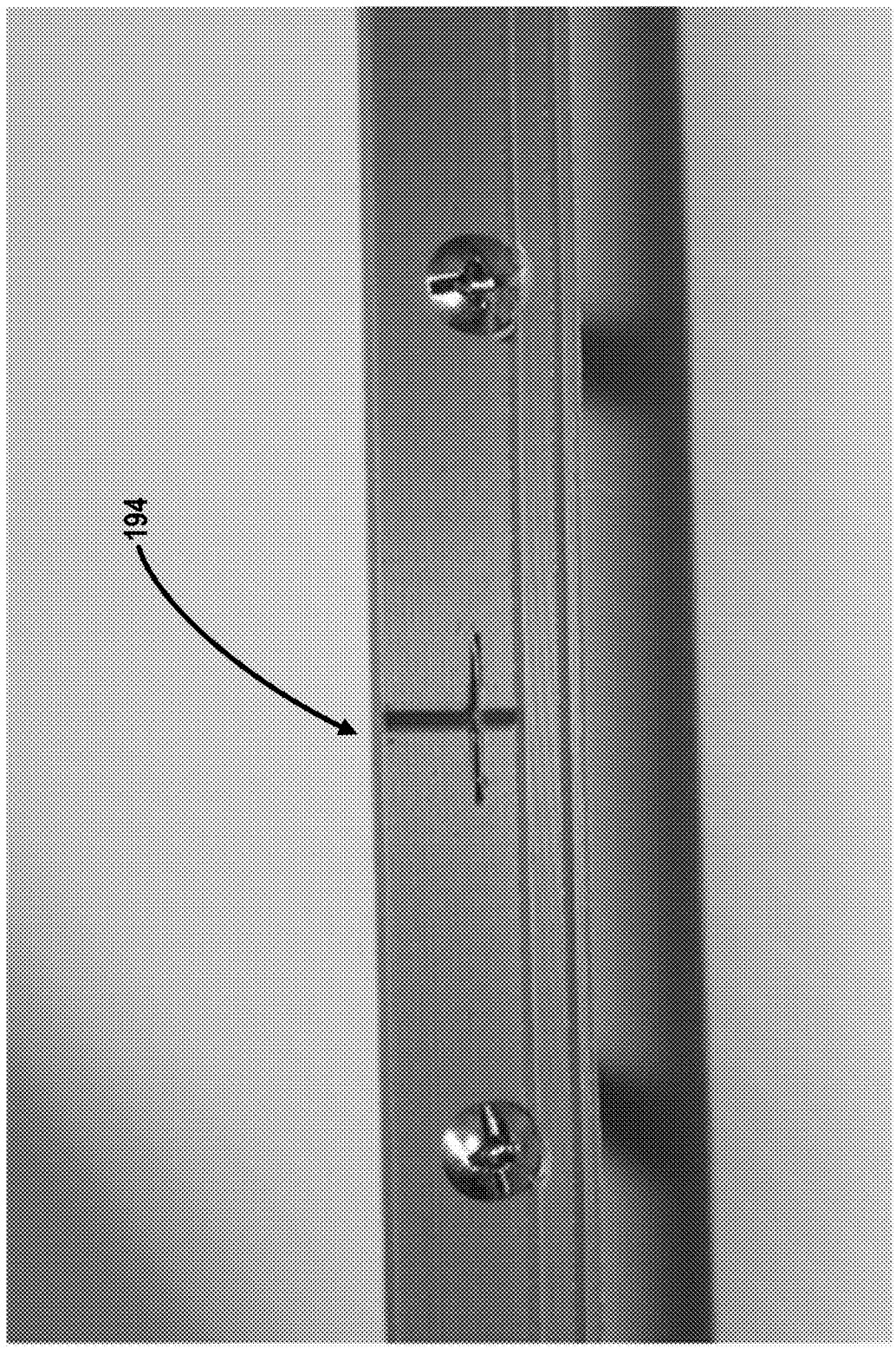
FIG. 57 illustrates a calibration cross placed on the outer rear (so as to be seen in the camera's view) of the drawer of the example alternate apparatus.
Figure 58:
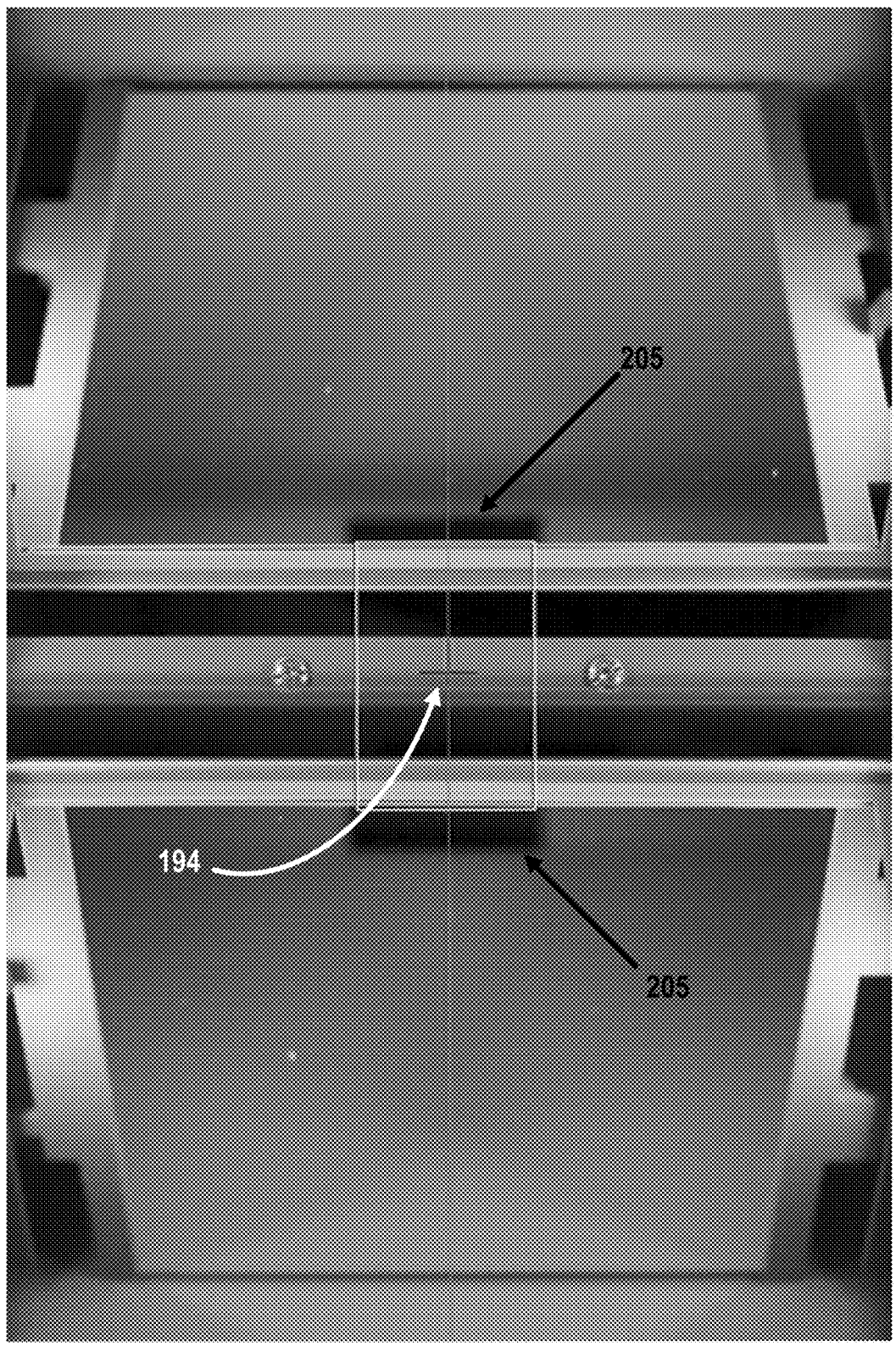
FIG. 58 illustrates an example camera view of the upper and lower mirrors (upper on the left) and the rear of the drawer with the calibration cross in the center used to center the images.

FIG. 57 illustrates a calibration cross 194 placed on the outer rear (so as to be seen in the camera's view) of the drawer of the example alternate apparatus. This may be used, in embodiments, to calibrate the view of the simultaneous images seen by a camera, as next illustrated. FIG. 58 illustrates an example camera view of the upper and lower mirrors and the rear of the drawer with the calibration cross 194 in the center, that may, in embodiments, be used to center the images, both horizontally and vertically. It is here noted that the image of FIG. 58 is of a similar view as that shown in FIG. 51A, for example, without any card, drawer insert or template. Thus, because the drawer insert, glass and any template have been removed from the drawer, the upper and lower images that are seen in FIG. 58 are actually the reflections of each mirror (with its mirror frame) in the other mirror. This is why each mirror appears tilted backwards, as those are reflections. The actual mirror frames are seen, primarily as white horizontal structures at the center of the image, just above and below the drawer end with the calibration cross 194. It is further noted that the small black rectangles 205 in the reflections are the reflections of the bottom (seen in the upper image) and top (seen in the lower image) of the aperture at the back of the chamber. In embodiments, if calibration cross 194 is not seen in the center of this image, then adjustments may be made, for example, to the camera position, and thus the position of its lens, as described above in connection with FIGS. 22-25, or in image capture software that the camera communicates with, running in the connected computer. Alternatively, adjustments may be made to the chamber, the position and angle of the mirror frames, the structure of the apparatus, or the like, to correct for asymmetries that may have been introduced in the components of the housing of the example apparatus, or in the relative spacing of its frame elements, as described above.

Figure 59:
FIG. 59 illustrates an example baffle attached to the camera lens, according to various embodiments.

FIG. 59 illustrates an example baffle 200 attached to the camera lens, according to various embodiments. In embodiments, baffle 200 may be used so as to prevent any effect of a reflection of camera 102 in an acquired image. In embodiments, baffle 200 may be 3D printed, and may have a white color, so as to reflect as much light as possible. It is noted that baffle 200 may be preferred when acquiring simultaneous images of large objects, such as those having a size of 5×7 inches or greater, where a reflection of the camera may actually be seen on the mirrors. Because may cameras, such as, for example, camera 102, are black, the reflection of the black camera onto a mirror may create an effect, such as a black streak on an edge of an image.

Figure 60:
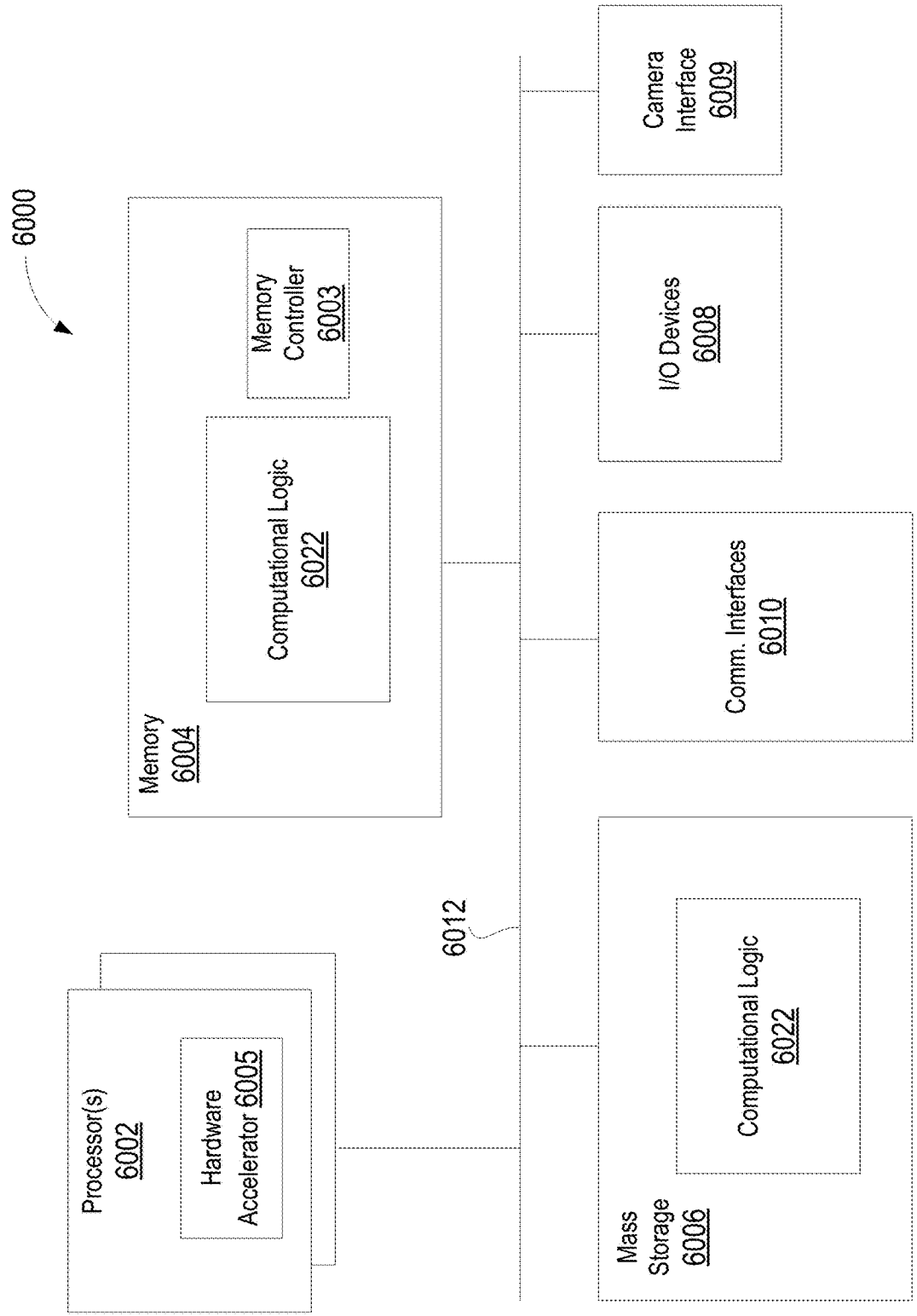
FIG. 60 illustrates a block diagram of a computer device suitable for practicing the present disclosure, in accordance with various embodiments.

Referring now to FIG. 60, a block diagram of a computer device suitable for practicing aspects of the present disclosure, in accordance with various embodiments, is illustrated. As shown, computer device 6000 may include one or more processors 6002, memory controller 6003, and system memory 6004. Each processor 6002 may include one or more processor cores, and hardware accelerator 6005. An example of hardware accelerator 6005 may include, but is not limited to, programmed field programmable gate arrays (FPGA). In embodiments, processor 6002 may also include a memory controller (not shown). In embodiments, system memory 6004 may include any known volatile or non-volatile memory.

Additionally, computer device 6000 may include mass storage device(s) 6006 (such as solid state drives), input/output device interface 6008 (to interface with various input/output devices, such as, mouse, cursor control, display device (including touch sensitive screen), and so forth) and communication interfaces 6010 (such as network interface cards, modems and so forth). Computer device may also have a camera interface 6009, to exchange control signals, images, data and other signals with a camera, such as camera 102 in FIG. 20, communicably connected to computer device 6000. In embodiments, communication interfaces 6010 may support wired or wireless communication, including near field communication. The elements may be coupled to each other via system bus 6012, which may represent one or more buses. In the case of multiple buses, they may be bridged by one or more bus bridges (not shown).

Each of these elements may perform its conventional functions known in the art. In particular, system memory 6004 and mass storage device(s) 6006 may be employed to store a working copy and a permanent copy of the executable code of the programming instructions of an operating system, one or more applications, and/or various software implemented components of a camera control and simultaneous image acquisition system, collectively referred to as computing logic 6022. The programming instructions implementing computing logic 6022 may comprise assembler instructions supported by processor(s) 6002 or high-level languages, such as, for example, C, that can be compiled into such instructions. In embodiments, some of computing logic may be implemented in hardware accelerator 6005. In embodiments, part of computational logic 6022, e.g., a portion of the computational logic 6022 associated with the runtime environment of the compiler may be implemented in hardware accelerator 6005.

The permanent copy of the executable code of the programming instructions or the bit streams for configuring hardware accelerator 6005 may be placed into permanent mass storage device(s) 6006 and/or hardware accelerator 6005 in the factory, or in the field, through, for example, a distribution medium (not shown), such as a compact disc (CD), or through communication interface 6010 (from a distribution server (not shown)). While for ease of understanding, the compiler and the hardware accelerator that executes the generated code that incorporate the predicate computation teaching of the present disclosure to increase the pipelining and/or parallel execution of nested loops are shown as being located on the same computing device, in alternate embodiments, the compiler and the hardware accelerator may be located on different computing devices.

The number, capability and/or capacity of these elements 6010-6012 may vary, depending on the intended use of example computer device 6000, e.g., whether example computer device 6000 is a smartphone, tablet, ultrabook, a laptop, a server, a set-top box, a game console, a camera, and so forth. The constitutions of these elements 6010-6012 are otherwise known, and accordingly will not be further described.

Figure 61:
FIG. 61 illustrates an example computer-readable storage medium having instructions configured to implement all (or portion of) software implementations of and/or practice (aspects of) process 5400 of FIG. 54, in accordance with various embodiments.

FIG. 61 illustrates an example computer-readable storage medium having instructions configured to implement all (or portion of) software implementations of and/or practice (aspects of) process 5400 of FIG. 54, earlier described, in accordance with various embodiments. As illustrated, computer-readable storage medium 6102 may include the executable code of a number of programming instructions or bit streams 6104. Executable code of programming instructions (or bit streams) 6104 may be configured to enable a device, e.g., computer device 6100, in response to execution of the executable code/programming instructions (or operation of an encoded hardware accelerator 6105), to perform (aspects of) process 5400 of FIG. 54. In alternate embodiments, executable code/programming instructions/bit streams 6104 may be disposed on multiple non-transitory computer-readable storage medium 6102 instead. In embodiments, computer-readable storage medium 6102 may be non-transitory. In still other embodiments, executable code/programming instructions 6104 may be encoded in transitory computer readable medium, such as signals.

Referring back to FIG. 60, for one embodiment, at least one of processors 6002 may be packaged together with a computer-readable storage medium having some or all of computing logic 6022 (in lieu of storing in system memory 6004 and/or mass storage device 6006) configured to practice all or selected ones of the operations earlier described with reference to FIG. 54. For one embodiment, at least one of processors 6002 may be packaged together with a computer-readable storage medium having some or all of computing logic 6022 to form a System in Package (SiP). For one embodiment, at least one of processors 6002 may be integrated on the same die with a computer-readable storage medium having some or all of computing logic 6022. For one embodiment, at least one of processors 6002 may be packaged together with a computer-readable storage medium having some or all of computing logic 6022 to form a System on Chip (SoC). For at least one embodiment, the SoC may be utilized in, e.g., but not limited to, a hybrid computing tablet/laptop.

In the description above, various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus for simultaneous image capture, comprising:
   a camera; and
   a chamber with an aperture, the camera oriented to capture light emitted through the aperture,
   the chamber to include:
   at least first and second mirrors positioned inside the chamber with a defined angle between them, and a holder for an object to be imaged, the holder positioned inside the chamber between the first and second mirrors,
   wherein the holder comprises a drawer, with a transparent lower surface on which to place the object to be imaged, and
   wherein a field of view of the camera includes at least portions of the first and second mirrors with respective portions of the object reflected by the first and second mirrors.

2. The apparatus of claim 1, wherein the defined angle between the first and second mirrors is between 75 and 115 degrees.

3. The apparatus of claim 1, wherein the holder is planar.

4. The apparatus of claim 1, wherein the defined angle between the first and second mirrors is substantially 90 degrees, and wherein an angle of substantially 45 degrees is subtended between the holder and each of the first and second mirrors.

5. The apparatus of claim 1, wherein the camera is positioned at a distance behind the aperture such that the respective portions of the object reflected by the first and second mirrors respectively include a full view of front and back sides of the object.

6. The apparatus of claim 1, further comprising a third mirror to reflect light from the first and second mirrors onto a lens of the camera.

7. The apparatus of claim 6, further comprising a fourth mirror to reflect light from the third mirror onto a lens of the camera.

8. The apparatus of claim 1, further comprising a drawer insert, to hold one or more types of templates in which an object may be provided.

9. The apparatus of claim 8, the drawer insert further comprising a fixation mechanism to hold each of the one or more types of templates in the same position relative to the drawer insert.

10. The apparatus of claim 1, wherein a rear of the chamber is defined by one or more baffles, the aperture provided in one of the baffles.

11. The apparatus of claim 10, wherein the baffles are colored grey.

12. The apparatus of claim 10, wherein the chamber is illuminated by a set of lights.

13. The apparatus of claim 12, wherein the set of lights includes at least four LEDs, two provided to illuminate an upper surface of the object, and two provided to illuminate a lower surface of the object.

14. The apparatus of claim 13, wherein each LED is held in a pre-defined position within the chamber by an affixation device, to prevent variations in the LED's position over time.

15. The apparatus of claim 1, wherein the camera and the chamber are provided in a housing, the housing including a drawer that opens at a front surface of the housing, and when closed sits between the first and second mirrors.

16. The apparatus of claim 15, wherein the drawer comprises the holder.

17. One or more non-transitory computer-readable storage media comprising a plurality of instructions that in response to being executed cause a computing device communicably connected to the apparatus of claim 8 to:
   acquire simultaneous images of a front surface and a rear surface of an object, in response to a user indication;
   invert and rotate the acquired images;
   first crop the images to a first perimeter and store in a first database;
   second crop the first cropped images to a second perimeter and store in one of the first database or a second database;
   display the second cropped images to the user.

18. The one or more non-transitory computer-readable storage media of claim 17, further comprising instructions that, when executed, cause the computing device to:
   in response to a user indication, rescan the object.

19. The one or more non-transitory computer-readable storage media of claim 17, wherein the object is provided in a template, the template provided in the holder, and wherein the first crop crops the images to substantially the perimeter of the template, and the second crop crops the image to substantially remove the template from the images.

* * * * *